US007554445B2

(12) United States Patent
Script et al.

(10) Patent No.: US 7,554,445 B2
(45) Date of Patent: Jun. 30, 2009

(54) PORTABLE MOTION DETECTOR AND ALARM SYSTEM AND METHOD

(76) Inventors: Michael H. Script, 85 Fordham Dr., Buffalo, NY (US) 14216; Henry J. Script, 887 W. Ferry St., Buffalo, NY (US) 14209

( * ) Notice: Subject to any disclaimer, the term of this patent is extended or adjusted under 35 U.S.C. 154(b) by 88 days.

(21) Appl. No.: 10/563,185

(22) PCT Filed: Jul. 2, 2004

(86) PCT No.: PCT/US2004/021371

§ 371 (c)(1),
(2), (4) Date: Aug. 7, 2006

(87) PCT Pub. No.: WO2005/006273

PCT Pub. Date: Jan. 20, 2005

(65) Prior Publication Data

US 2007/0126576 A1   Jun. 7, 2007

(51) Int. Cl.
*G08B 13/08* (2006.01)
(52) U.S. Cl. .................... 340/545.1; 310/311; 340/531; 340/539.1; 340/546; 340/547
(58) Field of Classification Search ................. 340/541, 340/545.1, 545.4, 545.5, 546, 547, 566, 531, 340/539.1; 73/514.01; 310/311; 200/61.45 R
See application file for complete search history.

(56) References Cited

U.S. PATENT DOCUMENTS

| | | | |
|---|---|---|---|
| 3,696,359 A | 10/1972 | Ross et al. | 340/547 X |
| 3,696,380 A | 10/1972 | Murphy | 340/546 |
| 3,781,836 A | 12/1973 | Kruper et al. | 340/539 |
| 3,833,895 A | 9/1974 | Fecteau | 340/545.1 X |
| 3,925,763 A | 12/1975 | Wadhwani et al. | 340/545.1 |
| 4,148,019 A | 4/1979 | Durkee | 340/545.1 X |
| 4,149,156 A | 4/1979 | Blasucci | 340/545.2 |
| 4,167,733 A | 9/1979 | Krause et al. | 340/539.31 |

(Continued)

FOREIGN PATENT DOCUMENTS

EP   0753753 A2   1/1997

OTHER PUBLICATIONS

EPO, "Supplementary European Search Report," Feb. 6, 2008, 4 pages.

*Primary Examiner*—Thomas J Mullen
(74) *Attorney, Agent, or Firm*—Walter W. Duft

(57) ABSTRACT

A portable security alarm system including a movement detecting and signal transmitting member for mounting on or proximate to the object whose movement is to be detected, a signal receiving and alarm generating member for receiving a signal from the movement detecting and signal transmitting member and producing a security response, a remote control for actuating and deactuating the signal receiving and alarm generating member, an environmental monitoring member for sensing an environmental condition and providing a signal to the signal receiving and alarm generating member, a visual information gathering member for gathering visual information and providing a signal to the signal receiving and alarm generating member, an audio output member for receiving a signal from the signal receiving and alarm generating member and generating an audio output, and components for delivering a security notification to remote recipients. A security network that includes the alarm system is also disclosed. An inertial sensor for alarm system or for activating or deactivating a device is additionally disclosed.

13 Claims, 37 Drawing Sheets

U.S. PATENT DOCUMENTS

| | | | | |
|---|---|---|---|---|
| 4,189,655 A | 2/1980 | Bruel | | 310/329 |
| 4,271,405 A | 6/1981 | Kitterman | | 340/512 |
| 4,335,379 A | 6/1982 | Martin | | 340/692 |
| 4,337,462 A | 6/1982 | Lemelson | | 340/568.1 |
| 4,446,454 A | 5/1984 | Pyle | | 340/538 |
| 4,511,886 A | 4/1985 | Rodriquez | | 340/534 |
| 4,737,770 A | 4/1988 | Bunius et al. | | 340/539 |
| 4,742,236 A | 5/1988 | Hall et al. | | 340/539.11 |
| 4,888,580 A | 12/1989 | Distel | | 340/573.1 |
| 5,001,461 A | 3/1991 | Vroom et al. | | 340/568.6 |
| 5,118,981 A | 6/1992 | Kobayashi et al. | | |
| 5,200,735 A | 4/1993 | Hines | | 340/539.11 |
| 5,317,303 A | 5/1994 | Ross et al. | | 340/539 |
| 5,317,305 A | 5/1994 | Campman | | 340/573.1 |
| 5,319,698 A | 6/1994 | Glidewell et al. | | 379/39 |
| 5,406,848 A * | 4/1995 | Okada | | 73/514.32 |
| 5,489,890 A | 2/1996 | Moser | | 340/546 |
| 5,524,489 A * | 6/1996 | Twigg | | 73/514.38 |
| 5,587,701 A | 12/1996 | Hess | | 340/541 |
| 5,736,923 A * | 4/1998 | Saab | | 340/566 |
| 5,811,910 A | 9/1998 | Cameron et al. | | 310/324 |
| 5,850,180 A | 12/1998 | Hess | | 340/541 |
| 5,963,131 A | 10/1999 | D'Angelo et al. | | 340/568.1 |
| 6,052,052 A | 4/2000 | Delmonaco | | 340/539.11 |
| 6,150,936 A | 11/2000 | Addy | | 340/539.2 |
| 6,163,257 A | 12/2000 | Tracy | | 340/506 |
| 6,215,396 B1 | 4/2001 | Script | | 340/545.1 |
| 6,654,685 B2 * | 11/2003 | McIntyre | | 340/545.5 |
| 6,661,340 B1 | 12/2003 | Saylor et al. | | 340/541 |
| 6,989,746 B2 * | 1/2006 | Rasmussen | | 340/545.1 |
| 2002/0113704 A1 | 8/2002 | Hess | | 340/568.2 |
| 2003/0076408 A1* | 4/2003 | Dutta | | 348/61 |
| 2003/0078029 A1 | 4/2003 | Petite | | 455/404 |
| 2003/0227382 A1 | 12/2003 | Breed | | 340/539.13 |

* cited by examiner

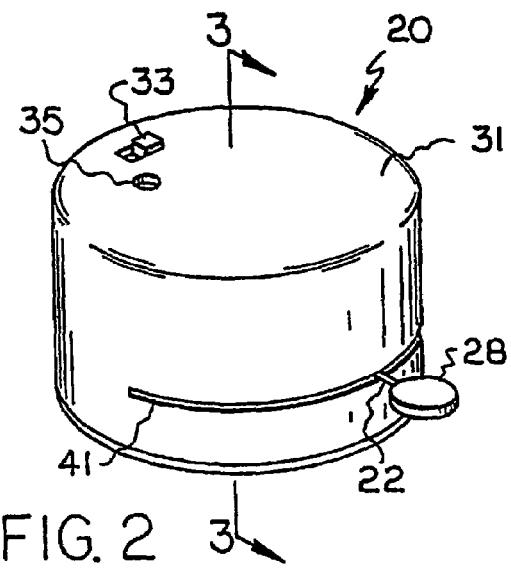
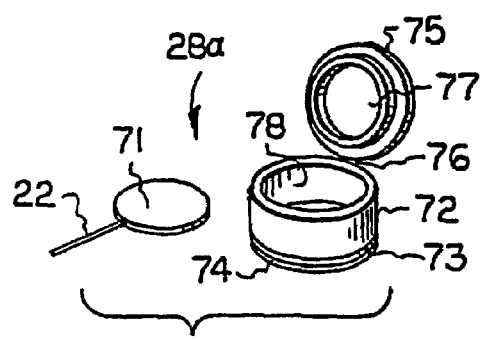
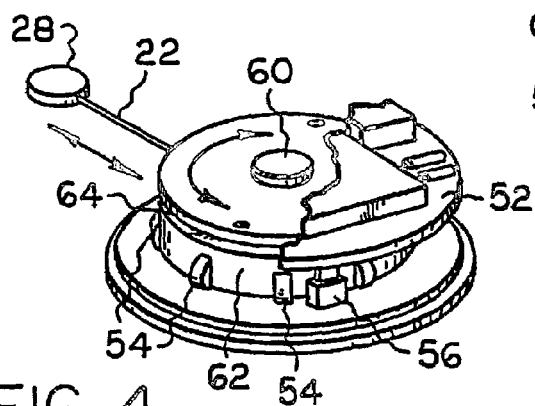
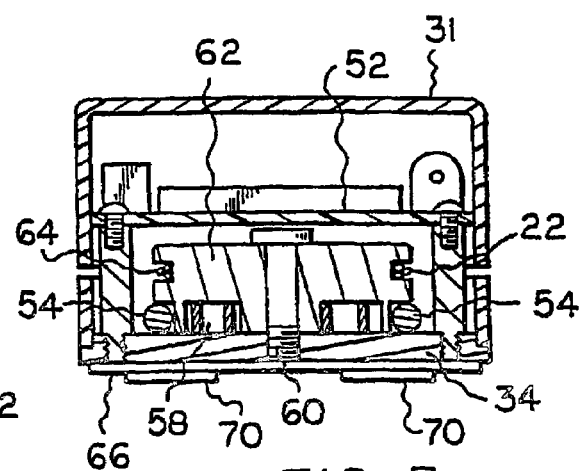
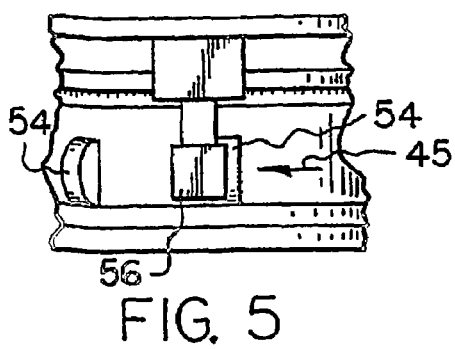
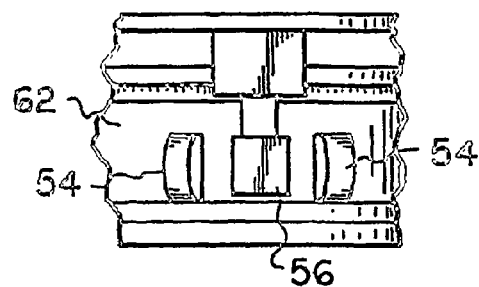

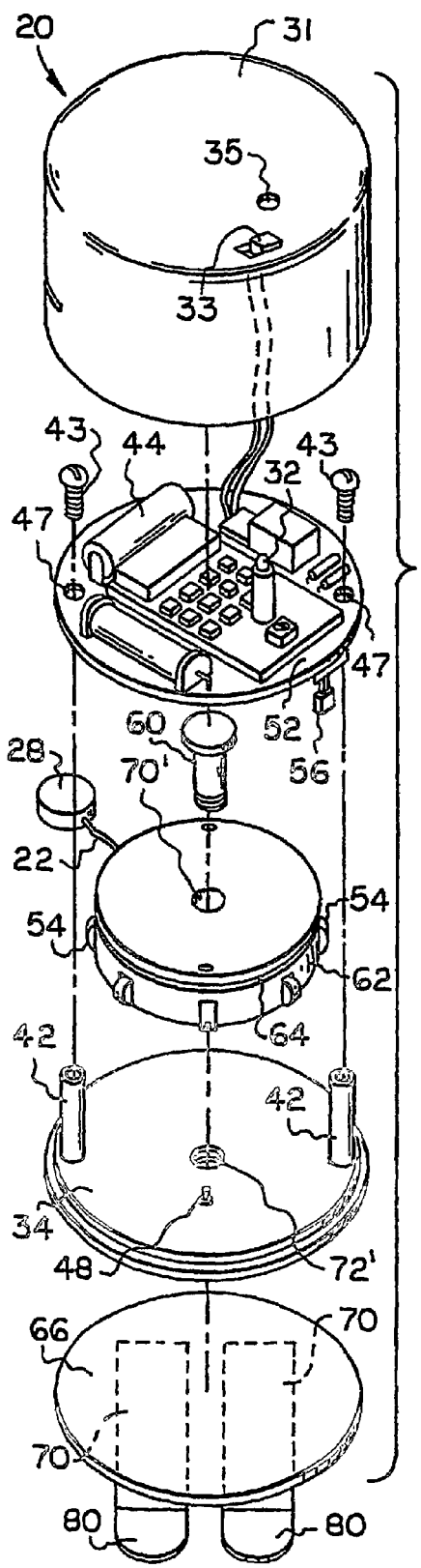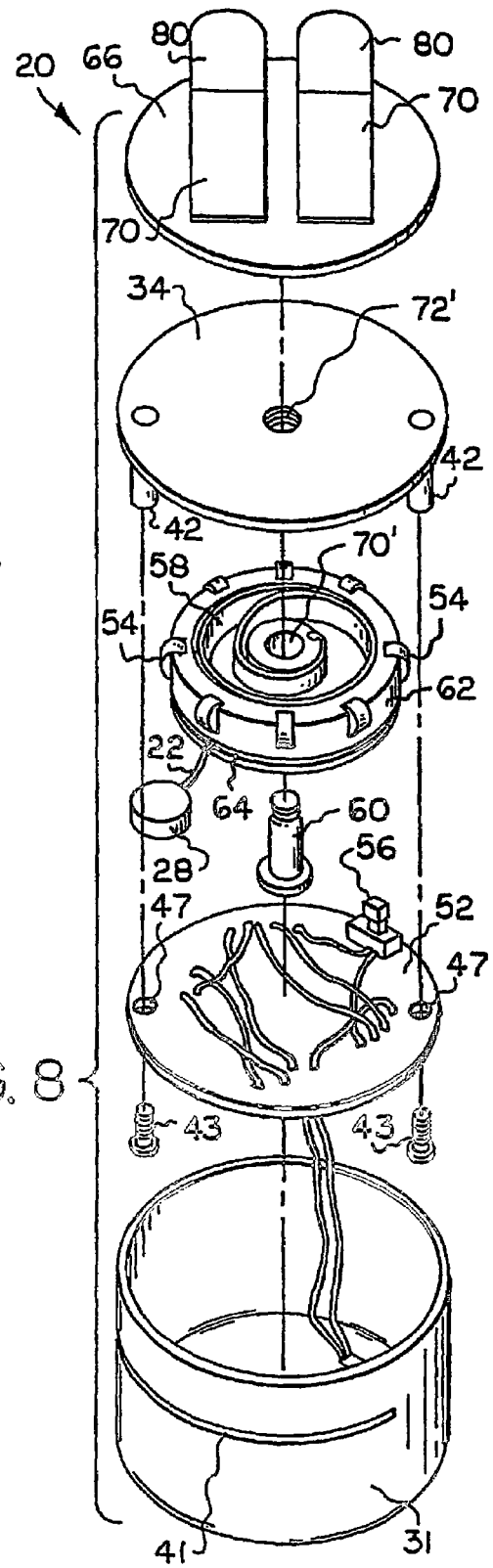

| | |
|---|---|
| xxyyzz00 | FRONT DOOR |
| xxyyzz01 | BACK DOOR |
| ⋮ | |
| ⋮ | . |
| | ⋮ |
| ⋮ | |
| . | ⋮ |
| | |
| ⋮ | . |
| . | |
| xxyyzznn | ANYWHERE |

FIG. 18

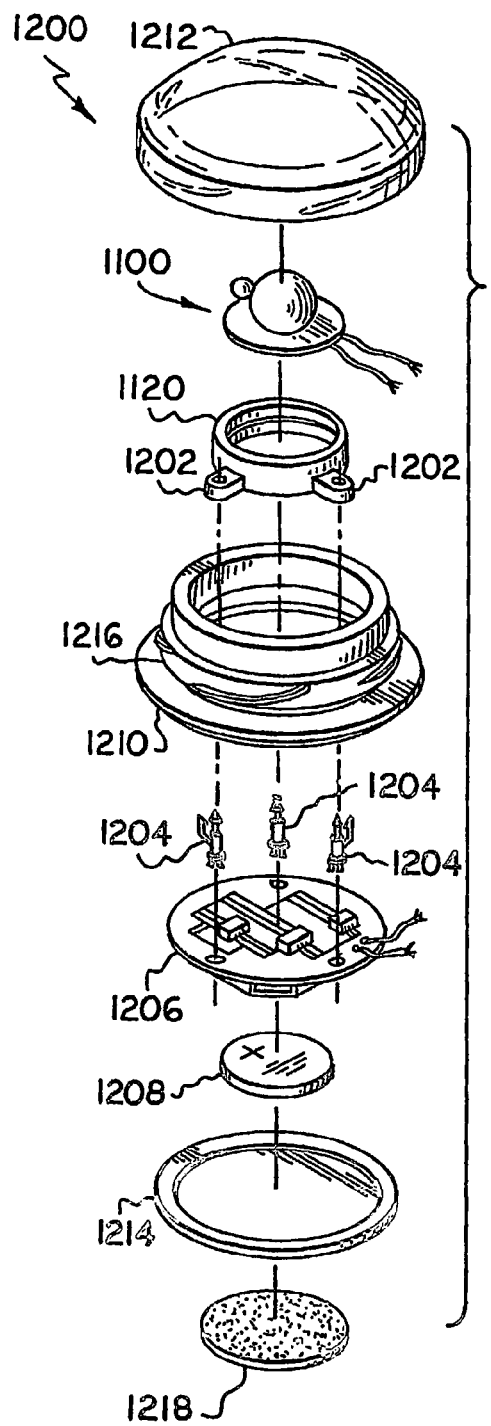
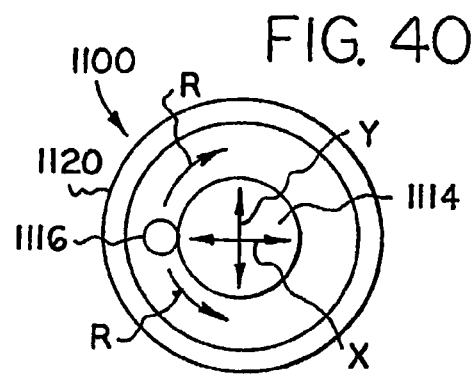
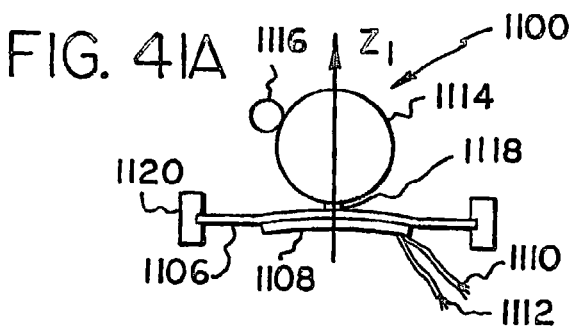
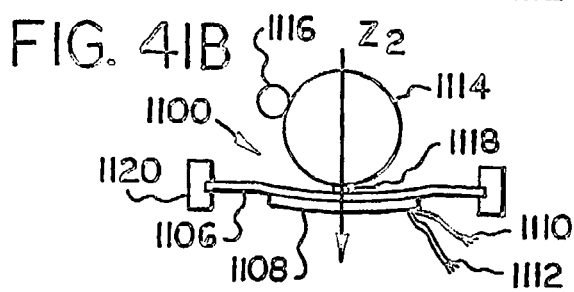
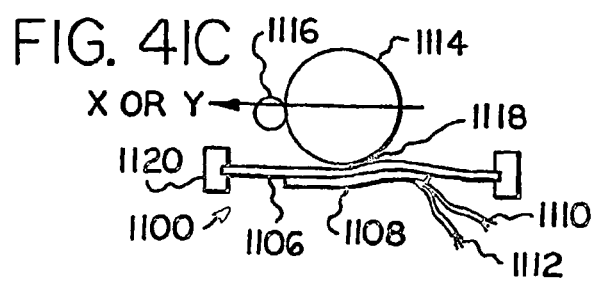

PORTABLE MOTION DETECTOR AND ALARM SYSTEM AND METHOD

BACKGROUND OF THE INVENTION

1. Field of the Invention

The invention relates generally to an improved motion detector and alarm system for actuating an alarm device in response to movement of an object, and more particularly to a portable motion detector and alarm system which is easy to install and operate and is capable of detecting motion relative to a variety of predetermined positions.

2. Prior Art

The problem of protecting homes, businesses and other premises against unauthorized intrusions is becoming increasingly important due to the increase in vandalism, theft and even physical attacks upon the inhabitants. Various prior art systems have been developed to address the problem and numerous examples exist of alarm or warning devices. One commonly used protective system involves wiring doors and windows in such a manner that an unauthorized opening of the door or window activates an electric circuit which in turn produces an alarm.

For example, U.S. Pat. No. 4,271,405 to Kitterman discloses an alarm control system for protecting a premises including a four conductor bus line leading from a master control station and extending about the interior perimeter of the premises. Sensors positioned near each port of entry to be monitored are connected in parallel relationship to the bus line. Each sensor carries a biased reel carrying line secured to a window, door, screen or the like. Disturbance of a sensor causes a magnetically responsive switch therein to generate a pulse triggering circuitry within the control station to activate the desired alarm device.

While effective, this system requires extensive wiring of the premises as a bus line must be routed about the interior perimeter of the premises between a master control station and the ports of entry at which the motion sensors are to be located. Hence, this system is time consuming and complicated to install, and installation may require expertise beyond that of the average home or business owner. Once installed, the, sensors of this system are not easily relocated. Further, the system may be defeated by cutting the wires extending between the sensors and the master control station.

U.S. Pat. No. 3,781,836 to Kruper et al discloses an alarm system including a magnetic pulse generator for producing an output pulse in response to a change in magnetic flux in response to an intrusion of a designated area. A radio transmitter circuit responds to the pulse from the magnetic pulse generator by transmitting a signal to a remote receiver circuit which in turn generates a pulse for actuating an intrusion alarm circuit. The system requires a complex linkage assembly to translate motion of the object to motion of a magnet. In addition a relatively bulky pick-up coil assembly is necessary to generate the pulse to be applied to the transmitter circuit.

U.S. Pat. No. 3,696,380 to Murphy discloses a portable alarm device with a battery or low voltage operated sound signal triggered by a magnetic reed switch which is closed to complete the circuit by a magnet attached to a movably mounted arm, the poles of the magnet being positioned perpendicular to the longitudinal dimension of the contact strips of the reed switch to cause the reed switch to close when the magnet is in either of two positions relative to the switch.

A need remains for a motion detection and signal generating system which is small in size, easily transportable, easy to install and which can sense motion relative to any desired initial position of an object. An additional desirable capability of the foregoing system would be to provide information about the detected motion to the owner of the object, or a remote location such as a law enforcement or other security agency. It would likewise be desirable to provide identification information about a specific object whose motion has been detected in the event that the motion detection and signal generating system is implemented to detect motion at multiple locations (e.g., doors, windows) within a larger security area (e.g., a residence, an office or otherwise).

BRIEF SUMMARY OF THE INVENTION

Accordingly, it is a principal object of the invention to provide a system for detecting the movement of an object comprising: an object whose movement is to be detected, movable magnet means coupled to the object such that movement of the object results in movement of said movable magnet means, and means for detecting movement of the movable magnet means and providing an indication of the movement. The means for detecting is in communication with the movable magnet means.

The system further includes radiating means for wirelessly transmitting a predetermined signal in response to the indication of movement, the radiating means being coupled to the means for detecting. The object whose movement is to be detected may be coupled to the movable magnet means by a wire means which can also serve as the radiating means.

The system further includes means for receiving the predetermined signal, the means for receiving being separate from and located at a distance from the radiating means. The system preferably includes means for generating an alarm signal security response when the predetermined signal is received by the means for receiving. The alarm signal thus generated may be audible, visual or electronic and may include speakers, warning horns, lamps and the like.

It is a further object of the invention to provide a method of detecting movement of one or more objects comprising the steps of: a) coupling each object whose movement is to be detected to a corresponding movable magnet such that movement of any object results in movement of the corresponding magnet; b) detecting the motion of the corresponding magnet; c) transmitting a predetermined signal in response to the detected motion, and, d) receiving the predetermined signal at a distance from the object, or objects, whose motion is to be detected.

The method may include the further step of providing an alarm signal security response when the predetermined signal is received by the receiver means. The alarm signal may be audible, visible, or may be an electronic alarm signal which is transmitted to a remote alarm center via a telecommunications means such as a telephone line.

It is a further object of the invention to provide a movement detection and alarm system which may be affixed to a wide variety of objects including inside doors, outside gates, garage doors, children's barriers such as "baby gates", valuable wall hangings and paintings, and countless other objects.

It is a further object of the invention to provide a movement detection and alarm system which is portable and is easily packed in a suitcase and transported with a traveler to be later installed on motel or hotel room doors, windows and/or any objects within the room, whenever additional protection is desired by the traveler.

It is a further object of the invention to provide a movement detection and alarm system that provides movement information to a remote location, such as a law enforcement or security agency.

It is a further object of the invention to provide a movement detection and alarm system wherein the movement information includes an indication of the distance that is moved for measuring purposes.

It is a further object of the invention to provide a movement detection and alarm system that provides object identification information either locally at or near the site of the object or remotely to a designated location such as a telephone number, email address, etc.

It is a further object of the invention to provide a movement detection and alarm system wherein the object identification information is locally or remotely programmable.

It is a further object of the invention to provide a movement detection and alarm system wherein the movable magnet means and the radiating means are part of a remotely controllable trigger unit having both a radio transmitter and a radio receiver.

It is a further object of the invention to provide a security network that includes a security administration system operating in conjunction with an alarm system to provide security notifications to entities specified by network subscribers, and to optionally download security alerts and other information to the alarm system, where it can be accessed by the subscribers.

It is a further object of the invention to provide a sensor for detecting movement that does not rely on wire means to detect the movement of an object.

The present invention relates to a portable security alarm system which can be installed on a temporary basis and removed from an object whose movement is to be detected comprising a motion detecting and radio signal transmitting member, means for selectively coupling and decoupling said motion detecting and radio signal transmitting member relative to said object whose movement is to be detected, and a combined radio signal receiving and alarm generating member for receiving a signal from said combined motion detecting and radio signal transmitting member and producing an alarm. The alarm system also preferably includes a remote control member for selectively actuating and deactuating said combined radio signal receiving and alarm generating member. The alarm system also preferably includes an information gathering device for gathering movement information and a remote notification device for providing the movement information to a remote location. As an optional feature, the alarm system can be implemented such that the signal from the combined motion detecting and radio signal transmitting member includes an identification code that is used to provide object identification information either locally or to a remote location. Local or remote programmable means can be provided for selectively associating the object identification information with the identification code. As an additional optional feature, the combined motion detecting and radio signal transmitting member can be adapted to provide distance information representing a distance moved by an object whose movement is to be detected. The combined motion detecting and radio signal transmitting member can also include radio signal receiving means and control logic means to facilitate remote control of the device for polling or programming purposes.

In additional embodiments of the invention, the alarm system of the invention is part of a security network that includes a security administration system for receiving security information from the alarm system and for notifying designated entities specified by network subscribers. The security administration system may be further adapted to download security alerts and other information, including advertising or other commercial information, to the alarm system, where it can be accessed by the subscribers.

In further embodiments of the inventions, a novel inertial sensor construction is provided that may be used in the alarm system of the invention or to perform other functions, such as activating or deactivating a device that may or may not be associated with a security function.

BRIEF DESCRIPTION OF THE SEVERAL VIEWS OF THE DRAWING

The foregoing and other objects and features of the present invention will become more fully apparent from the following description and appended claims, taken in conjunction with the accompanying drawings. Understanding that these drawings depict only typical embodiments of the invention and are, therefore not to be considered limiting of its scope, the invention will be described with additional specificity and detail through use of the accompanying drawings in which:

FIG. 2 is a perspective view of one embodiment of a movement detecting and signal transmitting means according to the present invention.

FIG. 3 is a cross sectional view of the movement detecting and signal transmitting means of FIG. 2 taken along lines 3-3 of FIG. 2.

FIG. 4 is a perspective view of the interior of the movement detecting and signal transmitting means of FIG. 2.

FIG. 5 is a close-up view of a movement detecting means in the movement detecting and signal transmitting means of FIG. 2.

FIG. 6 is a close-up view of a movable magnet means in the movement detecting and signal transmitting means of FIG. 2.

FIG. 7 is an exploded top perspective view of the movement detecting and signal transmitting means of FIG. 2.

FIG. 8 is an exploded bottom perspective view of the movement detecting and signal transmitting means of FIG. 2.

FIG. 11 is an exploded view of a structure for affixing the outer end of a retractable wire of the movement detecting and signal transmitting means of FIG. 1 to an object whose movement is to be detected.

FIG. 18 is a diagrammatic representation of a unique identifier look-up table.

FIG. 23 is a diagrammatic perspective view of an accelerometer sensor constructed from another modified piezoelectric buzzer.

FIG. 40 is a top plan view of the inertial sensor of FIG. 38.

FIGS. 41A, 41B and 41C are diagrammatic side views showing the application of accelerating forces to the inertial sensor of FIG. 38.

FIG. 42 is an exploded view showing a construction for a movement detecting and signal transmitting means that incorporates the inertial sensor of FIG. 38.

DETAILED DESCRIPTION OF THE INVENTION

The following detailed description of the embodiments of the present invention, as represented in FIGS. 1-10, is not intended to limit the scope of the invention, as claimed, but is merely representative of the presently preferred embodiments of the invention. The presently preferred embodiments of the invention will be best understood by reference to the drawings, wherein like parts are designated by like numerals throughout.

Figure 1:
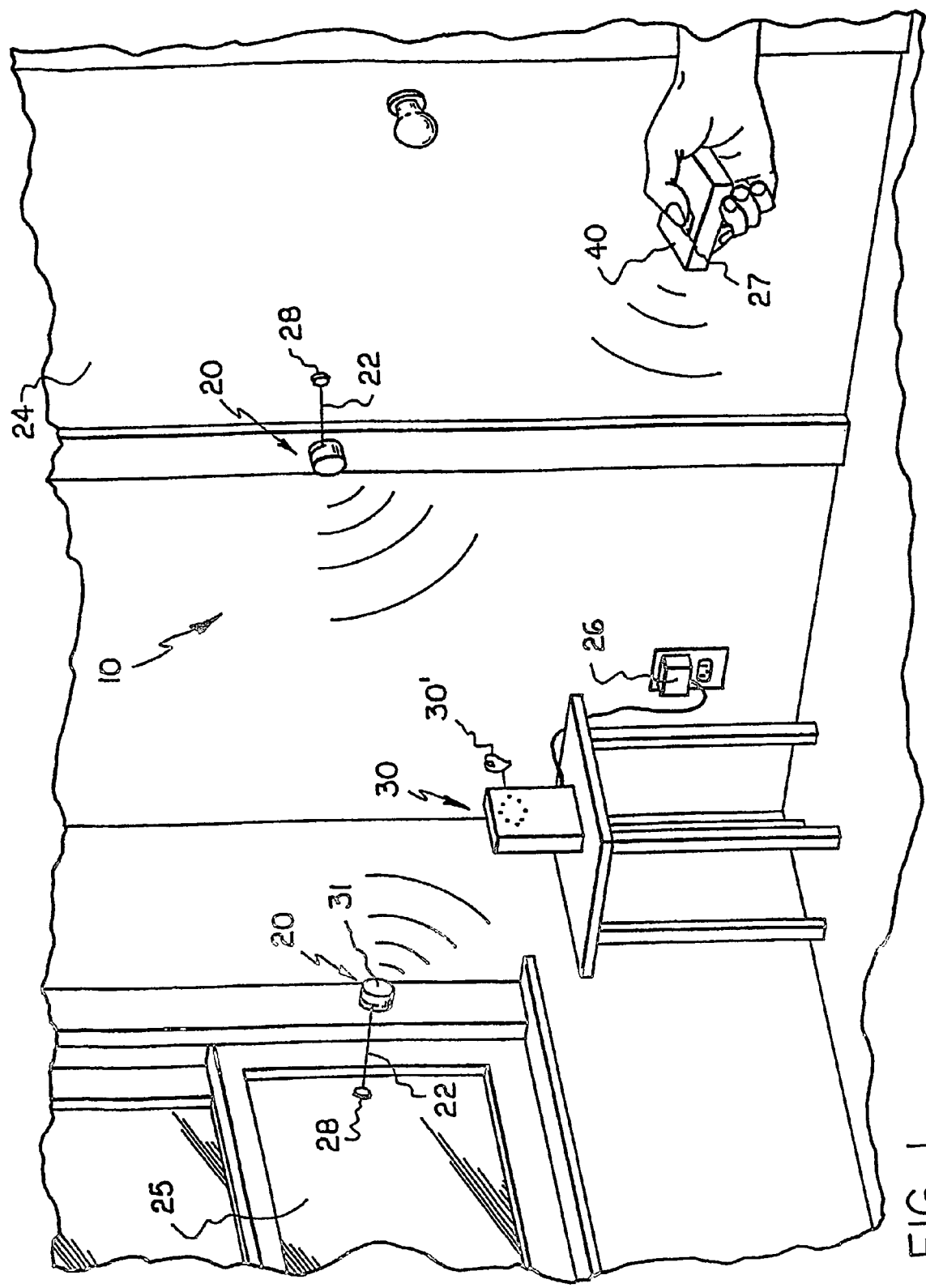
FIG. 1 is a pictorial diagram showing the components of an alarm system according to one embodiment of the present invention as they appear in use.

FIG. 1 shows, in pictorial block diagram form, the major components of the movement detecting device and alarm system 10 of the present invention. The system is comprised of at least one movement detecting and signal transmitting means 20, including a retractable wire means 22, a receiver means 30 and a remote control means 40.

More than one movement detecting and signal transmitting means 20 may be utilized in implementing the system of the present invention. One movement detecting and signal transmitting means 20 may be placed on each object whose movement it is desired to detect. For example, in a room with four windows 25 and two doors 24, six movement detecting and signal transmitting means 20 may be utilized, one on each window and one on each door. However, only one receiver means 30 is necessary regardless of the number of movement detecting and signal transmitting means 20 used. There is no limit to the number of movement detecting and signal transmitting means 20 which may be used with one receiver.

Each movement detecting and signal transmitting means 20 is coupled to one object, such as a door 24, or window 25, whose movement is to be detected. In a preferred embodiment, the coupling means is a retractable wire 22 which extends from movement detecting and signal transmitting means 20 to the object, 25 or 24, whose movement is to be detected. One end of retractable wire 22 is affixed to the object and the other is coupled to movable magnets (best illustrated in FIGS. 4, 5 and 6) located inside casing 31 of movement detecting and signal transmitting means 20. Typical means of affixing the end of retractable wire 22 to an object include VELCRO tabs, glue, removable tape, and the like.

Receiver means 30 is configured to receive a predetermined signal which is wirelessly transmitted by movement detecting and signal transmitting means 20 whenever the object whose movement is to be detected, is displaced from a predetermined position. The object whose movement is to be detected need not be in any particular position when the end of retractable wire 22 is affixed thereto. If the object is a window, such as depicted at 25, the window may be closed, or it may be partially or fully open, when retractable wire 22 is affixed. Any displacement from its position when retractable wire 22 is affixed will be detected and alarmed.

Accordingly, a window may be left in a partially open position, as for example, to provide fresh air to a room, while the occupant attends to other matters, or sleeps. Any displacement from the partially open position will cause the alarm signal to be generated. Even in a situation wherein an intruder reached into the window and removed movement detecting and signal transmitting means 20 from the window, the predetermined signal would be transmitted and the alarm signal generated, thus warning the occupant of an intrusion.

Receiver means 30 can be any receiver known in the art capable of receiving the signal transmitted through retractable wire 22. In response to the transmitted signal, receiver means 30 initiates a local alarm signal security response which can be audible or visual. In addition, as a further security response option, the receiver means 30 may initiate contact with police, medical, rescue or other emergency facilities or agencies. Receiver means 30 can be AC powered and may be equipped with an on/off switch. Receiver means 30 need not be co-located with movement detection and signal transmitting means 20 and can be positioned anywhere within reception distance of the transmitted signal. Receiver means 30 may be positioned anywhere about the room or the area to be protected and may be placed up to a distance of 150 ft. to 200 ft. or greater from movement detecting and signal transmitting means 20.

In a preferred embodiment receiver means 30 is powered by alternating current (AC). Therefore, it must be located such that a power cord, or an extension thereof, can be extended to the nearest AC outlet. Alternate embodiments of receiver means 30 may be powered by battery, or may include battery backup means to supply power to receiver means 30 in the event of a power failure.

Figure 10:
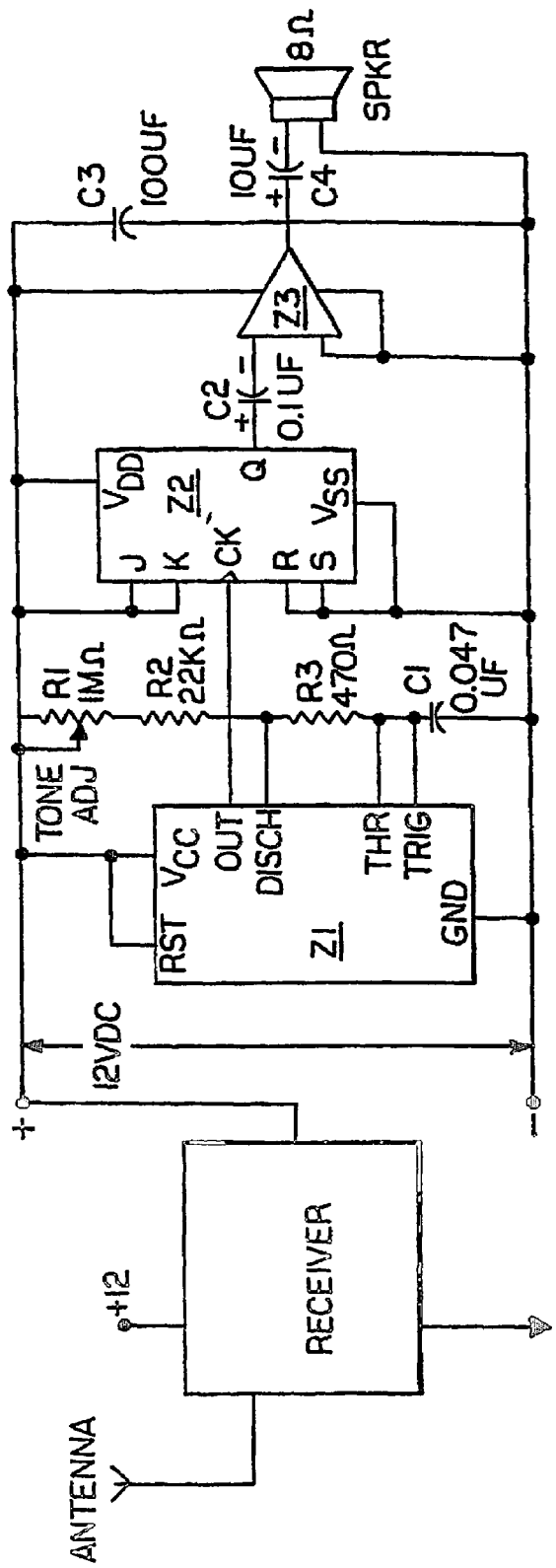
FIG. 10 is a schematic diagram of one embodiment of a receiver means according to the present invention.

In a preferred embodiment, receiver means 30 is a commercially available BLACK WIDOW receiver unit, or similar units, which may be purchased off-the-shelf from various electronics supply companies such as Whitney Electronics or Holsfelt Electronics. An AC adapter such as that depicted at 26 in FIG. 1 may be used to provide the correct operating voltage for receiver means 30. In a preferred embodiment of the present invention a BLACK WIDOW RF receiver Model #2.CL manufactured by LCD Co. of California was used as a receiver. FIG. 10 shows a schematic diagram, of a type well understood by those of ordinary skill in the electronics arts, of a receiver unit suitable for use in the present invention.

Returning to FIG. 1, the system of the present invention may also include a remote control unit 40 which may be purchased from the same source as receiver means 30. Remote control unit 40 controls the operating state of receiver means 30, That is, the remote control unit 40 may be used to electronically enable or disable receiver means 30 such that the security response of receiver means 30 to the signal transmitted by retractable wire 22 can be controlled. The remote control unit 40 preferably includes a panic button which, when depressed or otherwise enabled, transmits a signal which instantly activates the alarm function of receiver means 30. The means for activating can be a switch 27 which may be operated by hand to cause the remote control unit 40 to activate the alarm signal, or to discontinue the alarm signal after it has been activated by either the predetermined signal or the remote control unit 40 itself.

This feature serves as a "panic" button, i.e., a means of triggering the alarm signal security response within receiver means 30 to attract attention or call for aid in the presence of other emergencies. When it is desired to discontinue the alarm signal, switch 27 may be set to a position which causes the previously activated alarm signal to stop. Such remote control units and receivers are well known in the electronic arts and are commonly used in other electronics applications. Accordingly, the remote control unit 40 is also readily available from commercial sources and may be purchased and utilized in the system of the present invention "off-the-shelf." The transmitter circuit of the remote control unit 40 may be used as a model for transmitter 4 (FIG. 9) of the movement detecting and signal transmitting means 20 of the present invention such that both transmit the proper signal for receiver means 30.

This feature may also serve as a means of testing the system 10 to determine its operational status, i.e., ready to operate (or armed), or malfunctioning. If switch 27 is manually set by the operator to a position designed to activate the alarm signal within receiver means 30, and no alarm signal is produced, a malfunction condition is present. If the alarm signal within receiver means 30 is produced, the system 10 may be considered "armed" or ready to operate.

Once system 10 is configured as desired, i.e., each movement detecting and signal transmitting means 20 is positioned on a corresponding object whose motion is to be detected, and receiver means 30 is armed, any movement of window 25 or door 24 will cause a predetermined signal to be radiated from movement detecting and signal transmitting means 20 and wirelessly transmitted to receiver means 30. Receiver means 30 will receive the transmitted predetermined signal and provide its alarm signal security response. In the embodiment shown, the alarm signal is an audio signal provided through one or more speakers located within receiver means 30.

Turning now to FIG. 2 there is shown a perspective view of movement detecting and signal transmitting means 20, including casing 31, switch 33, retractable wire affixing means 28 and retractable wire 22. Casing 31 may include an opening 35 for allowing visible light, as from a lamp or an LED 32, to be seen by the naked eye. The illumination of such a lamp, or light emitting means, gives an operator a visible indication of the operational status of movement detecting and signal transmitting means 20.

Casing 32 further includes a slotted opening 41 through which retractable wire 22 and retractable wire affixing means 28 may be disposed. This allows flexibility in positioning retractable wire 22 on an object relative to the position of movement detecting and signal transmitting means 20.

FIG. 3 shows a cross sectional view of the movement detecting and signal transmitting means depicted in FIG. 2, taken along lines 3-3 of FIG. 2. Casing 31 surrounds the internal components. The major internal components of movement detecting and signal transmitting means 20 are: an electronic circuit board 52, a rotatable frame 62 for supporting magnet means 54, a supporting base means 34 and a rear panel 66. Rotatable frame 62 includes a channel means 64, wherein retractable wire means 22 may be disposed, and wrapped around rotatable frame 62. Also shown is spring means 58 (best illustrated in FIG. 8) for maintaining constant tension on wire means 22 as wire means 22 is pulled closer, or further from casing 31. The foregoing components are coupled together by pin means 60 (best illustrated in FIGS. 7 and 8).

As shown in FIG. 4 retractable wire means 22 is in communication at one end with rotatable frame 62. Rotatable frame 62 includes one or more movable magnets 54, preferably opposite pole magnets which are spaced from each other and disposed within rotatable frame 62. The preferred embodiment includes 8 such magnet means 54 spaced equidistantly from each other around rotatable frame 62. Magnet means 54 may be of a type commonly available commercially from sources such as Radio Shack. One such magnet means suitable for use in a preferred embodiment of the present invention is a common ⅛" diameter earth magnet available from Radio Shack, part number 64-1895.

Rotatable frame 62 is preferably a circular supporting frame which is provided with a central opening 70' (see FIGS. 7 and 8) about which rotatable frame 62 rotates. Rotatable frame 62 is adapted to include a channel 64 for receiving retractable wire 22. Channel 64 extends about the circumference of rotatable frame 62 and allows retractable wire 22 to be wrapped about rotatable frame 62 in a manner similar to that of a string wrapped around a yo yo. The end of retractable wire 22 that is in contact with rotatable frame 62 may be affixed to rotatable frame 62 by traditional means such by knotting the end of retractable wire 22 and inserting it into a notch within channel 64, or by wrapping and tying one end of retractable wire 22 securely around channel 64. Retractable wire 22 must be secured such that slippage of retractable wire 22 within channel 64 is avoided. Other means of securing one end of retractable wire 22 within channel 64 will be readily apparent to those skilled in the art.

Magnet means 54 may be inserted into openings (not shown) in rotatable frame 62 and held in place by means of glue, or other suitable affixing means. The openings into which magnet means 54 are inserted should provide a snug fit for magnet means 54 such that movable magnet means 54 will remain securely in place throughout the life of system 10.

FIGS. 7 and 8 show exploded views from the top and bottom, respectively, of movement detecting and signal transmitting means 20. As shown in the figures, case 31 and rear panel 66 enclose the components of movement detecting and signal transmitting means 20. On/off switch 33 provides a means for connecting and disconnecting power from battery 44 from the components residing on electronic circuit board 52. Battery 44 may be a common 9V battery of a size suitable for disposition within case 31. Other battery means, such as miniature batteries, may be utilized to construct smaller embodiments of the present invention. Such means will be readily apparent to those skilled in the art.

Electronic circuit board 52 includes means 56 for detecting movement of movable magnet means 54. Means 56 for detecting movement of movable magnet means 54 may be a magnetic field sensor such as a KMZ10B available from Phillips Semiconductors. A schematic diagram of a type readily understood by those skilled in the electronics arts illustrating a preferred circuit connection for means 56 for detecting movement, is provided in FIG. 9.

The circuit depicted in FIG. 9 operates generally as follows. When the object whose movement is to be detected moves in any direction, retractable wire 22 either extends or retracts (as best depicted in FIG. 1). When the object moves toward movement detecting and signal transmitting means 20, retractable wire 22 recoils toward movement detecting and signal transmitting means 20, and vice versa.

As retractable wire 22 moves, movable magnets 54 rotate. When movable magnet means 54 are displaced from their resting position, a change in the magnetic field surrounding movable magnet means 54, with respect to magnetic field sensor 56 occurs. FIG. 6 shows two rotatable magnet means 54 in one possible resting position with respect to magnetic field sensor 56. FIG. 5 shows movable magnet means 54 as they move in direction 45, as shown by the arrow, past magnetic field sensor 56. It is the change of the position of movable magnets relative to magnetic field sensor 56 which is detected by magnetic field sensor 56.

Returning to FIG. 9, magnetic field sensor 56 senses the change in the magnetic field and provides a signal representing the change, to comparator 1, in this case a common LM 741. The output of comparator 1 causes relay 2 to energize closing contact 3 and enabling battery power to operate radiating means, i.e., transmitter 4. The circuitry of transmitter 4 can be any available transmitter configuration known in the art which is capable of transmitting a signal through retractable wire 22 and which can be configured to fit on transmitter circuit board 52.

Transmitter 4 generates a predetermined signal which is in turn radiated and wirelessly transmitted to receiver means 30. In a preferred embodiment, the output of transmitter 4 is coupled to wire means 22, which serves as a transmit antenna. Retractable wire 22 can be a suitable length of wire, cable, or any other electrically conductive material.

Figure 9:
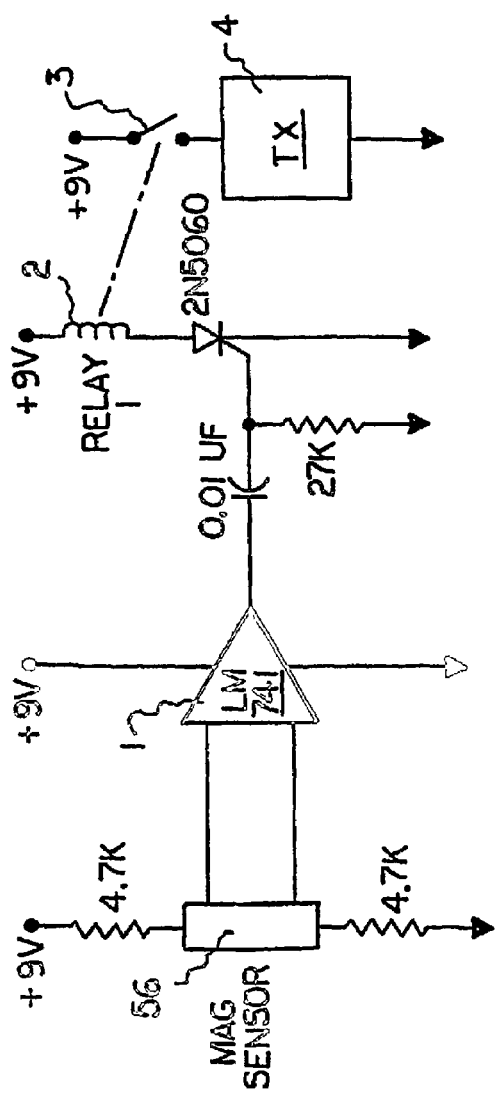
FIG. 9 is a schematic diagram of one embodiment of a signal transmitting means in the movement detecting and signal transmitting means of FIG. 2.

As will be readily appreciated by those skilled in the art, electronic circuit board 52, as embodied in the circuit diagram circuit of FIG. 9 has many equivalents. It is not intended that the invention be limited to the particular circuit depicted in FIG. 9.

Returning now to FIGS. 7 and 8 electronic circuit board 52 may also include a lamp 32 which illustrates when switch 33 is turned to the "on" position and power from battery 44 is applied to the electronic components residing on circuit board 52. Electronic circuit board 52 is adapted to include openings 47 through which fastening means 43, which may be conventional screws, are passed as shown.

Rotatable frame 62, including retractable wire channel 64 and magnet means 54 is located beneath electronic circuit board 52. Rotatable frame 62 includes a central opening 70 through which central fastening means 60 is passed. Beneath rotatable frame 62 lies supporting base means 34 which is adapted to include a central threaded opening 72' for receiving the threaded end of central fastening means 60. Threaded nuts 42 receive fastening means 43, and act as spacers to hold electronic circuit board 52 sufficiently distant from supporting base means 34 to allow rotatable frame 62 to rotate. In this manner circuit board 52, rotatable frame 62, and supporting base means 34 are coupled together such that rotatable frame 62 may rotate freely about central fastening means 60.

FIG. 8 shows spring means 58 as it appears coiled around the interior of rotatable frame 62. Spring means 58 is secured at one end to supporting base means 34 by means of pin 48. Spring means 58 is thereby positioned to maintain tension on retractable wire means 22, as rotatable frame 62 rotates. Thus spring means 58 provides the retraction mechanism for retractable wire means 22.

In accordance with the portability aspect of the present invention, the above-described structure has been modified as follows. First of all, rear panel 66 of casing 31 (FIGS. 3 and 8) has pressure-sensitive adhesive strips 70 thereon which can be pressed into firm engagement with a window sill or door jamb (FIG. 1) and which will leave no marks when removed. Strips 70 are marketed under the trademark COMMAND of the 3M Company. The 3M COMMAND strips 70 have pressure-sensitive adhesive on both surfaces. One surface adheres to rear panel 66 and the other surface adheres to the fixed surface proximate the object whose movement is to be detected. Tabs 80 of strips 70 extend outwardly beyond panel 66 and they do not have any adhesive on their opposite sides. After the panel 66 has been adhesively secured to a surface and it is desired to demount the movement detecting and signal transmitting means 20, it is merely necessary to grasp each tab 80 and pull it away from panel 66 in the direction of the longitudinal axis of each strip and substantially parallel to the surface of panel 66. This will release the strips 70 from the surface on which the means 20 is mounted and it may also release them from panel 66. Strips 70 preferably are applied to the rear panel 66 every time the means 20 is to be mounted. Any other suitable pressure-sensitive adhesive may be used. The main objective is that the mounting causes the movement detecting and signal transmitting means 20 to be firmly mounted in a manner such that it will not move while mounted but which permits it to be removed so that it can be transported to another location.

In accordance with the present invention, the retractable wire-affixing means 28a of FIG. 11 includes a disc 71 affixed to the outer end of wire 22 and an anchor member in the form of cup member 72 having pressure-sensitive adhesive 73 mounted on its underside which is covered by release paper 74. Cup member 72 also includes a cover 75 which is connected to cup member 72 by a molded hinge 76. The cover has a disc-like protrusion 77 having an outer edge which fits in tight engagement with the inner wall 78 of cup-like member 72 when the cover is in a closed position. The cup member 72 is a commercial product sold under the trademark CROWN BOLT of the Crown Bolt, Inc. company of Cerritos, Calif., except that it does not have the pressure-sensitive adhesive thereon, which has been added in accordance with the present invention. It will be appreciated that other types of anchor members can be used instead of a cup member 72. Such devices may include a small hook or post mounted on a base having pressure-sensitive adhesive thereon in an analogous manner similar to adhesive 73. Also, as an alternative, disc 28 may have a hole therein so that it is essentially a ring which may be mounted on a simple post having a base with pressure-sensitive adhesive thereon, as noted above. Also, the post may have a bulbous outer end so that it looks like a collar button. Also, if desired, the outer end of wire 22 may be formed in a loop which may be placed on a post or hook. In fact, any suitable arrangement can be used wherein a small unobtrusive member, such as the foregoing anchor members, may be securely fastened to the member whose movement is to be detected and an attachment member may be formed on the end of the wire 22 which can be removably fastened to the small unobtrusive member.

In use, the cup anchor member 72 is securely adhesively affixed to an object whose movement is to be detected, such as a window or door, as shown by wire-affixing means 28 of FIG. 1, after the release paper 74 has been removed from pressure-sensitive adhesive 73. Thereafter, while the cover 75 is in the position shown in FIG. 11, the disc 71 at the end of wire 22 is inserted into the cavity of cup 72 and the lid 75 is closed. The other types of anchor members can be used as alternates to the cup anchor member. Thus, the system is in a position to operate as described above.

When the person who has temporarily used the portable system desires to leave the place where the system has been installed and take the portable system with him, he need merely deactivate the system and thereafter open lid 75 to remove disc 71 and permit wire 22 to retract disc 71 back to a position wherein it abuts the casing 31. The cylindrical cup 72 is merely left in position on the window or door jamb, and it is substantially unobtrusive inasmuch as its overall diameter is only about ⅜" and its height is about ¼". The other types of anchor members described above may also be left where they were adhesively secured to the movable member.

As noted above, the system of the present invention can be carried in a brief case, purse or overnight case from place to place. In this respect, the total weight of a preferred embodiment is approximately 20 ounces, and it has a volume which occupies a very small portion of a brief case, suitably sized purse or a suitcase.

While the foregoing portion of the specification has designated wire 22 as being an antenna, it will be appreciated that a suitable antenna may be incorporated within housing 31 and the element 22 may be a suitable high strength string-like member made of suitable plastic or any other suitable material.

Figure 12:
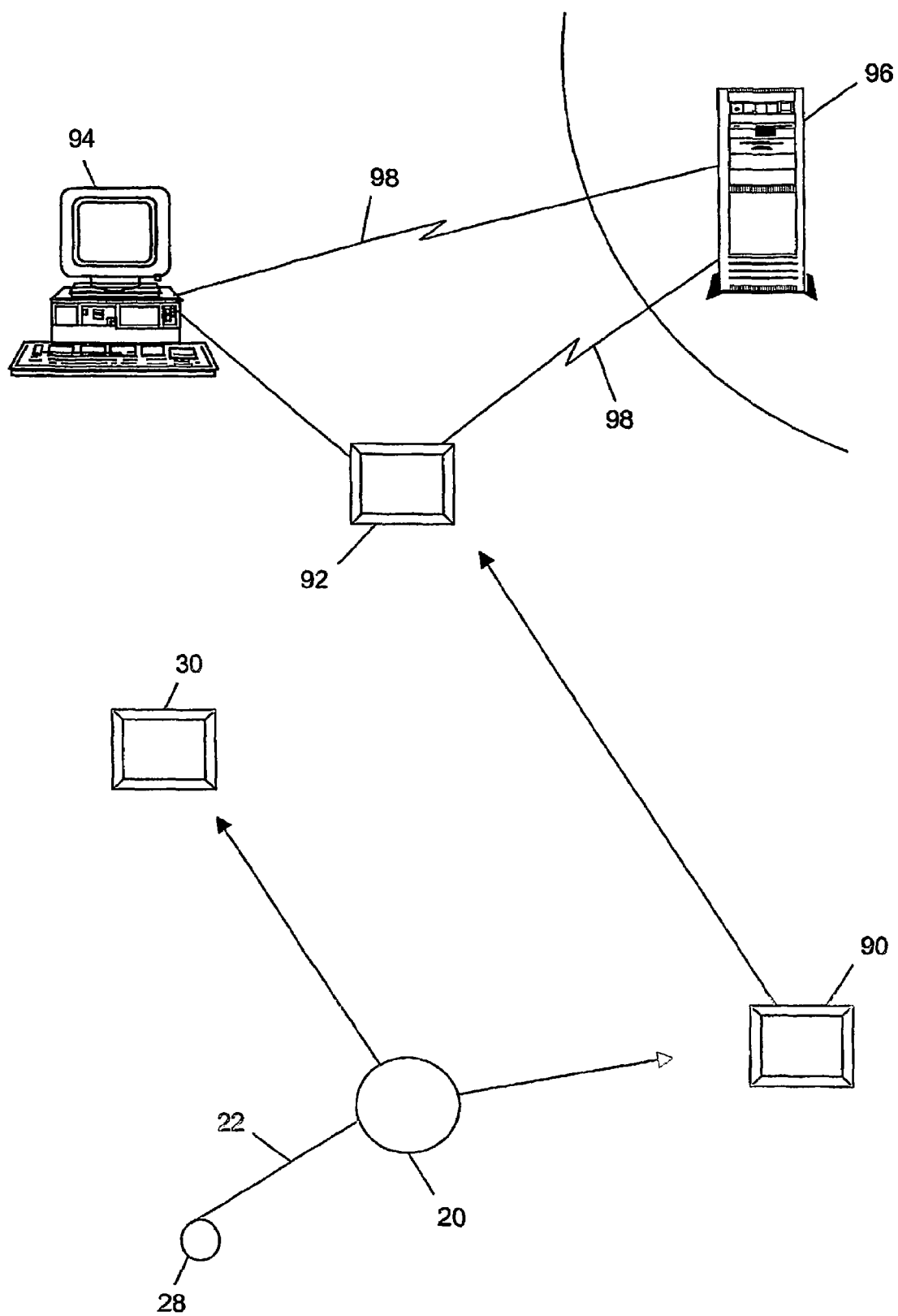
FIG. 12 is a functional block diagram showing an alarm system according to another embodiment of the present invention that includes a remote notification device and an information gathering device.

Turning now to FIG. 12, an enhanced version of the alarm system 10 is shown wherein motion detection information is collected in response to the detection of movement and provided to a remote facility, such as a law enforcement or security agency. FIG. 12 functionally illustrates several of the components discussed above relative to FIGS. 1-11; namely, the above-described movement detecting and signal transmitting means 20, the retractable wire 22, the retractable wire affixing means 28, and the receiver means 30. FIG. 12 further illustrates an information gathering device 90 and a remote notification device 92. Also shown is an optional computer platform 94. A remote network computer host is further represented at 96. It will be seen that the remote notification device 92 communicates with the network computer host 96, either directly or through the optional computer platform 94, via communication links 98.

Figure 13:
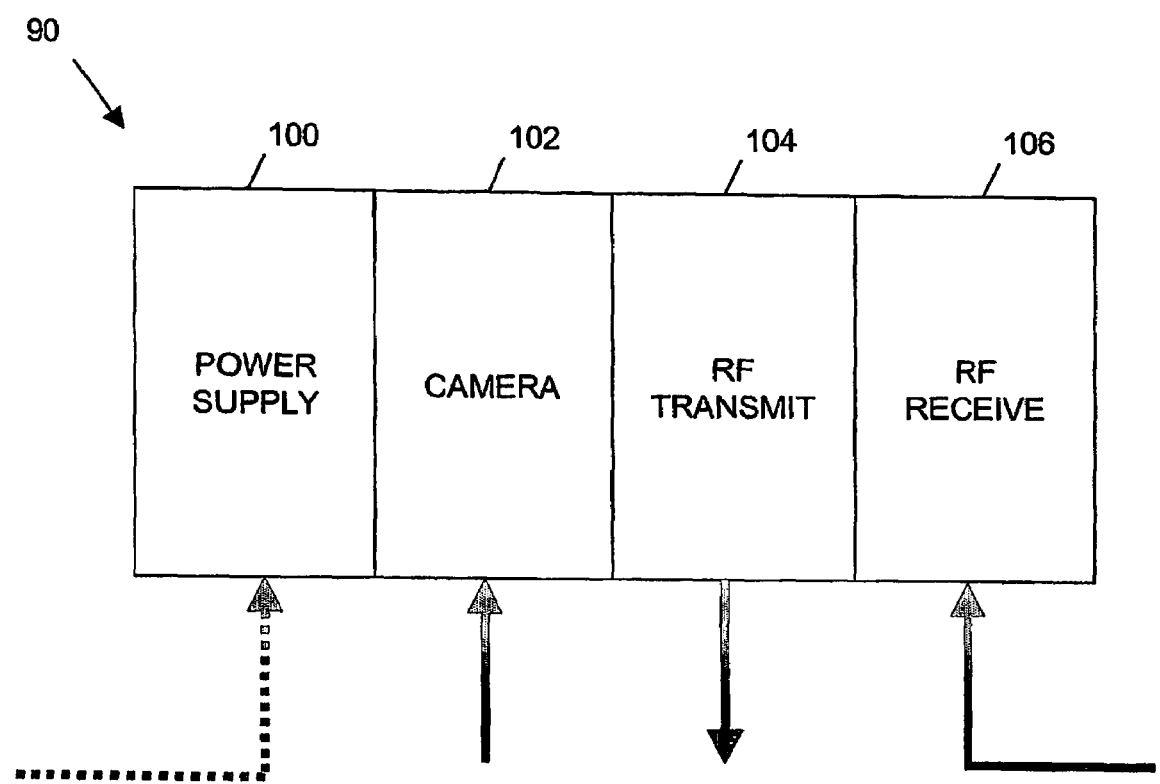
FIG. 13 is a detailed functional block diagram showing details of the information gathering device of FIG. 12.

In preferred embodiments of the invention, as shown in FIG. 13, the information gathering device 90 comprises a D.C. power supply 100, a camera 102, an RF transmitter 104, and an RF receiver 106. The power supply 100 can be constructed using any suitable constant voltage source, including a rechargeable battery or an AC/DC transformer. A voltage level of 12 Volts should be sufficient to power the information gathering device 90. The camera 102 preferably has low lumen capability and the ability to capture live video images or sequential still images at a selectable frame rate. The camera 102, moreover, should be small and unobtrusive. For video images, the camera 102 will typically be an analog device. For still images, the camera 102 can be implemented as a digital device. In that case, the camera will include a memory implemented using a conventional RAM (Random Access Memory) or flash memory chip (or plug-in card). A memory size of about 16 MB (MegaBytes), expandable to 256 MB, should be sufficient for this purpose. The RF transmitter 104 is adapted to transmit image information captured by the camera 102. If the camera 102 is an analog device, such as an analog video camera, the RF transmitter 104 will transmit analog RF signals. If the camera 102 is a digital device, such as a digital still camera, the RF transmitter 104 will transmit digital RF signals or analog RF signals following digital-to-analog conversion of the camera images.

It will be appreciated that there are a number of commercially available surveillance products that can be used to implement the power supply 100, the camera 102 and the RF transmitter 104. One such product is the Xcam2™ video camera kit available at the www.X10.com Internet website. This product integrates a color analog video camera that can transmit live color video (and audio) signals up to 100 feet, a microphone (for audio signal generation), and a 2.4 GHz. transmitter into a single device of relatively small size.

The RF receiver 106 can be implemented using the RF receiving circuit components of the previously-described receiver means 30 (see e.g., FIG. 10). It is tuned to receive RF transmissions from the signal transmitting means 20, and in particular, the predetermined signal sent by the signal transmitting means 20 in response to movement of the retractable wire affixing means 28.

The remote notification device 92 can be implemented in several ways according to preferred embodiments of the invention. In one embodiment, shown in FIG. 14A, the computer 94 is used. The remote notification device of this embodiment, designated by reference numeral 92A, is a unit that includes an RF receiver 112 and a suitable output 110 (e.g., a USB port, serial connector, or other suitable interface) for feeding information received from the information gathering device 90 to the computer 94. Power may be received from the computer 94 via a suitable power input (not shown), or the device 92A may include its own power supply 114. The latter may be a rechargeable battery or an AC/DC transformer. The RF receiver 112 operates at the frequency of the RF transmitter 104 in the information gathering device 90. It is adapted to receive and process either analog or digital transmissions, depending on the nature of the RF transmitter 104.

Figure 14A:
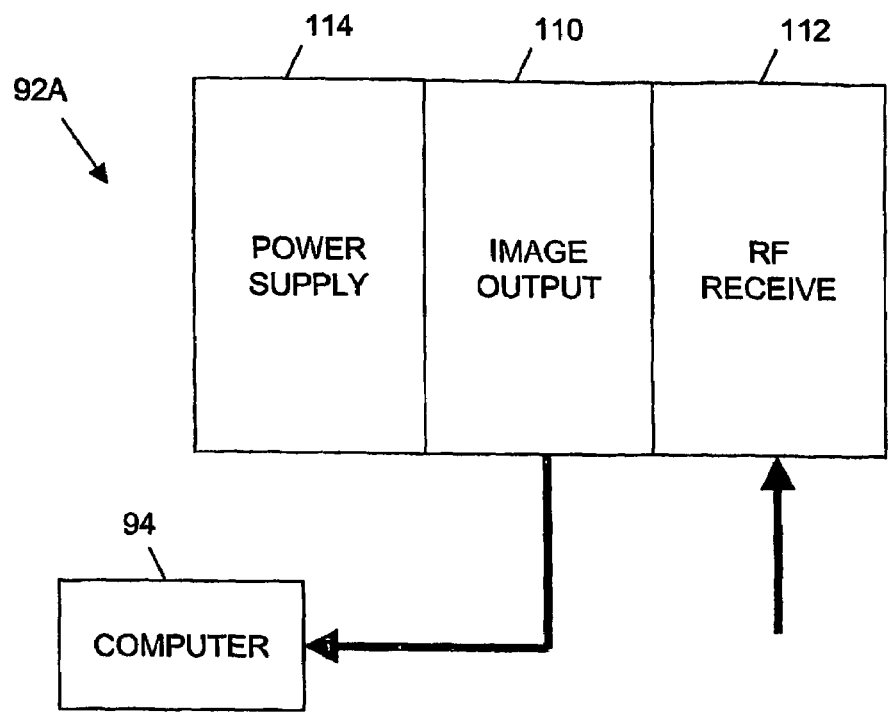
FIG. 14A is a detailed functional block diagram showing details of a first embodiment of the remote notification device of FIG. 12.

In the embodiment of FIG. 14A, the computer 94 includes a network interface (e.g., an analog or digital modem, an Ethernet card, or other suitable device) and appropriate control software. In particular, the software must be capable of establishing/maintaining a connection to the remote host 96 and forwarding information thereto that is received from the information gathering device 90. The XRay Vision Internet Kit™ available at the aforementioned www.X10.com Internet website is one product that can be used to implement the remote notification device 92A according to the instant embodiment. This product includes an integrated RF receiver and USB converter to capture and manage images received from the X10™ wireless video camera referred to above. Software that is provided with the product is adapted to operate on the computer 94 and forward the images received by the remote notification device 92A to any suitable remote network host, either in real time if the remote host is so equipped, or via e-mail.

Figure 14B:
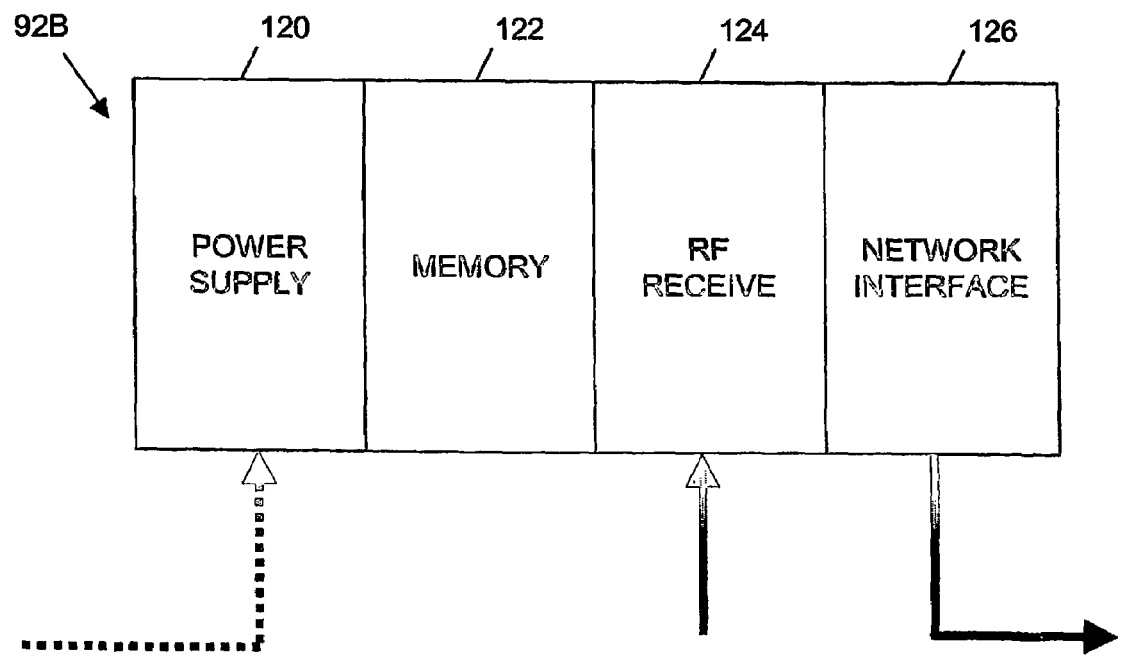
FIG. 14B is a detailed functional block diagram showing details of a second embodiment of the remote notification device of FIG. 12.

In a second embodiment of the remote notification device 92, shown in FIG. 14B, the device, referred to by reference numeral 92B, is a stand-alone unit that does not require the computer 94. It includes a D.C. power supply 120, a memory 122, an RF receiver 124, and a network interface 126. The power supply 120 can be constructed using any suitable constant voltage source, including a rechargeable battery or an AC/DC transformer. A voltage level of 12 Volts should be sufficient to power the remote notification device 92. The memory 122 can be implemented using a conventional RAM or flash memory chip (or plug-in card). A memory capacity of about 4 to 16 MB, expandable to 256 MB or more, should be sufficient for the remote notification device 92. The RF receiver 124 operates at the frequency of the RF transmitter 104 in the information gathering device 90. It is adapted to receive and process either analog or digital transmissions, depending on the nature of the RF transmitter 10. The network interface 126 can be implemented using a conventional analog modem, a digital modem (e.g., ISDN), or an Ethernet card, any of which are connected or connectable to a data network, such as the public Internet. A wireless interface such as a cellular transmitter/receiver adapted to communicate cellular digital packet data could also be used. The interface might alternatively comprise a Bluetooth or Home RF (e.g. Wi-Fi (IEEE 802.11b)) device that communicates over an air interface with another local device (e.g., a computer or cellular telephone) containing any of the foregoing network interface devices.

Figure 14C:
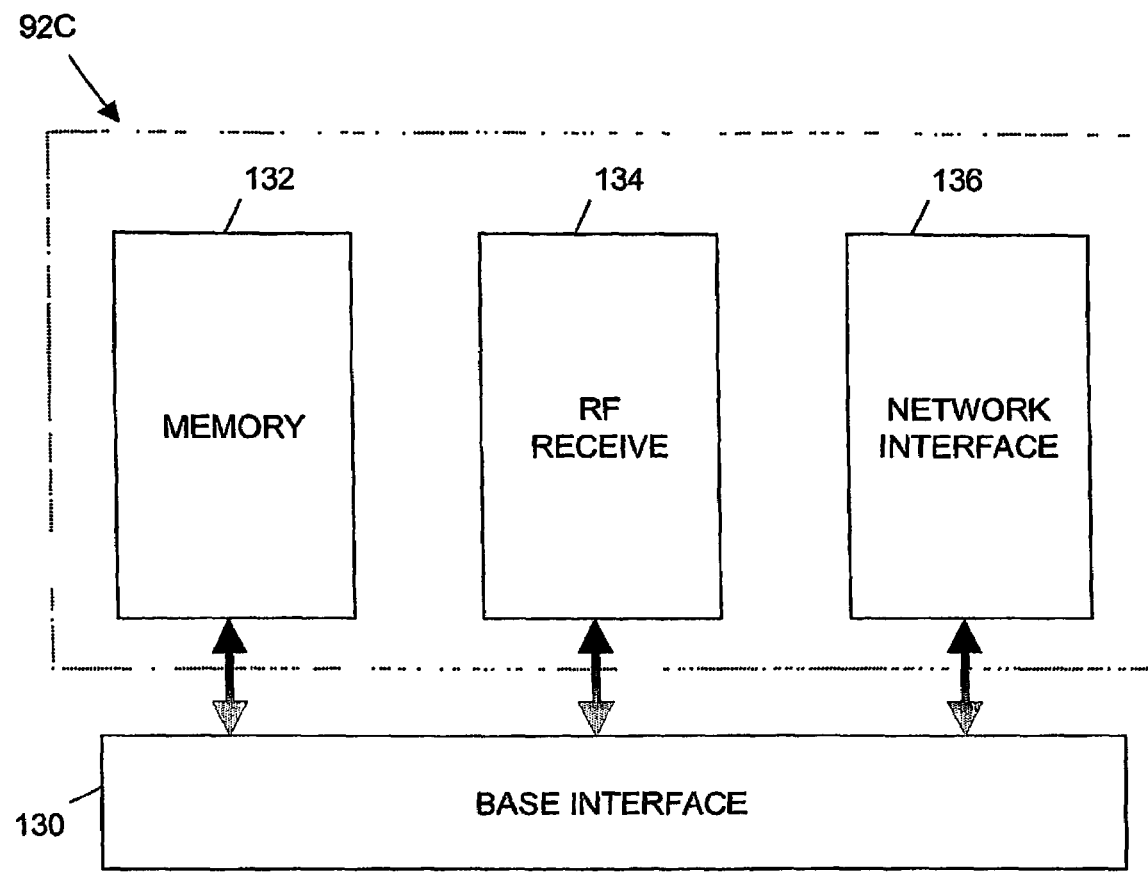
FIG. 14C is a detailed functional block diagram showing details of a third embodiment of the remote notification device of FIG. 12.

In a third embodiment of the remote notification device 92, shown in FIG. 14C, the device, referred to by reference numeral 92C, comprises various functional devices that plug in as modules to a suitable base interface 130. If the base interface 130 is a computer, the plug-in modules could be implemented as PC or PCMIA cards. Other base interfaces include the DVi family of set top devices from Motorola Corporation. In either case, the plug-in modules could include a memory module 132, an RF receiver module 134, and a network interface module 136. Power for these modules would be typically provided by the base interface 130. The memory module 132 can be implemented using a conventional RAM or flash memory chip (or plug-in card). A memory capacity of about 4 to 16 MB, expandable to 256 MB or more, should be sufficient for the remote notification device 92C. The RF receiver module 134 operates at the frequency of the RF transmitter 104 in the information gathering device 90. It is adapted to receive and process either analog or digital transmissions, depending on the nature of the RF transmitter 104. The network interface module 136 can be implemented using a conventional analog or digital modem, an Ethernet card, or any other suitable device.

Figure 15:
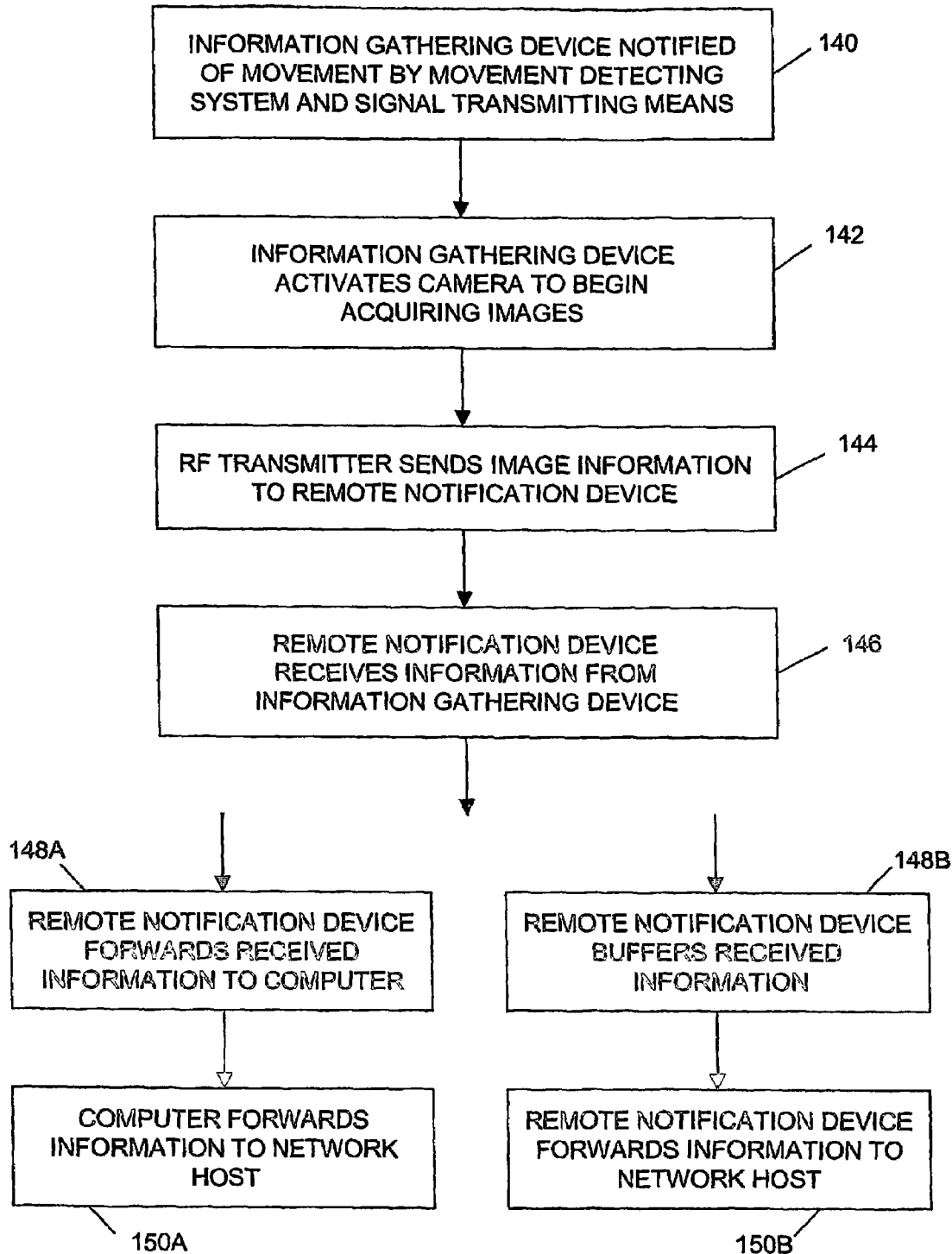
FIG. 15 is a flow diagram showing operational steps performed by the information gathering and remote notification devices of FIG. 12.

Referring now to FIG. 15, the operation of information gathering device 90 and the remote notification device 92 will now be described. In step 140, the information gathering device 90 is notified of a movement event by receiving (at the RF receiver 106) a predetermined signal from the movement detecting and signal transmitting means 20. The information gathering device then activates its camera 102 to begin acquiring pictures in step 142. The camera 102 is preferably aimed at the vicinity of the retractable wire affixing means 28, such that the cause of the movement will be viewable. In step 144, the RF transmitter 104 begins sending image information to the remote notification device 92. If the information gathering device also includes a microphone, the RF transmitter 104 will also send audio information to the remote notification device 92.

In step 146, the remote notification device 92 receives the information transmitted by the information gathering device at its RF receiver 106/112/124 (see FIGS. 14A, 14B, and 14C, respectively). If the remote notification device is implemented according to FIG. 14A, it forwards the received information to the computer 94 in step 148A. The computer 94 then establishes a network connection, as necessary, and forwards the information to the remote host 96 in step 150A. If the remote notification device is implemented according to FIGS. 14B or 14C, it buffers the received information in its memory 122/132 in step 148B. In step 150B, the remote notification device establishes a network connection, as necessary, and forwards the information to the remote host 96.

The remote host 96 can be implemented as an Internet host that responds to the information received from the remote notification device 92 as either an information processing point or a store-and-retrieval point. For example, the host 96 might be a server at a security agency that displays the received information on a monitor for viewing by a security agent. Alternatively, the information could be forwarded, via email or the like, to the owner of the premises where the system 10 is located, or elsewhere. Still further, the host 96 might itself be an email server that receives the information from the remote notification device 92 as an attachment to an email addressed to the owner of the premises under surveillance, or elsewhere.

Turning now to FIGS. 16-20, an additional optional aspect of the invention will be described that allows object identification information to be provided locally and/or remotely to a designated location, such as a subscriber's forwarding telephone number, a law enforcement agency, or a security agency. In this way, when a subscriber's movement detecting and signal transmitting means 20 is triggered, a meaningful description of the object to which the device was attached can be provided as part of the security response implemented by the receiver means 30.

Figure 16:
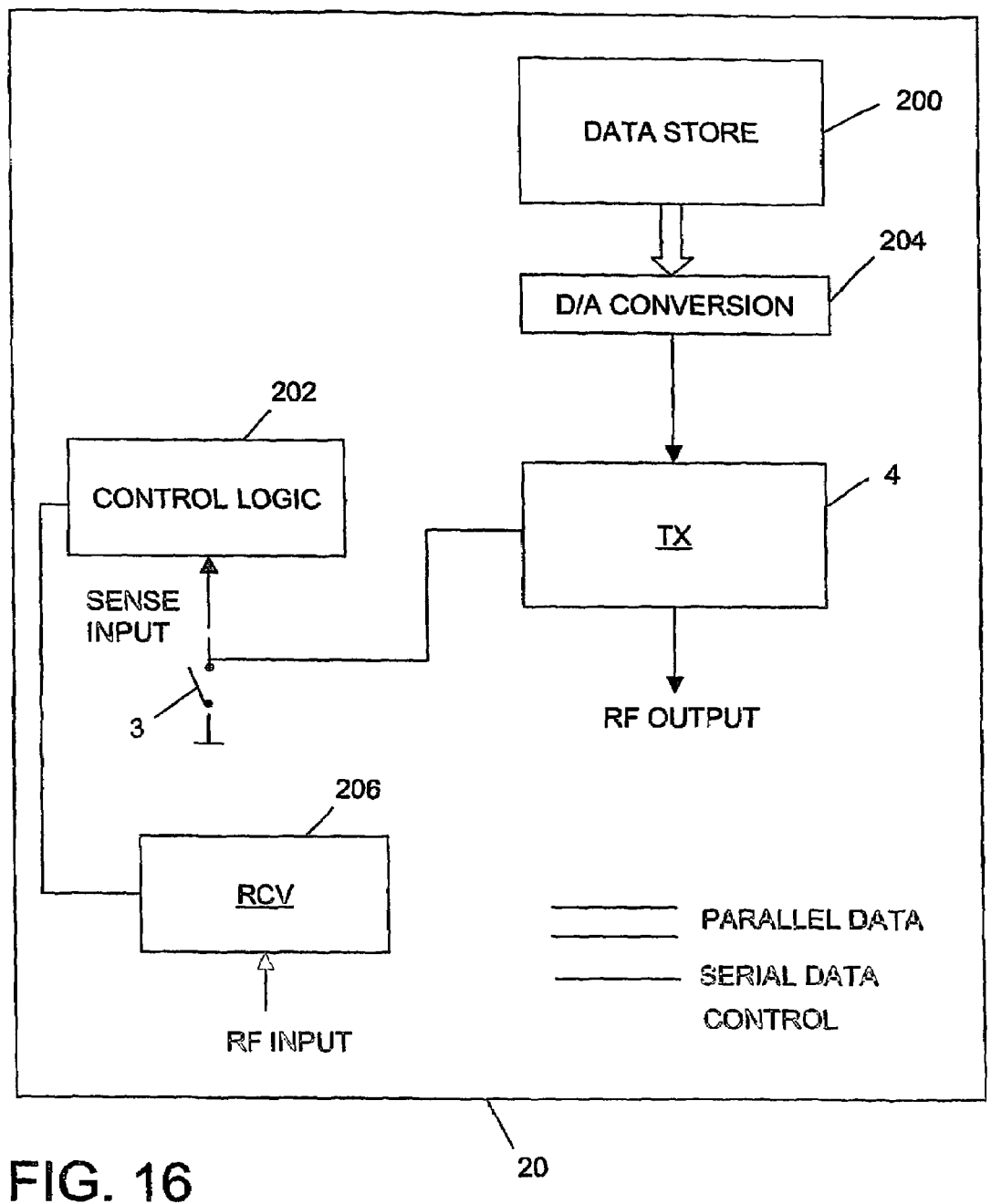
FIG. 16 is a detailed functional block diagram showing optional aspects of the movement detecting and signal transmitting means according to the present invention.

In FIG. 16, the movement detecting and signal transmitting means 20 of FIG. 9 is shown with additional components that allow it to store a unique identifier, such as a digital code word, and then wirelessly transmit the identifier to the receiver means 30 (see FIG. 1) whenever the object whose movement is to be detected is displaced from a predetermined position. In the exemplary design of FIG. 16, the unique identifier is stored in a data store 200 of suitable size. By way of example only, the data store 200 can be implemented using a flash ROM or RAM memory chip (or plug-in card) whose size is based on the required size of the unique identifier. For example, if the unique identifier is a product serial number comprising "n" ASCII characters, the data store can be implemented as an "n×8" memory array, as an "n/2×16" memory array, as an "n/4×32" memory array, and so on. Note that the term "unique identifier" does not necessarily require that the identifier be unique relative all other movement detecting and signal transmitting means 20 owned by all subscribers. Rather, in view of certain programmability features described in more detail below, the unique identifier need only be unique with respect to the movement detecting and signal transmitting means 20 owned by one subscriber.

Closure of the switch 3 (as a result of displacement of the object whose movement is to be detected) activates the transmitter 4 and also provides a sense input to a control logic circuit 202. The latter can be implemented in fairly straightforward fashion as a data selector with clocking to facilitate selective (e.g., sequential) output from one or more array locations in the data store 200. Alternatively, to provide a more feature-rich design, the logic circuit 202 could be implemented as a programmable processor. In that event, the data store 200 will preferably contain the processor's control programming code in addition to the unique identifier. A programmable processor implementation of the logic circuit 202 would also facilitate the implementation of other useful functions in the movement detecting and signal transmitting means 20, such as the ability to control the device from the receiver means 30 or some other remote location. Thus, assuming a radio receiver 206 (see FIG. 16) is added to the movement detecting and signal transmitting means 20, or combined with the radio transmitter 4 as a transceiver, the control logic 202 could be remotely programmed via radio control to facilitate a variety of operations, such as polling the device to determine operating conditions, battery states or other useful information, and programming the device to set and/or reset its various operational characteristics.

When the control circuit 202 is activated upon closure of the switch 3, the unique identifier in the data store 200 is transferred to a D/A (Digital-to-Analog) converter 204 and converted to a corresponding analog signal. The analog signal is used to modulate the RF output of the transmitter 4 (see FIG. 9), such that the unique identifier is wirelessly transmitted to the receiver means 30 as an encoded RF signal. Alternatively, the unique identifier could be transmitted in digital form without D/A conversion.

Figure 17:
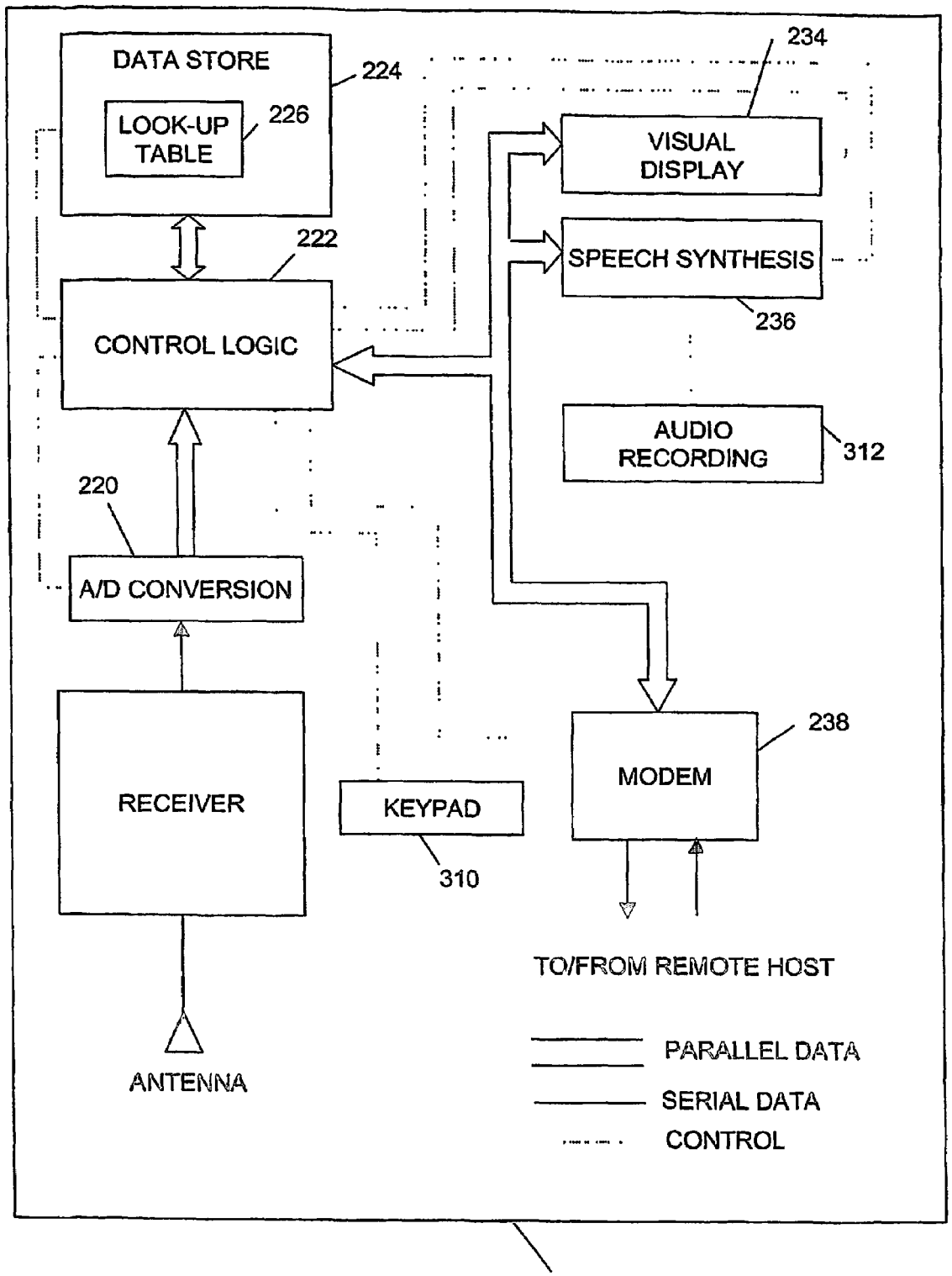
FIG. 17 is a detailed functional block diagram showing optional aspects of the receiver means according to the present invention.

In FIG. 17, the receiver means 30 of FIG. 10 is shown with additional components that allow it to process the encoded RF signal received from the movement detecting and signal transmitting means 20 and convert it to digital form (as necessary) to recover the unique identifier. The unique identifier is then processed (either locally, remotely or both) for conversion to object identification information identifying the object to which the movement detecting and signal transmitting means 20 is attached. Regardless of where the unique identifier is converted, the object identification information can be output locally at the receiver means and/or it can be provided remotely to a forwarding telephone number designated by the subscriber, or to another location such as a law enforcement or security agency.

In the exemplary design of FIG. 17, the receiver means 30 includes the antenna and the receiver of FIG. 10. The receiver is tuned to the frequency of the transmitter 4 in the movement detecting and signal transmitting means 20. It demodulates the encoded RF signal. If the unique identifier is received in analog form, it is forwarded to an A/D (Analog-to-Digital) converter 220 for conversion to digital form. The unique identifier is then provided to a control logic circuit 222. The control logic circuit 222 is preferably implemented as a programmable processor that is associated with a related data store 224 that contains programming code for the control logic circuit. The data store 224 can be implemented using a conventional memory component, such as a flash ROM or RAM memory chip (or plug-in card) whose size is minimally based on the required size of the programming code.

The memory used for the data store 224 may further contain an optional look-up table 226 if it is desired that the receiver means 30 convert the unique identifier locally into object identification information. An exemplary implementation of the look-up table 226 is shown in FIG. 18. This implementation features one or more row entries 228 for matching the unique identifier received from the movement detecting and signal transmitting means 20 with a descriptive word or phrase. Each entry 228 comprises a data set that contains a unique identifier field 230 and a descriptive word or phrase field 232.

By searching the unique identifier field 230 for an entry that matches the unique identifier received from the movement detecting and signal transmitting means 20, the control logic circuit 222 can rapidly correlate the unique identifier with a descriptive word or phrase that identifies the object to which the movement detecting and signal transmitting means 20 is attached. As shown in FIG. 17, the control logic circuit 222 can then output this information locally in visual form to a visual display device 234 (e.g., an LCD), or audibly to a speech synthesizer (e.g. wavetable) device 236, or both. This will permit a person who is physically present within visible or audible range of the receiver means 30 to promptly determine the location of the movement detecting and signal transmitting means 20 that set off the alarm system 10.

The control logic circuit 222 can also be implemented to forward the unique identifier received from the movement detecting and signal transmitting means 20 as part of an alarm alert to a remote security administration system (not shown in FIG. 17) so that an object identification look-up can be performed remotely. As described in more detail below, the security administration system can be programmed to respond to the alarm by sending an alert to a subscriber-designated contact location (e.g., a forwarding telephone number), advising that the alarm system 10 has been triggered and specifying the location of the movement detecting and signal transmitting means 20 that triggered the alert. Additionally, or in the alternative, the security administration system can download the object identification information to the receiver means 30 for output via the visual display device 234 or the speech synthesizer 236. This feature could be used in implementations where the receiver means 30 does not perform local conversion of the unique identifier to object identification information.

A modem 238 in the receiver means 30 can be used for transmittal of the unique identifier via a telephone line to a remote computer host implementing the security administration system. Alternatively, the receiver means 30 could be equipped with a data network interface for connection to the remote computer host via a computer data network, such as the global Internet. The connection could further include any of a cable interface, an Ethernet interface, a radio/cellular interface, etc. that physically interconnects the receiver means 30 to the remote computer host.

Figure 19:
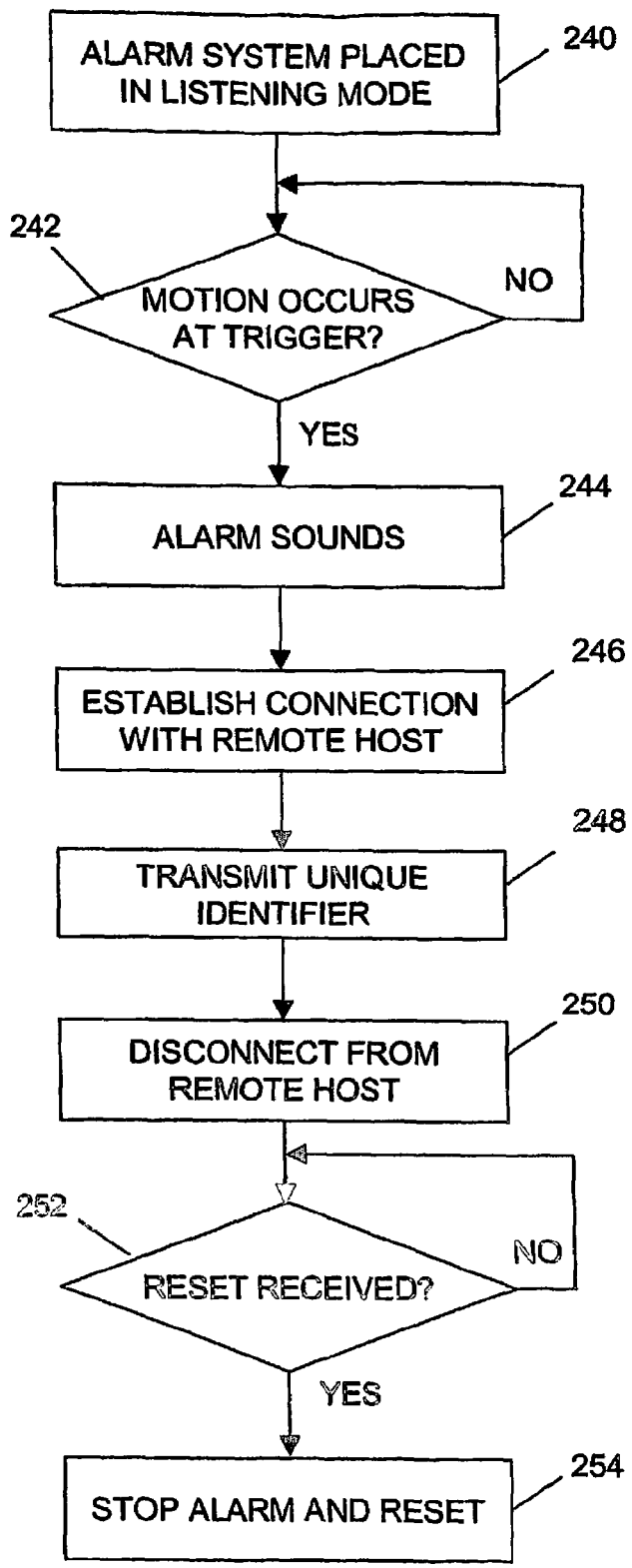
FIG. 19 is a flow diagram showing operation of the alarm system according to the invention.

FIG. 19 is a flow diagram showing operational steps performed by the control logic circuit 222 of the receiver means 30 in an exemplary embodiment in which the unique identifier is transmitted to the security administration system for remote conversion to object identification information. Beginning in step 240, the control logic circuit 222 is placed in a listening mode to await input from one or more movement detecting and signal transmitting means 20 within RF transmission range. In step 242, the control logic circuit 222 waits for input from the one or more movement detecting and signal transmitting means 20. If such input is received, indicating that one of the movement detecting and signal transmitting means 20 has been disturbed, an audible alarm is sounded in step 244 via the circuitry of FIG. 10. In step 246, the modem 220 establishes a connection with the remote computer host. In step 248, the unique identifier is fed to the modem 220 and transmitted to the security administration system. A stored subscriber authentication code is preferably also sent (in advance of sending the unique identifier), so that the receiver means 30 can be identified and validated. The security administration system may then optionally return object identification information if the receiver means 30 is adapted to locally display such information. Otherwise, such information is not returned by the security administration system. In step 250, the modem 220 disconnects from the remote computer host. In step 252, the control logic circuit 222 waits for a reset signal, e.g., from the remote control unit 40 (see FIG. 1). When the reset signal is received, the audible alarm is shut off and the receiver means 30 is reset to standby mode in step 254.

Figure 20:
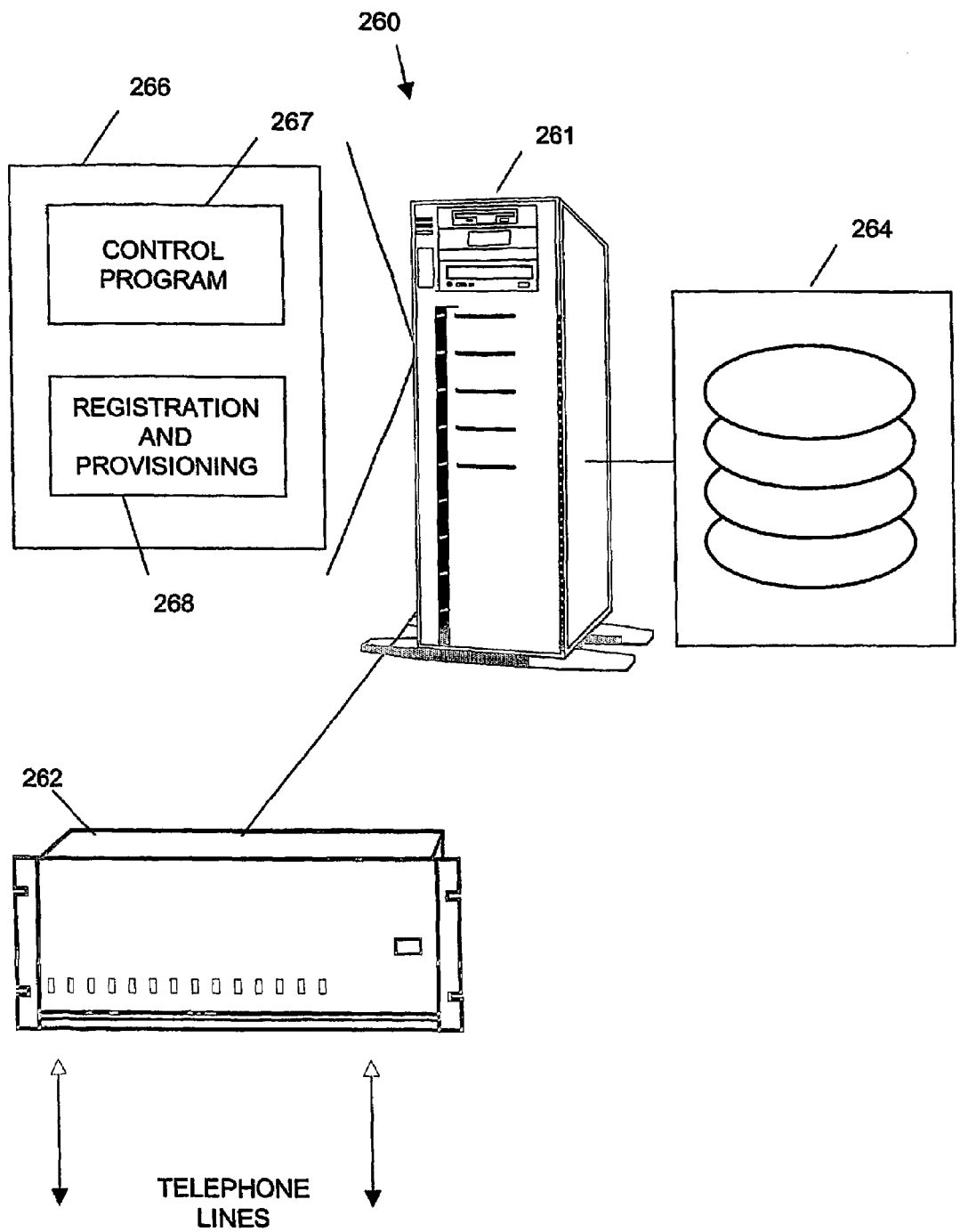
FIG. 20 is a functional block diagram showing optional aspects of a remote security administration system according the present invention.

In FIG. 20, an exemplary security administration system 260 as described above is shown. The security administration system 260 includes a computer host 261 and a modem pool 262 containing plural modems that allow simultaneous connections with multiple alarm systems 10 associated with multiple subscribers. Although not shown, the security administration system 260 may also include a data network interface for communicating with multiple alarm systems 10 via a computer data network, such as the public Internet. It will be appreciated that other types of communication interfaces (e.g., cellular telephone) could also be provided.

There is also connected to the computer host 261 a large capacity data storage resource 264 (such as a storage array, a storage network, etc.) that stores a subscription database containing subscriber information for multiple subscribers. The subscription information includes data sets that may correlate the unique identifiers associated with each subscriber's movement detecting and signal transmitting means 20 with object identification information specified by the subscriber. The subscription information preferably further includes contact information for use in forwarding the object identification information.

The computer host 261 further includes a memory 266 that stores a security monitoring control program 267 for implementing the functionality required to receive and respond to incoming alarm alerts from the receiver means 30 of the multiple alarm systems 10. In addition, the memory 266 preferably further stores a subscriber registration and provisioning program 268 that allows subscribers to register for security service and provision profile information such as user-specified object identification information to be associated with the unique identifiers associated with their movement detecting and signal transmitting means 20. Subscribers are also able to provision contact information that allows the security administration system 260 to contact them or other designated security notification recipients in the event of a security breach.

Figure 21:
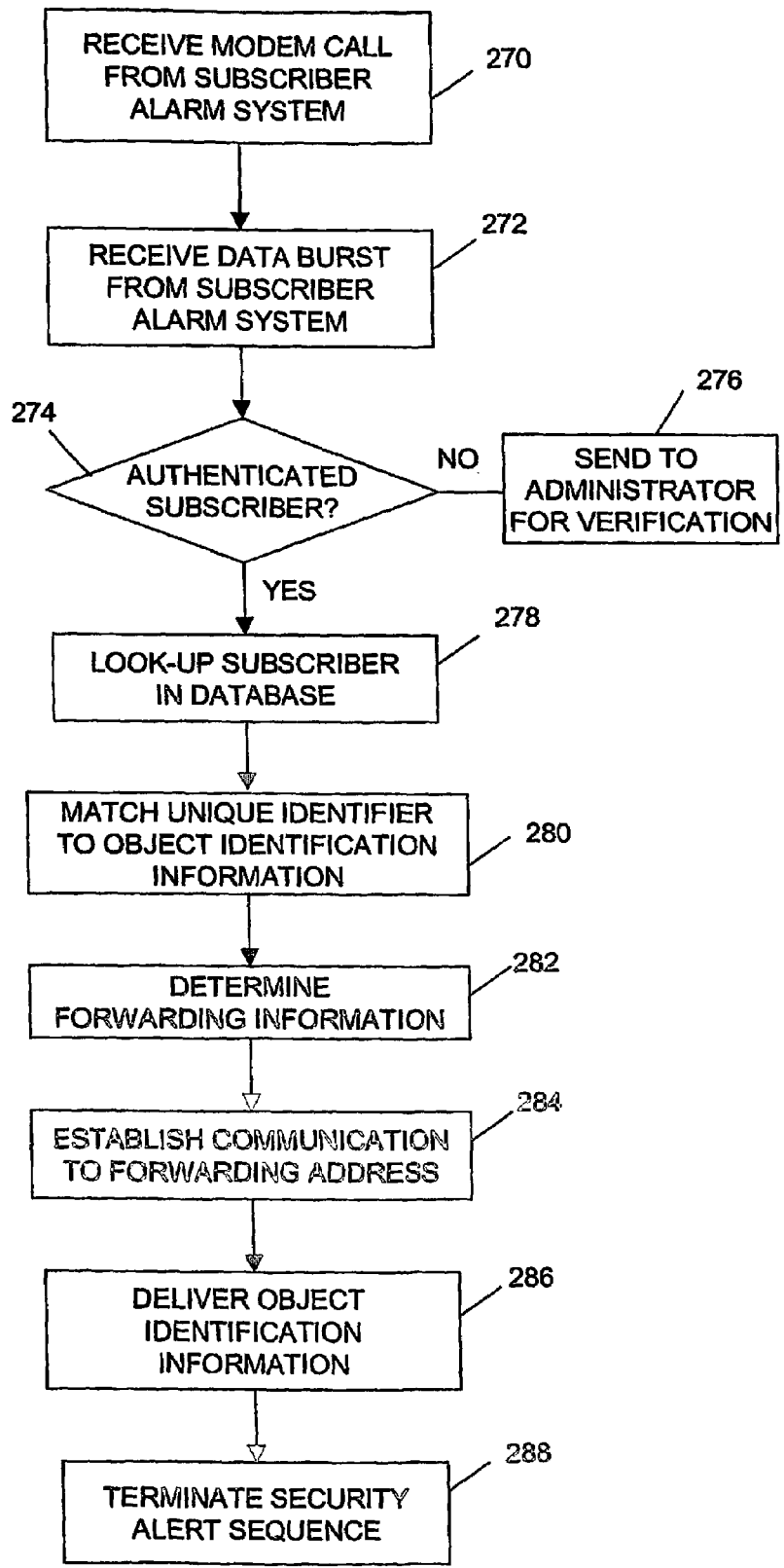
FIG. 21 is a flow diagram showing operation of the security administration system of FIG. 20 during a subscriber registration and provisioning operation.

FIG. 21 is a flow diagram showing operation of an exemplary implementation of the security administration system 260 in response to an alarm alert sent from a receiver means 30. Beginning in step 270, the security administration system 260 receives a modem call from a subscriber's receiver means 30. In step 272, the computer host 261 receives a data burst from the receiver means 30. The data burst includes an authentication code identifying the receiver means 30 and a unique identifier corresponding to the movement detecting and signal transmitting means 20 that was triggered. In step 274, an authentication evaluation is made. If the receiver means 30 fails the authentication test, the authentication code can be sent to an administrator in step 276 for verification. If the receiver means 30 passes authentication, the computer host 261 retrieves the subscriber's subscription information in step 278 from the subscription database of the data storage resource 264. In step 280, the computer host 261 matches the unique identifier received in the data burst with the corresponding profile information (which may include object identification information) provisioned by the subscriber. In step 282, the computer host 261 obtains the subscriber's contact information. This could be a forwarding location associated with the subscriber, such as a voice telephone number, a facsimile telephone number, an email address, an IRC (Internet Relay Chat) address, or otherwise. The forwarding location could also be a law enforcement or security agency. Moreover, as stated above, the forwarding location could also be the receiver means 30 itself if local output of the object identification information is desired.

The computer host 261 then initiates a security alert sequence based on the subscriber's contact information. This sequence includes step 284 in which communication is established as necessary to the forwarding location and step 286 in which the object identification information corresponding to the activated movement detecting and signal transmitting means 20 is delivered. For example, if the forwarding location is a voice telephone number, the object identification information can be delivered as a live or synthesized voice message. For telephone, IRC, email or any other interactive media, the computer host 261 can prompt and hold for a response. For a telephone, the computer host 261 can prompt and hold for a response that represents the call recipient pressing various buttons on his or her telephone in order to connect to a designated emergency service agency or other entity. For example, the number "1" could be used to connect the call recipient to a police department, the number "2" could be used to connect the call recipient to a fire department, and the number "3" could be used to place a custom call. Some other number, such as the number "4," could be used to reset the alarm via the computer host 261.

If the forwarding location is a telephone or facsimile number, the object identification information can be transmitted via the public switched telephone network to a remote telephone or facsimile machine. If the forwarding location is an email or IRC address, the object identification information can be transmitted via a data network for delivery to a remote computer host. If the forwarding location is the receiver means 30, the object identification information can be transmitted via the modem pool 262 to the receiver means.

Following delivery of the object identification information, the remote computer host 261 terminates the security alert sequence in step 288. This step preferably includes logging the date and time of the security alert into the subscriber's account records, along with the object identification information. The logging operation can be used to create a security record and also for billing purposes.

As a result of the security alert sent by the security administration system 260, the subscriber will be provided with very specific information about the nature of the security breach. In particular, because the object identification information is provisioned by the subscriber, it can be personalized in a way that allows the subscriber to gauge their response to the security alert according to the information provided. For example, a young mother on a warm summer day may wish to attach one movement detecting and signal transmitting means 20 to the baby's crib during nap time, and another movement detecting and signal transmitting means 20 to a partially open window in the baby's room. Upon receipt of the security alert, the mother will know from the object identification information that the alert is either the result of the baby waking up and jostling the crib or a potentially serious security breach due to an intruder attempting to raise the baby's window.

Figure 22:
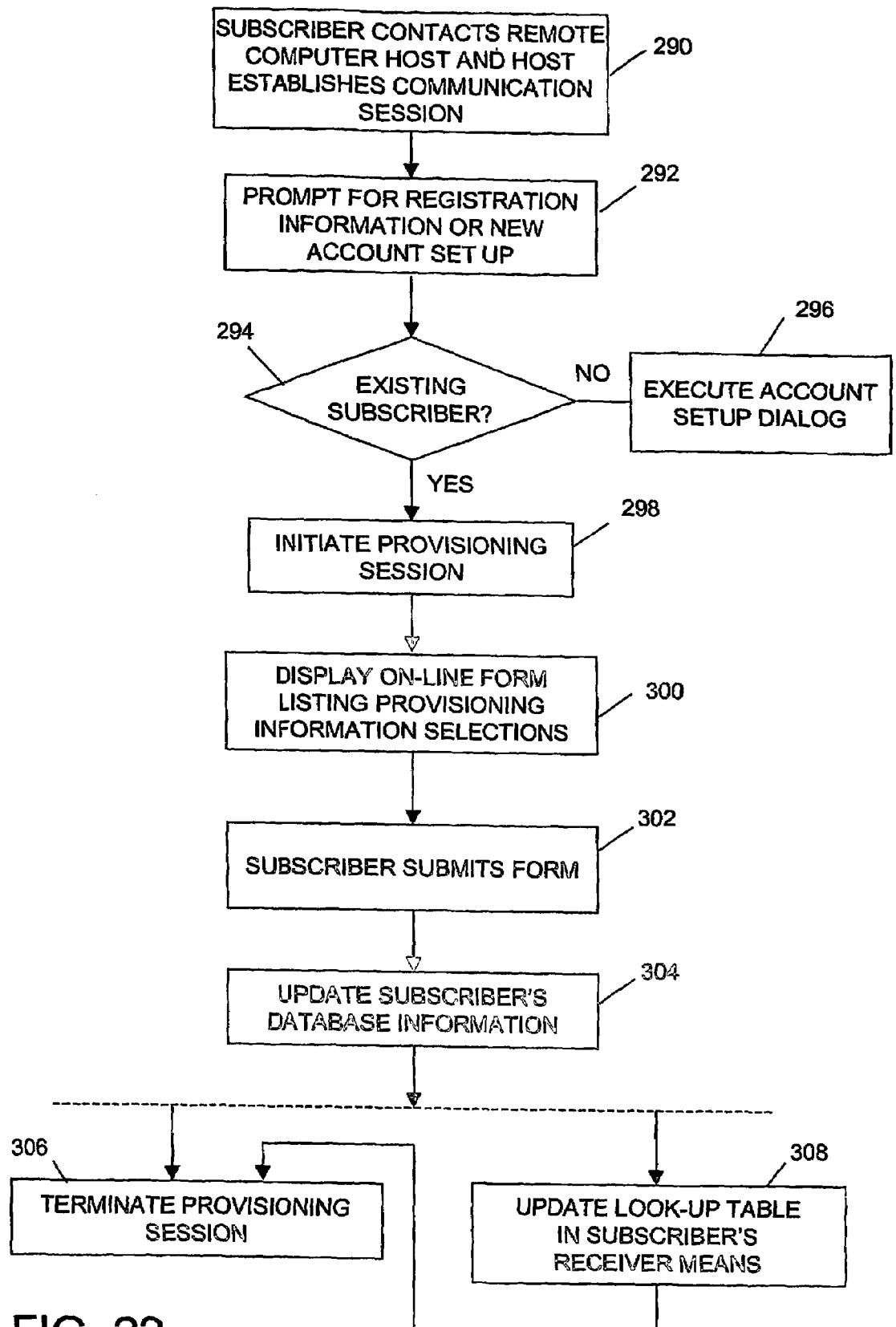
FIG. 22 is a flow diagram showing operation of the security administration system of FIG. 20 during a security monitoring and response operation.

As will now be described with reference to the flow diagram of FIG. 22, it is very simple for a subscriber to provision each of their movement detecting and signal transmitting means 20 as these devices are attached to different objects. A network-attached computing device and a few moments of time to fill in an online form are all that is required. In step 290 of the provisioning process, the subscriber initiates contact with the computer host 261 and the latter establishes a communication session. In step 292, the computer host 261 prompts the subscriber for registration information (e.g., user name and password) if they have an existing account, or to set up a new account if the subscriber is not yet registered. If, in step 294, the subscriber indicates that they need to set up a new account, the computer host 261 engages the subscriber in an account setup dialog in step 296. This will establish a record of such information as the subscriber's name, billing address, login name, password, and an authentication identifier associated with the subscriber's receiver means 30. The subscriber will preferably also be requested to accept a subscription agreement. The computer host 261 will then create one or more account records in the subscriber database of the data storage resource 264, and if necessary, reserve storage space for the subscriber's provisioning information.

Following registration in step 296, or if the subscriber previously provided a registration number in step 292, the computer host 261 initiates a provisioning session in step 298. The provisioning session can be implemented in a variety of ways, but preferably involves the subscriber filling in fields in an on-line graphical form. Thus, in step 300, the computer host 260 presents the subscriber with a web page or the like containing a listing of one or more movement detecting and signal transmitting means 20 that can be provisioned. Each line of the listing will include a field specifying the unique identifier associated with the movement detecting and signal transmitting means 20, an optional field containing the device's object identification information, an optional field for entering contact information. When the subscriber first registers for service, the listing will be blank. For registered subscribers who have previously provisioned their movement detecting and signal transmitting means 20, the listing will show the subscriber's current provisioning information. The subscriber then updates the listing to suit their current needs.

In step 302, the subscriber signifies that they have finished updating their provisioning information by submitting the online form. The computer host 261 then implements a CGI script or the like to process the form information in step 304 and update the subscriber's database information. Thereafter, the computer host 261 can terminate the provisioning session in step 306. Alternatively, an optional step 308 can first be performed in which the computer host 261 initiates a communication session with the subscriber's receiver means 30. The purpose of this session is to download the subscriber's provisioning information to the look-up table 226 in the receiver means 30 so that local conversion of unique identifiers to object identification information can be performed.

It will be appreciated that step 308 could be eliminated in implementations of the alarm system 10 where the receiver means 30 is configured to allow the subscriber to provision the look-up table 226 by hand. In particular, the receiver means 30 could be provided with a data entry interface, such as a keypad and a display (not shown), that allows the subscriber to program object identification information into the look-up table 226 (see FIG. 17) via the control logic 222. The receiver means 30 could also be provided with an audio recording system (not shown) that allows the subscriber to record object identification information as a series of audio messages that are each associated with a unique identifier in the look-up table 226.

Having now described various security functions of the alarm system set forth in the embodiments above, it is important to note that the alarm system could be adapted for additional purposes, such as industrial process monitoring and measurements. This functionality could be provided by modifying the movement detecting and signal transmitting means 20 so that it produces an output indicating a distance that the retractable wire means 22 moves relative to the movement detecting and signal transmitting means 20 once the device has been set (see FIG. 1). This measurement feature could be for such functions as industrial tank expansion measurement, and the like. The measurement feature could be readily implemented with relatively minimal modification of the movement detecting and signal transmitting means 20. For example, the field sensor 56 and the closing contact 3 of FIGS. 7-9 could be implemented as a reed switch that will open and close as the magnets 54 pass by. Either the control logic 202 of the movement detecting and signal transmitting means 20 or the control logic 222 of the receiver means 30 can be programmed to count the number of pulses represented by each magnet 54 passing by the field sensor 56. Each pulse would be associated with a distance that the retractable wire means 22 moves relative to the movement detecting and signal transmitting means 20. The total number of pulses would thus correspond to the total distance moved. The distance could be reset to zero when the movement detecting and signal transmitting means 20 is set, following which distance monitoring would begin. Another implementation option would be to use optical counting by installing an optical source/detector pair in the movement detecting and signal transmitting means 20 and an optical signal modulator. The optical signal modulator could be an optical medium that is encoded with alternating light/dark bars, bar codes, etc. and which moves relative to the source/detector pair in response to motion of the retractable wire means 22, so as to thereby modulate the optical signal. The components used in a computer mouse pointing device represent one optical technology that could be used. The measurement information can be output locally by the receiver means 30 in audible or visual form, or it can be sent to a remote location using any of the communication modalities discussed above, including telephone, network, cable, radio/cellular communication, etc. Once the receiver means 30 outputs its message to the remote location, the remote location can respond to the message in various ways, including (1) messaging response instructions back to the receiver means 30 for forwarding to the signaling movement detecting and signal transmitting means 20 or any of its counterparts, (2) forwarding a customized message to a designated forwarding location, (3) taking any other appropriate action.

It should further be noted that a process measuring implementation of the invention may require consideration of environmental factors that lead to a change in the materials used to construct the various components of the alarm system. For example, it may be desirable to water-proof the movement detecting and signal transmitting means 20 for outdoor use. Similarly, will be understood that the retractable wire means 22 can be made from a variety of materials, including thread or string, synthetic line (e.g. fishing line), or more durable materials such as steel, tungsten, or the like for high heat use.

Thus far in the description of the alarm system 10, the motion sensing function of the movement detecting and signal transmitting means 20 has been implemented using a retractable wire means. Among the several advantages of this design relative to conventional security devices is that objects being sensed do not have to be placed in a home or reference position in order to arm the system. A typical home security system requires that all doors and windows be closed before the system can be armed. In contrast, the present alarm system 10 allows objects to be in any position at the time of arming. One simply extends the retractable wire means as necessary to reach the object's current position. In further exemplary embodiments of the invention, the foregoing and other advantages are provided by way of a movement detecting and signal transmitting means 20 that can be implemented without the use of retractable wires. In particular, a gyroscope sensor or an accelerometer sensor (or an array of such sensors) may be used for inertial sensing by incorporating the sensor in a suitable housing that is adapted to be removably secured, as by way of adhesive strips or other attachment means, to an object whose movement is to be sensed. Incorporating inertial sensing means that the movement detecting and signal transmitting means 20 can be more compact and less expensive than other designs. Moreover, the movement detecting and signal transmitting means 20 is more versatile because it can be mounted directly to an object while it is in any position and used to detect movement in any direction (x, y and z axis), and in many cases rotation and tilt as well. Inertial sensing thus holds promise for a myriad of potential applications in which sensing intelligence is applied to inanimate objects of all shapes and dimensions, such as position sensing for various structures, process monitoring of volatile liquids or the like, location detection, safety and security, and other uses.

Gyroscopes have been used to detect the yaw, pitch and roll of airplanes, boats and space craft for many years. In the context of the present invention, one or more gyroscope sensors incorporated in the movement detecting and signal transmitting means 20 can be used to generate a signal corresponding to motion of an object to which the means 20 is attached. Once motion is applied to the object, the gyroscope sensor's output will change. The degree of change can be compared to the gyroscope sensor's last memory state and an algorithm may be used to determine the significant difference of the degree of movement. This facilitates determination of the type of event that disturbed the movement detecting and signal transmitting means 20. For example, the movement detecting and signal transmitting means 20 can now distinguish between a knock on a door or window and the opening thereof. If the movement detecting and signal transmitting means 20 vibrates, but is otherwise stationary, the algorithm will produce an output having one set of characteristics (e.g., a high frequency signal pattern). If the movement detecting and signal transmitting means 20 is translated in space, the output will have a different set of characteristics (e.g., a low frequency signal pattern).

Figure 23:
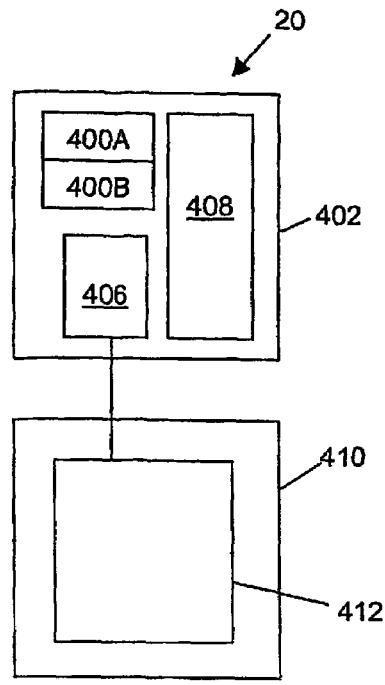
FIG. 23 is a functional block diagram showing an alternative embodiment of a movement detecting and signal transmitting means implemented using a gyroscope sensor.

FIG. 23 illustrates the basic circuit components of a movement detecting and signal transmitting means 20 configured with gyroscopic inertial sensing capability instead of a retractable wire means. The movement detecting and signal transmitting means 20 is again designed to be placed or adhesively attached to a surface, but the surface is on the object whose motion is to be detected. Two gyroscope sensors 400A and 400B are used. Each is oriented to sense movement in a plane defined by two geometric axes. Thus, one sensor can be used to monitor motion having an x component and/or a y component. The other sensor can be used to monitor motion having a z component. Note that in any given plane, both translational and rotational (tilting) motion can be detected insofar as nearly all points on a rotating object undergo translation.

The gyroscope sensors 400A and 400B are mounted on a first component board 402, along with a communication module 404 and a battery pack 406 that comprises one or more batteries preferably producing about 3 volts DC or better. The gyroscope sensors 400A and 400B can be implemented using a Micro Gyro 100 gyroscopic sensor available from Gyration, Inc. of Saratoga, Calif. The communication module 404 may be implemented using the RF transmitter 4 of FIG. 9 or equivalent. It may also include the RF receiver 206 of FIG. 16 or equivalent. An integrated RF transmitter/receiver may also be used, such as the RFM TR100 916.5 MHz hybrid transceiver (up to 1 Mbps data rate) available from RF Monolithics, Inc. of Dallas, Tex. Alternatively, instead of an RF transceiver, the communication module 404 could be constructed as an Infrared (IR) transceiver for "line-of-sight" communication with the receiver means 30. The battery pack 406 can be implemented using two 1.5 volt "AA" size batteries or equivalent.

A second component board 410 carries a patch antenna 412. The first component board 402 is overlaid onto the second component board 410, and the combination is mounted into a suitable housing (not shown) that may be similar in shape to unit shown in FIGS. 7-8 comprising the casing 31 and the rear panel 66, albeit of smaller size insofar as there is no need for the retractable wire and magnet components.

Figure 24:
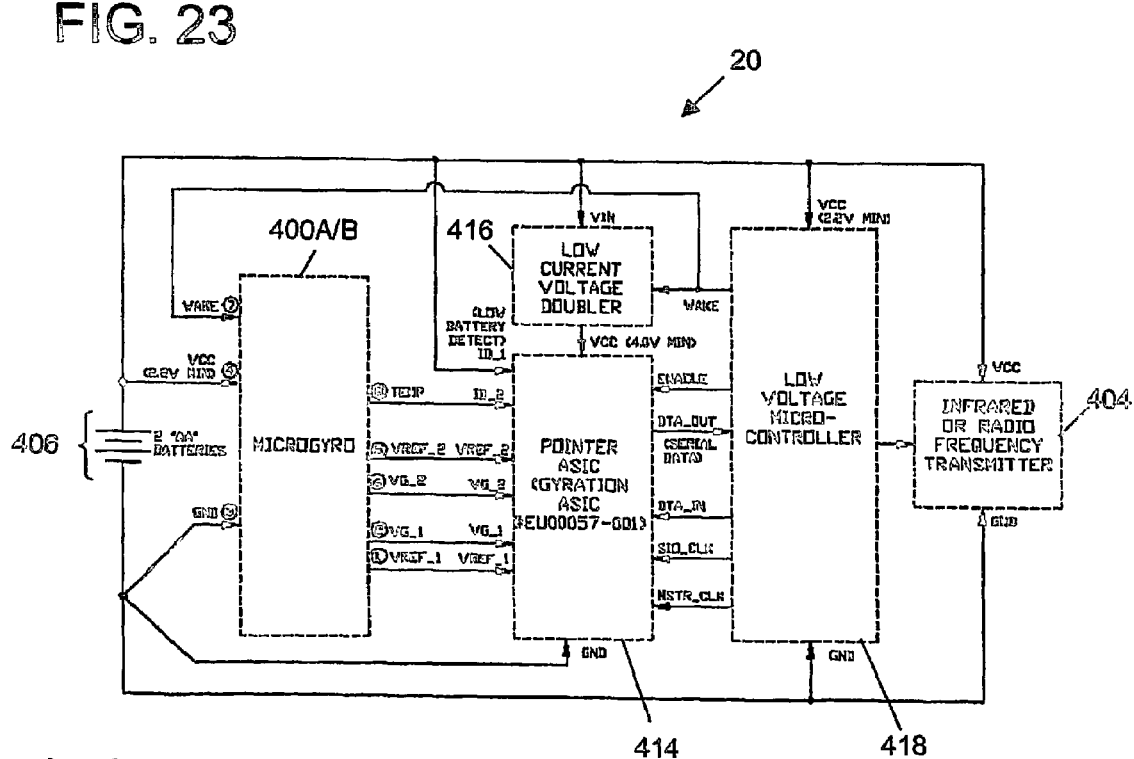
FIG. 24 is a schematic diagram showing the movement detecting and signal transmitting means of FIG. 23.

FIG. 24 illustrates the gyroscope sensors 400A and 400B, the communication module 404, and the battery pack 406, as well as additional exemplary circuit components that may be used to implement the movement detecting and signal transmitting means 20 of FIG. 23. In particular, an ASIC (Application Specific Integrated Circuit) 414 is implemented (using model number EU00057-001 from Gryation, Inc.) to process the gyroscope sensor outputs into coordinate values. A low current voltage doubler 416 steps up voltage from the battery pack 406 to power the ASIC 414. Also shown is a conventional low voltage microcontroller 418 that is programmed to provide various control and data storage functions.

In particular, the microcontroller 418 includes a memory for storing a unique identifier that uniquely identifies the movement detecting and signal transmitting means 20 during security operations. When an object to which the means 20 is attached is moved, the ASIC 414 passes coordinate values associated with the gyroscope sensors 400A and 400B to the microcontroller 418. The microcontroller 418 provides the coordinate values together with the unique identifier associated with the movement detecting and signal transmitting means 20 to the communication module 408 for transmission to the receiver means 30. The receiver means 30 is preferably implemented according to the configuration shown in FIG. 17 to include the control logic 222 and the data store 224. In addition to storing the unique identifier for the movement detecting and signal transmitting means 20, the data store 224 preferably maintains a set of last-known coordinate values for the movement detecting and signal transmitting means. The control logic 222 compares the received coordinate values against the stored last-known coordinate values. If a threshold coordinate change has occurred, signifying translation or rotation of the movement detecting and signal transmitting means 20, the receiver means initiates an appropriate response. For example, if the movement detecting and signal transmitting means 20 is attached to a back door with coordinates X01, Y01, Z01, a slight movement of the door will change the coordinates to X02, Y02, Z02. The movement detecting and signal transmitting means 20 will transmit these coordinate values to the receiver means 30. If the change in any of the x, y or z coordinates exceeds some movement threshold, the receiver means 30 can initiate a security response that may include the audible announcement "BACK DOOR!".

It will be appreciated that the coordinate value comparisons could also be made by the microcontroller 418 within the movement detecting and signal transmitting means 20 itself. In that case, the receiver means 30 would only be contacted when the movement threshold is exceeded. Moreover, instead of forwarding coordinate information to the receiver means 30, any suitable alarm indicating signal could be sent to trigger a security response. This signal could be nothing more than the unique identifier for the movement detecting and signal transmitting means 20, or could include additional status information, such as a status code indicating the type of movement (e.g., vibration, translation, tilt, etc.).

As indicated above, the movement detecting and signal transmitting means 20 may also be implemented using accelerometer sensing. This approach is typically less sensitive than gyroscopic sensing, but the sensor requires less power and is generally more durable. There are various accelerometer designs that may be used in the movement detecting and signal transmitting means 20. One design is based on a conventional MEMS (Micro-ElectroMechanical Systems) accelerometer, such as the ADXL202E product from Analog Devices, Inc. This accelerometer is commonly used in automotive alarms. It measures acceleration along two geometric axes and outputs analog voltage or digital signals whose duty cycles are proportional to acceleration. The duty cycle outputs can be directly measured by a microprocessor counter, without an AID converter or glue logic.

Figure 25:
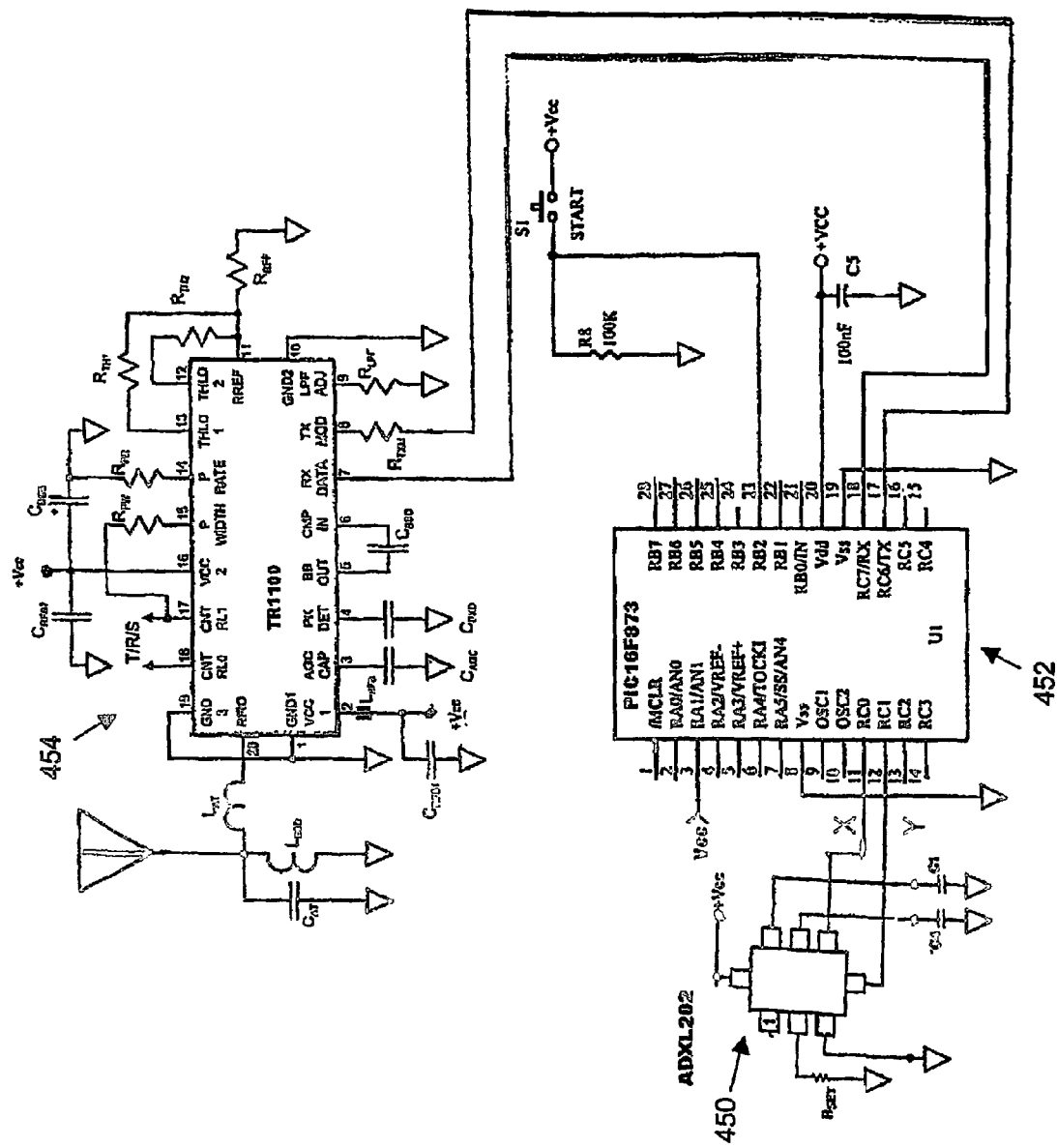
FIG. 25 is a schematic diagram showing another alternative embodiment of a movement detecting and signal transmitting means implemented using a MEMS accelerometer sensor.

FIG. 25 schematically illustrates an embodiment of the movement detecting and signal transmitting means 20 with an ADXL202E MEMS accelerometer sensor 450 therein. The x and y outputs of the sensor 450 are input to a microprocessor 452, which by way of example only, is shown to be implemented as a PIC16F873 microcontroller available from Microchip Technology, Inc. of Chandler, Ariz. Although not shown, an additional accelerometer can be added so that movement can be sensed along three axis. The microprocessor 452 converts the accelerometer outputs into coordinate values and forwards them to an RF transceiver 454 for transmission to the receiver means 30. Alarm processing is then implemented as per the discussion above regarding gyroscopic sensing. Alternatively, as also discussed above, coordinate processing could be performed by the microprocessor 452 such that the receiver means 30 is only notified when a movement threshold is reached. The RF transceiver 454 is shown by way of example only to be implemented as a TR1100 hybrid transceiver available from RF Monolithics, Inc. of Dallas, Tex. Like the TR1000 transceiver described above, the TR1100 transceiver is a short range wireless data communication device. It operates at a frequency of 916.3 MHz and data rates up to 1 Mbps.

Figure 26:
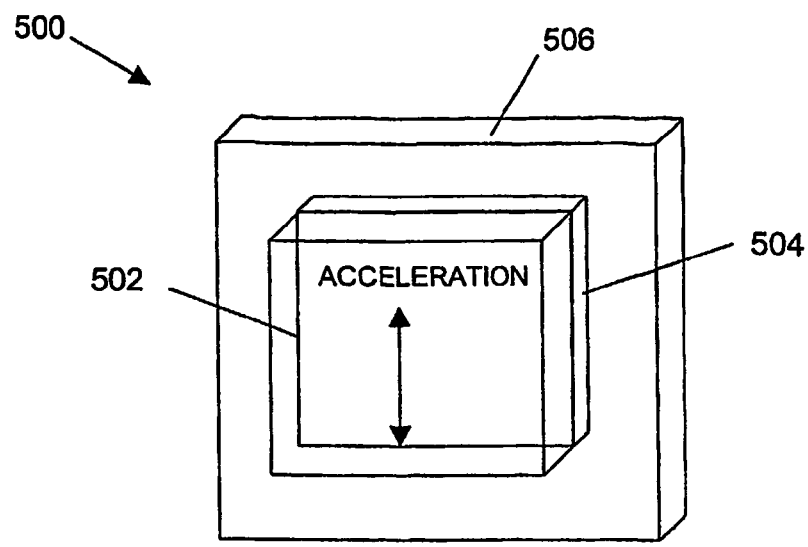
FIG. 26 is a diagrammatic perspective view of a piezoelectric film accelerometer sensor.

Another type of accelerometer that may be used in the movement detecting and signal transmitting means 20 is a piezoelectric film accelerometer. The advantage of this construction relative to MEMS accelerometers is that it requires no power, is more durable, and usually has a lower cost. A piezoelectric film accelerometer is conventionally constructed as a flat plate shear (FPS) system in which a mass is bonded to one surface of a film of piezoelectric material while the other surface of the piezoelectric film is bonded to a fixed mounting surface. This configuration is shown in the accelerometer sensor 500 of FIG. 26. In this sensor, element 502 is the mass, element 504 is the piezoelectric film, and element 506 is the fixed surface. As the mass 502 is acted upon by a uniaxial acceleration (shown by the double-headed arrow ill FIG. 26), its momentum shears the crystal matrix of the piezoelectric film 504 between the mass and the mounting surface 506. This causes a corresponding voltage to be generated by the piezoelectric film 504.

Figure 27:
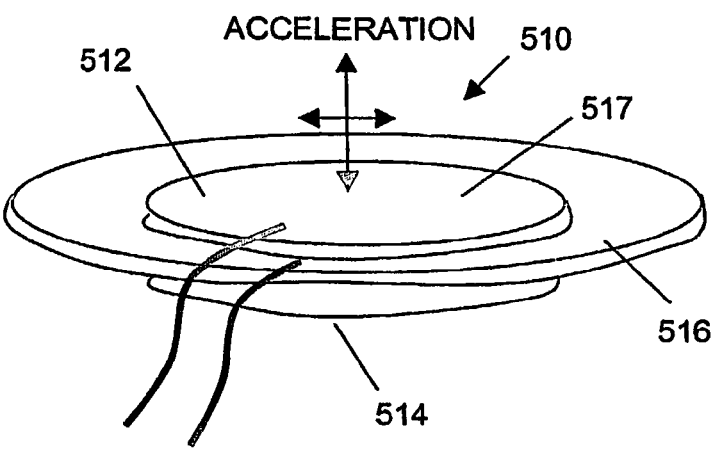
FIG. 27 is a diagrammatic perspective view of an accelerometer sensor constructed from a modified piezoelectric buzzer.

In FIG. 27, an alternative sensor 510 is shown that applicants have constructed using a conventional piezoelectric audio transducer (e.g., buzzer) 512 of the type used in personal computers to generate audible beeps. Such transducers have been used in the past as vibration sensors. To make the transducer 512 sensitive to inertial movement, a mass 514 is added to the brass diaphragm portion 516 thereof, on the opposite side to which the piezoelectric element portion 517 of the transducer is mounted. The sensitivity of the sensor 510 to accelerating force is primarily normal to the plane of the diaphragm 516, as shown by the long double-headed arrow in FIG. 27 (out-of-plane acceleration). In addition, because the center of gravity of the mass 514 will be spaced from the center of gravity of the piezoelectric element 517 (depending on the out-of-plane height of the mass), the sensor 510 is also sensitive to acceleration parallel to the plane of the diaphragm 516, as shown by the short double headed arrow in FIG. 27 (in-plane acceleration). Acceleration of the mass 514 in this direction causes it to cantilever relative to the piezoelectric element 517, causing distortions therein that produce an electrical output.

The mass 514 can be added to the sensor 510 in various ways. For example, it can be formed as a quantity of glue, solder or other material that is applied as a drop, or deposited as a film, to the diaphragm 516. The mass 514 can also be added by securing a solid object, such as a flat disk or washer (or any other suitable shape) made from steel or other material to the diaphragm 516. This approach is shown in FIG. 27 in which the mass 514 is a steel disk that is glued to the diaphragm 516. Note that the mass 514 is concentrically mounted relative to the piezoelectric element 517 and that the diameter of the mass is selected to coincide with the diameter of the piezoelectric element. Although not shown, the bond between the mass 514 and the diaphragm 516 extends under the entire surface area of the piezoelectric element 517. This construction maximizes the distortional effect that the mass 514 has on the piezoelectric element 517 as it cantilevers (shearing force) relative thereto. If the mass 514 is made smaller than the surface area of the piezoelectric element 517, it may tend to distort a smaller portion thereof, thus reducing the electrical output. It will be further appreciated that if the dimension of the mass 514 is increased the direction normal to the plane of the diaphragm 516, its center of gravity will be moved further away from the piezoelectric element 517. This will tend to increase the cantilever (shearing force) effect of the mass 514 on the piezoelectric element 517 and increase the sensitivity of the sensor 510 to in-plane acceleration.

In tests conducted by applicants using a conventional piezoelectric audio transducer, model number CEP-1126 from CUI, Inc. of Beaverton, Oreg., adding 9-15 grams of mass to the sensor 510 (a steel washer bonded to the diaphragm 516) was found to be effective, with better performance being obtained as the mass is increased. The actual mass amounts that will be suitable for other types of piezoelectric transducers will no doubt vary, but may be determined through routine experimentation.

Figure 28:
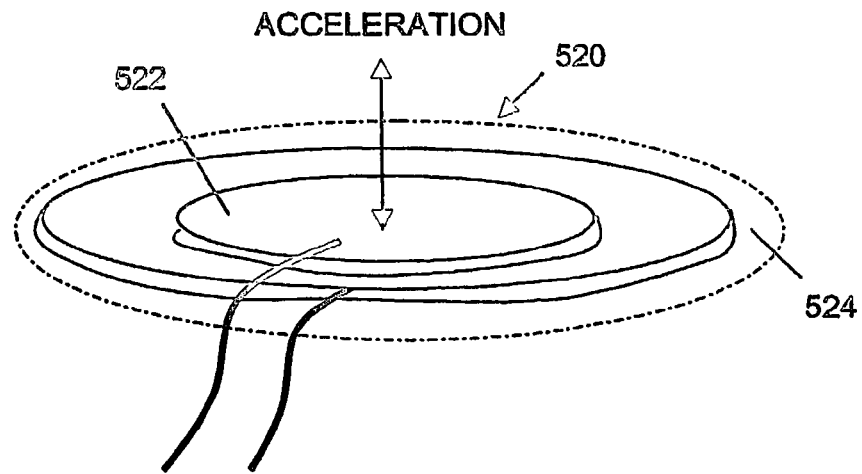

FIG. 28 illustrates another sensor 520 representing a modification of the sensor 510 of FIG. 27. According to this modification, the mass 514 is not required. Instead, a conventional piezoelectric audio transducer 522 is placed within a partial vacuum environment so that pressure waves cannot disturb the transducer. This can be done by sealing the transducer 522 in an airtight enclosure 524, such as a vacuum sealed pouch made from a gas impervious material such as glass, metal, epoxy-encased plastic, etc. Only the leads of the transducer 522 will protrude from the enclosure 524 so as to allow circuit connections to be made. Alternatively, all or a portion of a circuit board or other carrier on which the transducer 522 is mounted could be vacuum sealed in a suitable enclosure. Applicants have discovered that the enclosure 524 prevents the sensor 520 from being triggered by vibrations, and allows it to sense inertial movement, thus obviating the need for a mass (although some additional mass could still be used, if desired). Sensitivity to acceleration is normal to the plane of the transducer 522, as shown by the double-headed arrow in FIG. 28. By way of example only, a suitable transducer 522 that may be used to implement the sensor 520 is the above-described CEP-1126 piezo audio transducer.

Advantageously, the sensors 510 and 520 are relatively immune to noise. Additional noise resistance can be obtained by performing double integration (with respect to time) on the output signal to transform the acceleration signal first to a velocity signal and then to a displacement signal. By sampling both the displacement signal and the raw acceleration signal, it is also possible to make determinations as to whether the sensor 510 was triggered by vibration (e.g., a knock on a door) or long wave motion (e.g., the door is opening). In particular, the presence of an acceleration output without a displacement output would signify vibration only. The presence of an acceleration output and a displacement output would signify long wave motion. Note that the velocity signal could also be sampled for applications such as process monitoring wherein monitoring the rate of movement is important.

One advantage of the sensor 510 is that its sensitivity to acceleration is two dimensional. It will be appreciated, however, that even though the sensors 500 and 520 sense acceleration in one primary direction, either sensor can be oriented in a manner that allows it to sense an object's movement in two or even three directions. This can be done by orienting the sensor obliquely to the directions of interest. Movement in any one of the directions will then produce an acceleration component in the sensor's primary sensing direction. For example, if sensing in the x, y and z directions is desired, the sensor could be oriented so as to lie at 45 degrees in the x-y plane and 45 degrees in the y-z plane. Of course, an array of multiple sensors can always be used to measure acceleration in multiple directions.

Figure 29A:
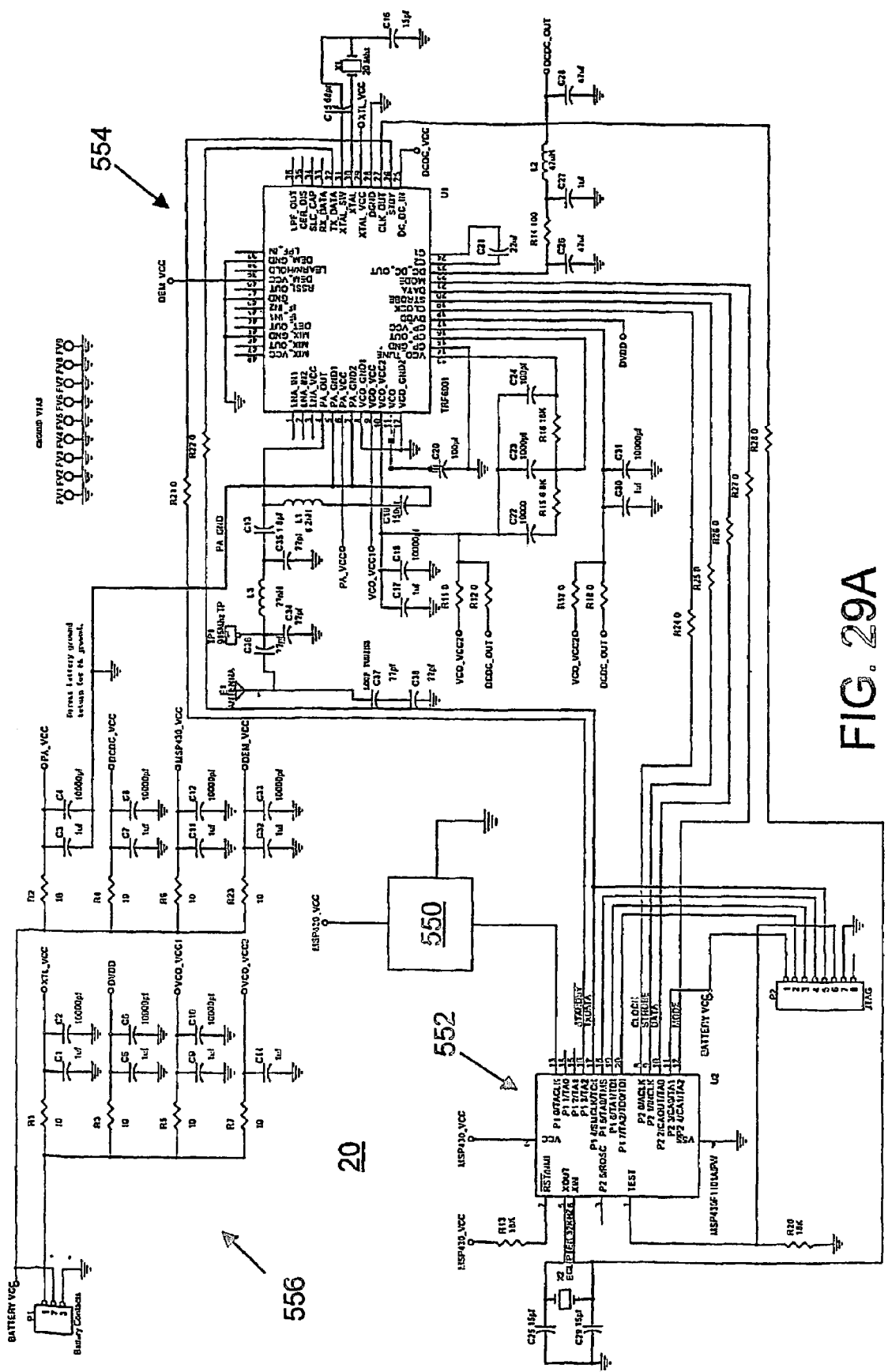
FIGS. 29A and 29B are schematic diagrams of another alternative embodiment of a movement detecting and signal transmitting means implemented using an piezoelectric accelerometer sensor.

Turning now to FIG. 29A, a schematic illustration of the movement detecting and signal transmitting means 20 is shown with an inertial sensor unit 550 incorporated therein. The sensor unit 550 can be implemented with one or more of the piezoelectric sensors 500, 510 or 520 described above, or with any other suitable accelerometer or gyroscope sensor. FIG. 29A also illustrates a microprocessor 552, an RF transceiver 554, and a battery/power supply module 556. The microprocessor 552 is shown by way of example only to be implemented as an MSP430F148 mixed signal microcontroller IC from Texas Instruments, Inc. of Dallas Tex. The RF transceiver 554 is shown by way of example only to be implemented as a TRF6901 RF-transceiver IC from Texas Instruments, Inc. Other like-kind devices could also be respectively used to implement the microprocessor 552 and the RF transceiver 554.

The output of the sensor unit 550 is provided to a microprocessor 552, which calculates one or more x, y and z coordinate values based on this input. These values can be forwarded by the RF transceiver 554 to the receiver means 30, for comparison with corresponding last-known coordinate values in the manner described above. A unique identifier for the movement detecting and signal transmitting means 20 is also sent. As described above, the comparison can be performed alternatively by the microprocessor 552. In that case, the receiver means 30 is only notified if a threshold change in position has been detected. No coordinate data needs to be sent. The movement detecting and signal transmitting means 20 only needs to send its unique identifier, and possibly optional status information, such as status code that specifies the type of motion (e.g., vibration, translation, rotation or some other external condition that triggered the sensor. Other status information, such as a "LOW BATTERY" code, a periodic "HEART BEAT" code, a time, date, temperature code, or any other code signifying an internal condition, could also be sent when appropriate.

Figure 29B:
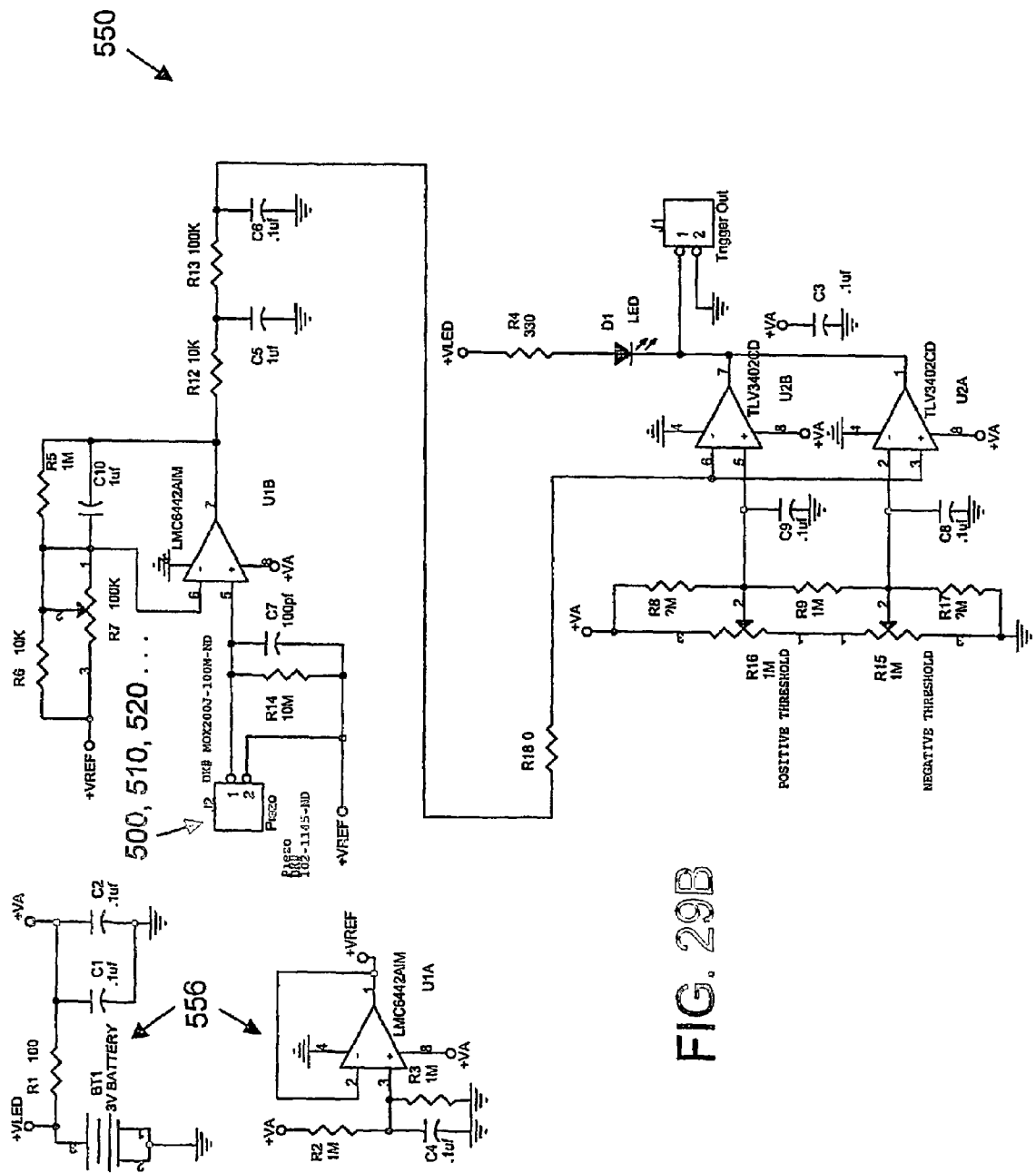

FIG. 29B shows schematic circuit details of the sensor unit 550 in an exemplary construction that incorporates one or more of the piezoelectric sensors 500, 510 or 520. The output from each such sensor is processed through an integration circuit that comprises the operational amplifier U1B and the feedback loop comprising capacitor C10, and resistors R5, R6 and R7. The variable resistor R7 is used to control the gain of U1B. A fixed value resistor could also be used if gain adjustment is not required.

A second signal integration is provided by resistor R12 and capacitor C5. This double integration of the acceleration signal from the sensor 500, 510 or 520 provides the desired output that corresponds to displacement. A sensing threshold circuit can be provided by the two operational amplifiers U2A, U2B and two resistors R15, R16, which can be variable if it desired to allow manual threshold adjustments. The output of the sensor unit 550 is delivered to the jack J1, which is used to connect the sensor unit to the microprocessor 552.

The threshold circuits allow positive and negative displacement thresholds to be set for any given sensor of the sensor unit 550 so that no output from that sensor is produced until an object's movement reaches a specified level. Note that positive and negative displacement thresholds can be set independently of each other in case it is desired to have the displacement threshold in one direction be different from the displacement threshold in an opposite direction. The displacement thresholds can be used to prevent insignificant noise outputs from being sent to the microprocessor 552. They can also be used to distinguish between small amplitude vibrations (e.g., a knock on a door) and large amplitudes displacements (e.g., a door opening). If it is desired to sense both vibrations and displacements, an additional pair of threshold circuits (not shown) could be provided along with a second output jack (not shown). One threshold circuit could be set to respond to vibrations while the other is set to respond to displacements. Alternatively, the single threshold circuit of FIG. 29B could be used, with the signal into the threshold circuit being compared with the signal out of the threshold circuit. If there is an input signal but no output signal, it may be concluded that the object being monitored is experiencing low amplitude vibration. If the input signal is the same as the output signal, it may be concluded that the object is experiencing large amplitude displacement. Another way to distinguish between vibrations and translations would be to provide frequency dependent circuitry for selectively sensing short wave motion (vibrations) from long wave motion (translations).

An optional light emitting diode D1 may be incorporated in the circuit to provide a visual indication that the sensor unit 500 has been disturbed by a motion in excess of the established thresholds. It will be seen that FIG. 29B also shows components of the power supply 556 that are used to provide the voltages "VA" and "VREF" used by the components of the sensing unit 550.

Figure 30:
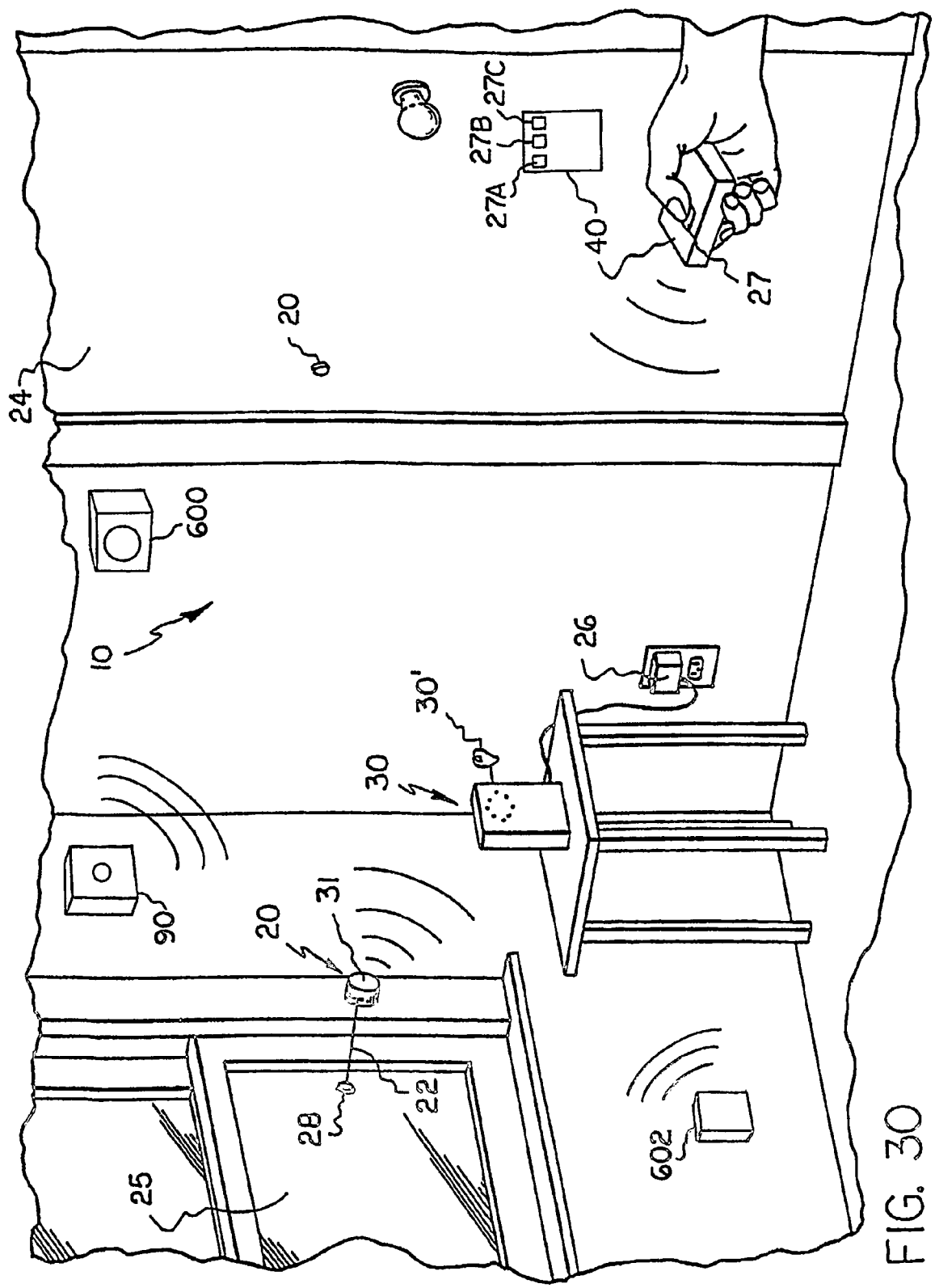
FIG. 30 is a pictorial diagram showing an alternative embodiment of the alarm system according to the present invention as they appear in use.

Turning now to FIG. 30, a modified version of the alarm system 10 is illustrated with additional wireless components not shown in FIG. 1. These additional components include an embodiment of the movement detecting and signal transmitting means 20 (removably mounted on the object 24 using adhesive strips or the like) that employs inertial sensing. Also shown is an information gathering device 90 embodied as a video or still image camera that can also be removably mounted to a desired location using adhesive strips or the like. The information gathering device 90 of FIG. 30 is assigned to one or more of the movement detecting and signal transmitting means 20. When any of such devices sense motion and transmit their unique identifier to the receiver means 30, the information gathering device 90 will also receive the message. The information gathering device 90 will begin transmitting images/video (and possibly audio information) to the receiver means 30, which is preferably configured to act as a remote notification device 92 as shown in FIG. 12. Note that the information gathering device 90 can also be activated by the receiver means 30, for periodic monitoring or if it is desired to have the receiver means 30 act as an intermediary between the movement detecting and signal transmitting means 20 and the information gathering device 90. In the latter scenario, the movement detecting and signal transmitting means would pass its unique identifier to the receiver means 30, which would then communicate with the information gathering device 90, instructing it to commence its information gathering function.

Two new components are also added to the alarm system 10 of FIG. 30; namely, a remote speaker system 600, and an environmental monitor 602. Both of these devices can be removably mounted at a desired location, as by adhesive strips or the like. FIG. 30 also shows an embodiment of the remote control unit 40 (which can be implemented as a key fob) in which there are three function buttons.

The speaker system 600 is adapted to produce an audio output in response to a wireless signal sent by the receiver means 30. This will typically occur when a movement detecting and signal transmitting means 20 is activated by movement of the object to which it is attached. Although the receiver means 30 will generally also produce audio output, the speaker system 600 provides the advantage of generating audio information remotely from the receiver means, such as in a room in another part of a building, or outside a building. The speaker system 600 can also serve as a "decoy" that an intruder might seek to disable based on the mistaken assumption that the speaker system is the "nerve center" of the alarm system 10. The audio output of the speaker system 600 may include any combination of tones, speech or otherwise. Although one speaker system 600 is shown in FIG. 30, there could be any number of such systems placed at any desired location within range of the receiver means 30 (e.g., RF range for radio signals, line of sight for IR signals, etc.). One or more of these speaker systems could be activated at any given time. Stereo effects and the like could be obtained by controlling the timing of each speaker system's output.

Figure 31:
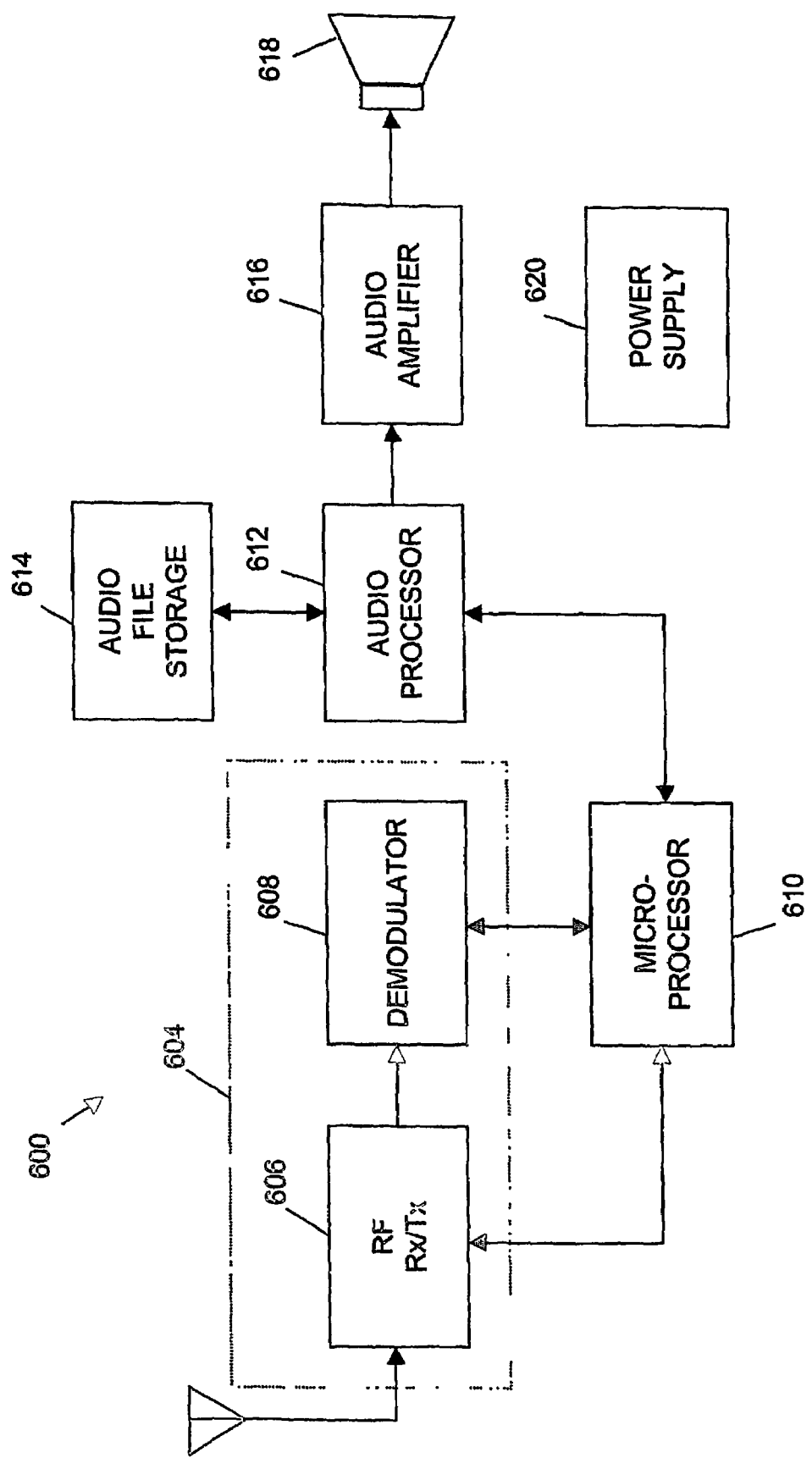
FIG. 31 is a functional block diagram showing a remote speaker system according to the present invention.

FIG. 31 shows an exemplary implementation of the speaker system 600. Wireless communication with the receiver means 30 is provided by an RF transceiver 604 that includes an RF stage 606 and a modulator/demodulator stage 608). Also shown is a microprocessor 610, an audio processor 612, audio file storage 614, an audio amplifier 616, a speaker 618, and a power supply 620. If desired, the RF transceiver 704 and the microprocessor 610 could be implemented using the RF transceiver 454 and microprocessor 452 used in the movement detecting and signal transmitting means 20 of FIG. 29A.

The speaker system 600 can be programmed with a unique identifier that the receiver means 30 uses to distinguish it from other speaker systems used in the alarm system 10. The receiver means 30 can also send a code word that specifies a message to be played, such as "BACK DOOR!," depending on which movement detecting and signal transmitting means 20 was activated. The word code could also specify one of several languages to be used for the output (e.g., English, Spanish, German, etc.). The microprocessor 610 uses the word code to instruct the audio processor 612 to select the appropriate sound file, e.g., "BACK DOOR!", from the audio file storage 614. Note that the number of words associated with each word code is limited only by the storage capacity of the audio file storage 614. However, a six-word audio message (optionally stored in several languages) should be sufficient for most purposes.

A security state code can also be sent by the receiver means 30 to indicate how the audio output should be generated. In particular, the receiver means 30 can be programmed so that each movement detecting and transmitting means 20 (as well as the environmental monitor 602) is assigned one of three distinct security states; namely, "ANNOUNCE," "ALERT" and "ALARM." The security code sent by the receiver means 30 corresponds to the current security state of the movement detecting and transmitting means 20 (or environmental monitor 602) that was activated. The microprocessor 610 in the speaker system 600 uses the security state code to modify the speaker system's audio output according to the corresponding security state. For example, assume a movement detecting and signal transmitting means 20 is mounted on the back door of a premises. When the back door opens, the speaker system 600 might announce "BACK DOOR!" a single time if the movement detecting and signal transmitting means is currently assigned the "ANNOUNCE" state. In the "ALERT" state, the speaker system 600 might announce "BACK DOOR!" multiple times or repeatedly until instructed by the receiver means 30 to terminate the output. In the "ALARM" state, the speaker system 600 might announce "BACK DOOR!" repeatedly plus generate a siren output until instructed by the receiver means 30 to stop. In addition, the receiver means 30 will preferably initiate a security notification to a remote location, such as the security administration system 260 of FIG. 20.

Figure 32:
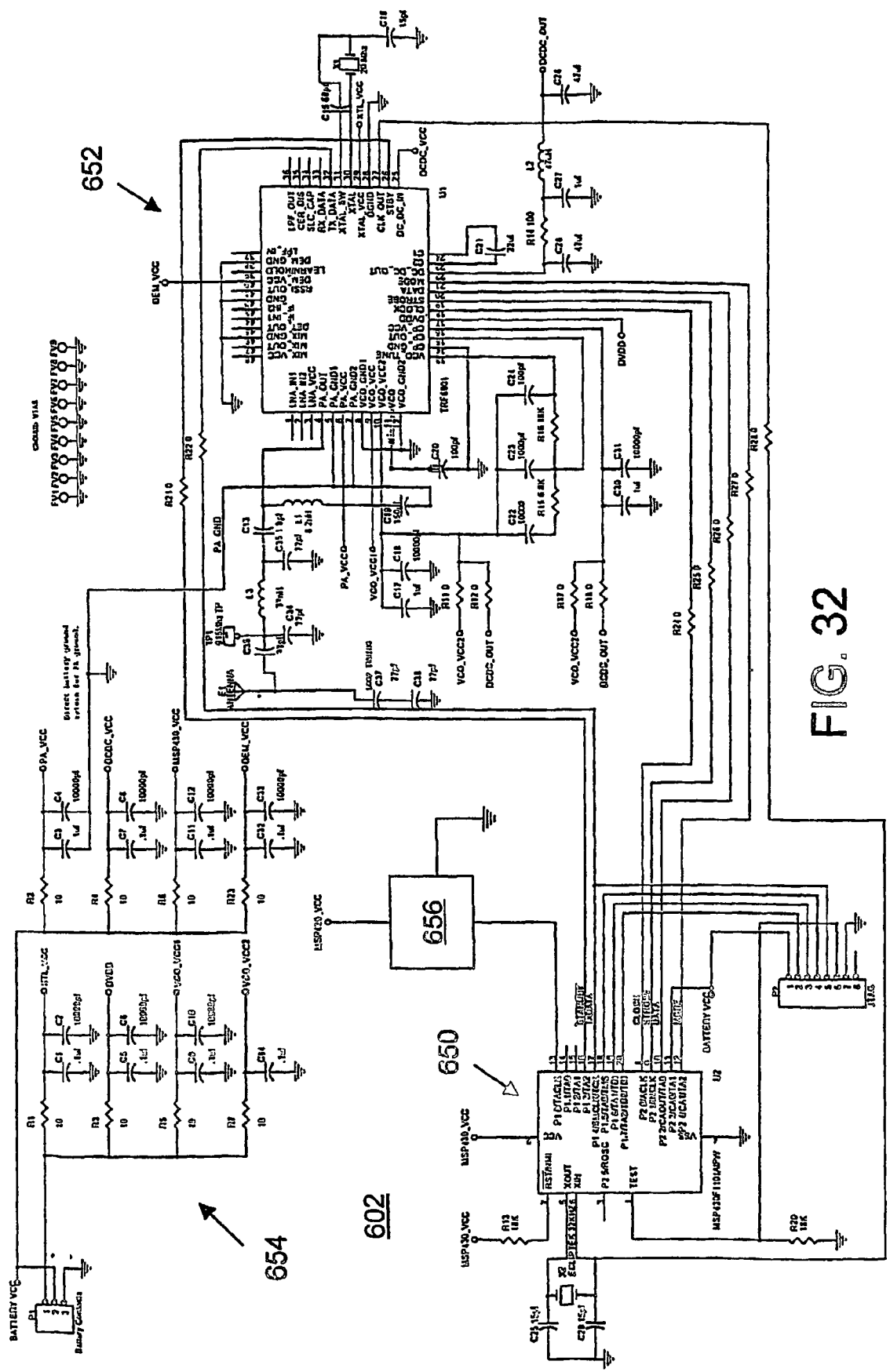
FIG. 32 is a schematic diagram showing an environmental monitor according to the present invention.

FIG. 32 shows an exemplary implementation of the environmental monitor 602. The environmental monitor 602 can be constructed as a modified version of the movement detecting and signal transmitting means 20 shown in FIG. 29A. In particular, there is a microprocessor 650, an RF transceiver 652, and a battery/power supply module 654. The microprocessor 650 is shown by way of example only to be implemented as an MSP430F148 mixed signal microcontroller IC from Texas Instruments, Inc. of Dallas Tex. The RF transceiver 652 is shown by way of example only to be implemented as a TRF6901 RF-transceiver IC from Texas Instruments, Inc. Other like-kind devices could also be respectively used to implement the microprocessor 650 and the RF transceiver 652.

The environmental monitor 602 further includes an environmental sensor unit 656 that comprises one or more sensors conventionally adapted to sense one or more of smoke, temperature, carbon monoxide, hydrocarbons (e.g., methane, propane, etc.) and other by-products of a fire, a gas leak, or other adverse environmental condition. The output of the sensor unit 656 is provided to the microprocessor 650, which is programmed to interpret the sensor's output and produce environmentally-related status information for transmission to the receiver means 30 via the RF transceiver 652. This could include one or more status codes representing information about an external condition being sensed, such as elevated temperature, smoke level, carbon monoxide level, hydrocarbon level, etc. A unique identifier for the environmental monitor 602 is also sent. Other status information, such as a "LOW BATTERY" internal condition code, a "HEART BEAT" code, a time, date or temperature code, etc., could likewise be reported when appropriate. If desired, the environmental monitor 602 could also implement a local audio alert system, such as a beeper as used in a conventional smoke detector.

It should be noted that the functions provided by the environmental monitor 602 could also be provided by any or all of the movement detecting and signal transmitting means 20. For example, if a movement detecting and signal transmitting means 20 is constructed according to FIG. 29A, it would be relatively easy to incorporate one or more additional sensors for detecting smoke, heat, carbon monoxide, etc. When a sensing event occurs (e.g., vibration, long wave motion, smoke, heat, carbon monoxide, etc.), the movement detecting and signal transmitting means 20 could send an appropriately coded message to the receiver means containing status codes for the sensors that were triggered.

The remote control unit 40 is shown in FIG. 30 to have three switches 27A, 27B and 27C. The switch 27A can be used to provide the "PANIC" button described above in connection with FIG. 1. In particular, the alarm system 10 will immediately initiate an alarm response. The switch 27B can be used as a "HOLD" button that disarms the alarm system 10 for some period of time. For example, activating the switch 27B once could delay alarm activation for sixteen seconds, activating the switch 27B twice could delay alarm activation forty-eight seconds, and so on. The "HOLD" button can thus be used to allow entry into a premises without immediately triggering an alarm, and allowing sufficient time to disable the alarm system 10. The switch 27C can be used as an "AWAY" button that changes the mode of the alarm system 10 to an "ALARM" state (see below).

Figure 33:
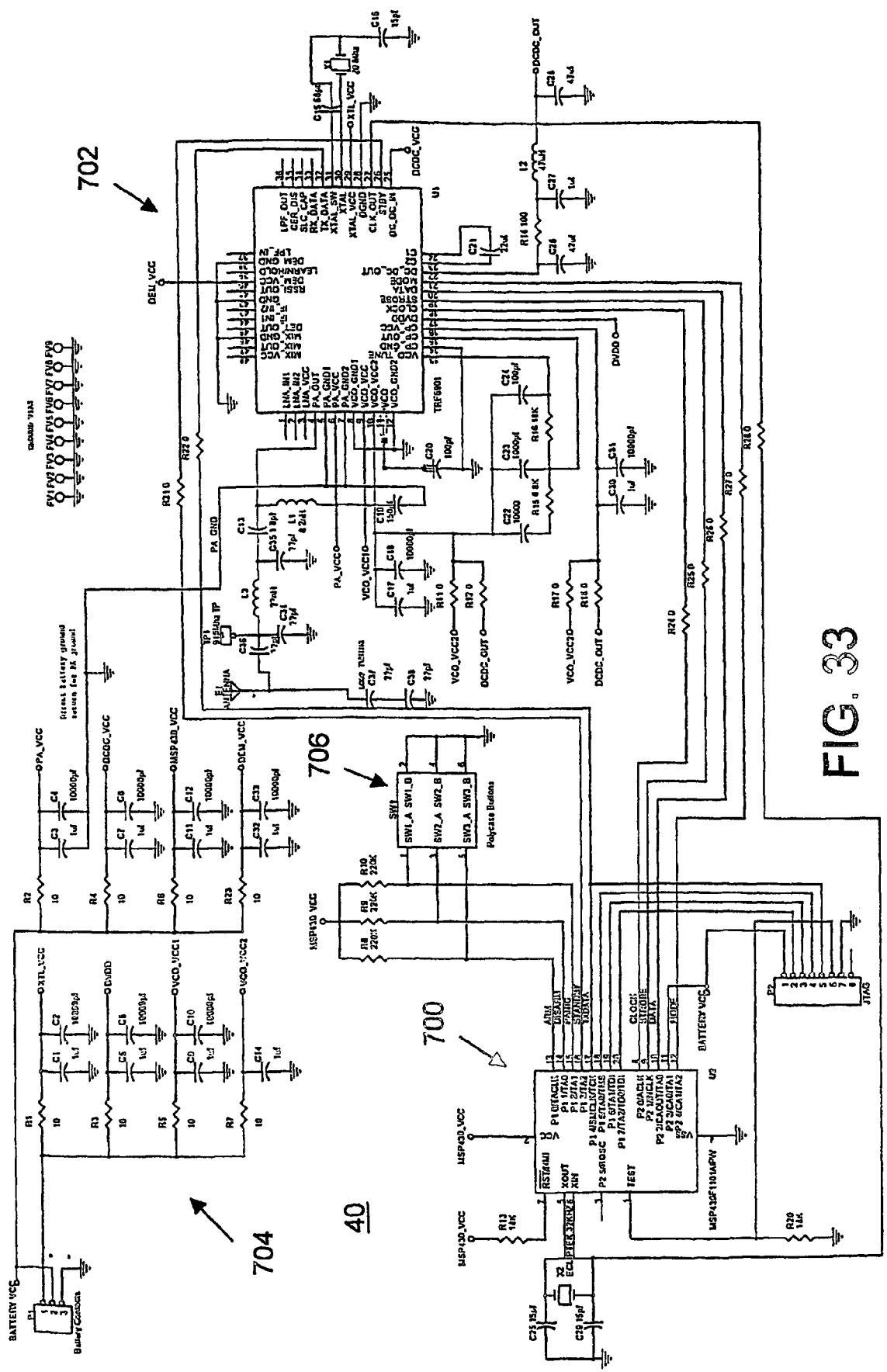
FIG. 33 is a schematic diagram showing exemplary details of a remote control unit according to the present invention.

As shown in FIG. 33, the remote control unit 40 can be implemented as a modified version of the movement detecting and signal transmitting means 20 shown in FIG. 29A. In particular, there is a microprocessor 700, an RF transceiver 702, and a battery/power supply module 704. The microprocessor 700 is shown by way of example only to be implemented as an MSP430F148 mixed signal microcontroller IC from Texas Instruments, Inc. of Dallas Tex. The RF transceiver 702 is shown by way of example only to be implemented as a TRF6901 RF-transceiver IC from Texas Instruments, Inc. Other like-kind devices could also be respectively used to implement the microprocessor 700 and the RF transceiver 702. FIG. 33 further shows a switch module 706 that provides the three switches 27A, 27B and 27C.

The remote control unit 40 can also be provided with an RFID (Radio Frequency Identification) circuit as part of (or separate from) the RF transceiver 702. This circuit becomes activated when the remote control unit 40 is brought into proximity with one of the movement detecting and signal transmitting means 20. It can thus be used when a person wishes to disturb a movement detecting and signal transmitting means 20 without generating a security response. When activated in this manner, the RFID circuit will provide the remote control unit's unique identifier (as an RFID tag) to movement detecting and signal transmitting means 20. If the latter is thereafter triggered within some period of time, it will append the RFID tag to its own transmission to the receiver means 30. The receiver means 30 can test the RFID tag to determine what response should be made (e.g., according to whether the remote control unit 40 is "RESTRICTED" or "UNRESTRICTED," as described in more detail below).

The receiver means 30 of FIG. 30 acts as a central base station when used in the alarm system 10. Its primary function is to wait for coded messages transmitted wirelessly from the various components of the alarm system 10. In FIG. 30, this would include both of the movement detecting and signal transmitting means 20, the environmental monitor 602, the remote control unit 40, and the information gathering device 90. All of these components may be referred to as "triggers" because they communicate events to the receiver means 30 that cause a security response to be triggered. The security response may include playing prerecorded announcements and initiating a notification sequence that reports security information to the security administration system 260, or to any other specified endpoint (e.g., telephone number, IP address, email address, etc.). How the receiver means 30 responds is determined by the security state of the triggering device (see above) and the operating mode of the receiver means.

These modes include a "HOME" state, an "AWAY" state, and a "PANIC" state. The "PANIC" state has been referred to above. It causes the receiver means 30 to immediately initiate an alarm response that results in appropriate security alert measures being taken, such as generating audio alarm messages and sending a security notification to a remote location, such as the security administration system 260. The "HOME" state means that the receiver means 30 responds to the various triggers based solely on their programmed security state, i.e., "ANNOUNCE," "ALERT" or "ALARM." The "AWAY" state means that all triggers are set to the "ALARM" state.

An additional alternative for the receiver means 30 is to provide a "QUIET" mode as part of any or all of the "HOME," "AWAY" and "PANIC" states. The "QUIET" mode can be activated by way of manual input into the receiver means 30 and/or by use of the remote control unit 40. When activated, the "QUIET" mode disables or diminishes the audible alerts given when a trigger is activated. How the "QUIET" mode changes the audible alerts can be programmed independently for each trigger and each security state thereof (i.e., "ANNOUNCE," "ALERT" or "ALARM"), or can be set collectively for all triggers and security states. Note that if the "QUIET" mode is set for a trigger's "ALARM" state, the trigger will act as a silent alarm.

The coded messages from the triggers will preferably include a unique identifier or "Trigger ID" and a status code that indicates the cause of the event that occurred. For the remote control unit 40, the status code will represent activation of the "HOLD," "AWAY" or "PANIC" buttons described above. For other triggers the status code will usually represent some external condition, such as a sharp short vibration, a long waved motion, a temperature reading, a smoke reading, a temperature reading, a carbon monoxide reading, a hydrocarbon reading, etc. As described above, all triggers can also sense and report internal conditions. The status codes may thus represent a "LOW BATTERY," condition, a "HEART BEAT" signal, a time, date, or temperature condition, etc. A "LOW BATTERY" status code can be sent by a trigger to advise the receiver means 30 that the trigger's battery needs to be replaced. A "HEART BEAT" status code can be sent periodically by each trigger to advise the receiver means 30 that it is fully operational. If the receiver means 30 stops receiving an expected "HEART BEAT" status code due to some problem at a trigger (low battery, hardware or software failure, etc.), a security response can be taken. This could include playing an announcement (e.g., "COMMUNICATION WITH BACK DOOR HAS ENDED") and/or reporting the event to the security administration system 260. A time, date or temperature status code can be sent by a trigger when reporting some external event to provide additional information that may be useful in interpreting the event, maintaining event statistics, etc. Note, that as an alternative to a trigger providing time and date information, the receiver means 30 could be programmed to record a time and date stamp as each external event is reported by a trigger.

The receiver means 30 can be programmed to equate the status codes with event response actions and with human recognizable events and conditions, such as knocking on a door (short vibration status code), opening a door or window (long wave motion status code), fire (temperature status code), smoke (smoke status code), an improperly vented furnace (carbon monoxide status code), a gas leak (hydrocarbon status code), nonfunctional trigger, etc. This allows the receiver means 30 to report conditions in human recognizable form. Alternatively, or in addition, the security administration system 260 can be programmed to perform this function.

Figure 34A:
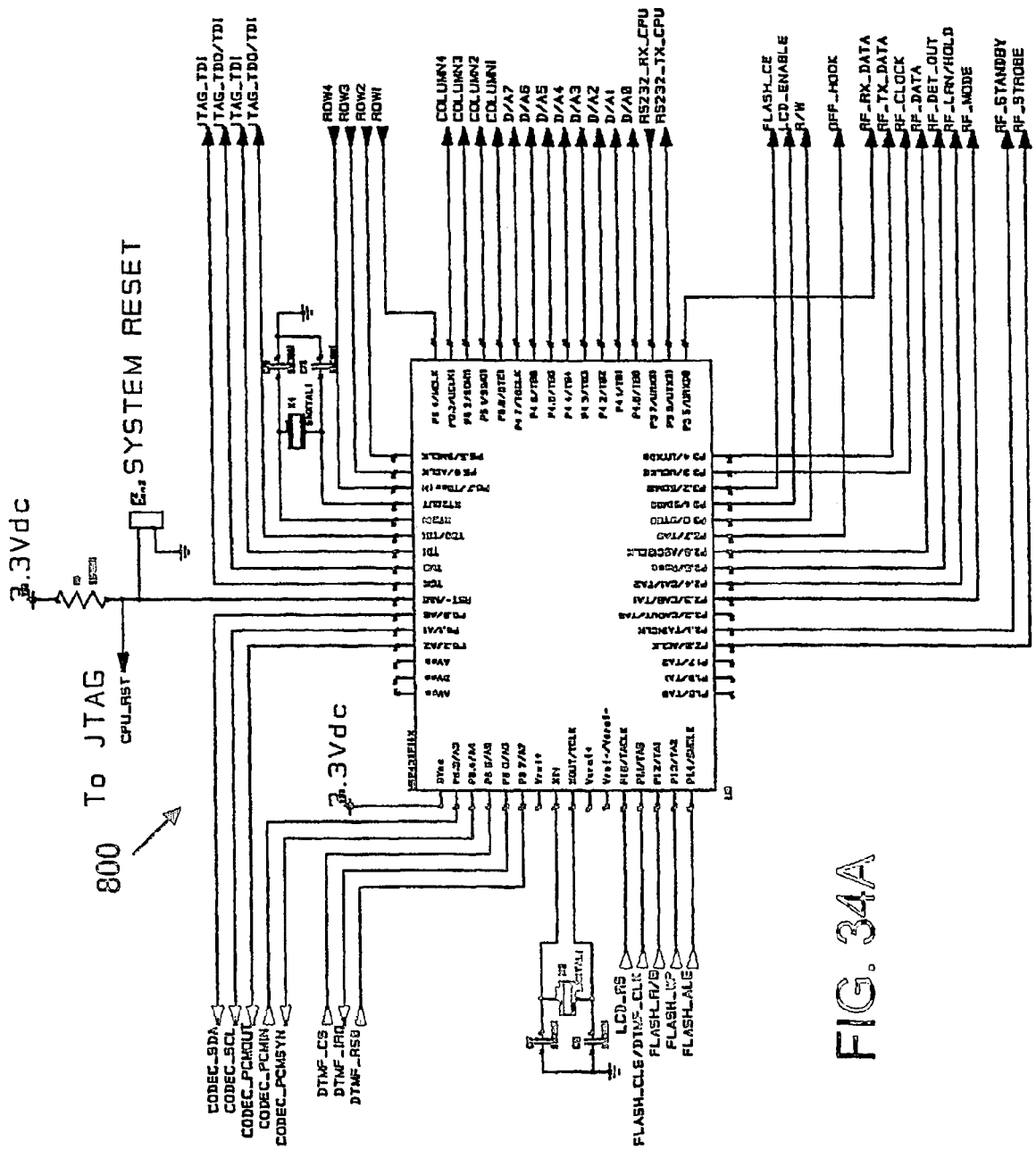
FIGS. 34A-34H collectively represent a schematic diagram showing an alternative embodiment of the receiver means according to the present invention.

FIGS. 34A-34H illustrate an embodiment of the receiver means 30 that may be used in the alarm system 10 of FIG. 30 to implement the foregoing functions. FIG. 34A schematically illustrates a microprocessor 800 and connections thereto. By way of example only, the microprocessor 800 can be implemented using the same kind of device used for the microprocessor 552 in the movement detecting and signal transmitting means 20 of FIG. 29A. The microprocessor 800 provides the required control functions for the receiver means 30. It also includes a memory for storing (1) a control program, (2) security contact information such as telephone numbers, IP addresses, email addresses, etc. of remote security notification endpoints, and (3) a data store, such as the data store 224 of FIG. 17. As earlier described with reference to FIG. 17, the data store 224 will store a unique identifier for each trigger, and may also include a look-up table 226 that associates the unique identifier with an optional word code that identifies the object to which the trigger is attached. In addition, each unique identifier can also be associated with stored values representing one of the three above-described security states, namely "ANNOUNCE," "ALERT" AND "ALARM," that will be used to determine how the receiver means 30 responds to trigger input when it is in the "HOME" state. In the "AWAY" and "PANIC" states, the security state for all triggers can be set to "ALARM" by changing the security state values for each trigger, or by providing security state override logic, or any other suitable means.

A further item that can be associated with each trigger's unique identifier in the data store 224 is a set of ATTRIBUTE bits (or other Boolean indicators). Each ATTRIBUTE bit for a trigger corresponds to one of the status codes that the trigger is capable of generating. For the movement detecting and signal transmitting means 20, this could include ATTRIBUTE bits corresponding to vibration, translation, a "LOW BATTERY" condition, a "HEART BEAT" signal, etc. For the environmental monitor 602, the ATTRIBUTE bits could correspond to heat, smoke, carbon monoxide, methane, etc., and a "LOW BATTERY" condition. For the remote control unit 40, the ATTRIBUTE bits would include the "HOLD," "AWAY," and "PANIC" conditions.

Setting one of the ATTRIBUTE bits for a trigger signifies that the receiver means 30 has received a status code from the trigger and has not completed servicing of the associated action. This allows for the queuing of responses. If the receiver means 30 has not completed servicing a status code for a trigger, a repeat of that status code from that trigger will be ignored. Once the receiver means 30 has completed servicing that trigger/status code, its associated ATTRIBUTE bit is reset. This prevents the receiver means 30 from taking multiple response actions for what is essentially the same trigger event. Note that other status codes from the same trigger are not precluded. Thus, even though a vibration status code received from a movement detecting and signal transmitting means 20 (e.g., there is a knock on a door) will be ignored when the corresponding ATTRIBUTE bit is set for that trigger, a translation status code received from the same trigger (e.g., the door is now opening) will not be ignored.

Figure 34B:
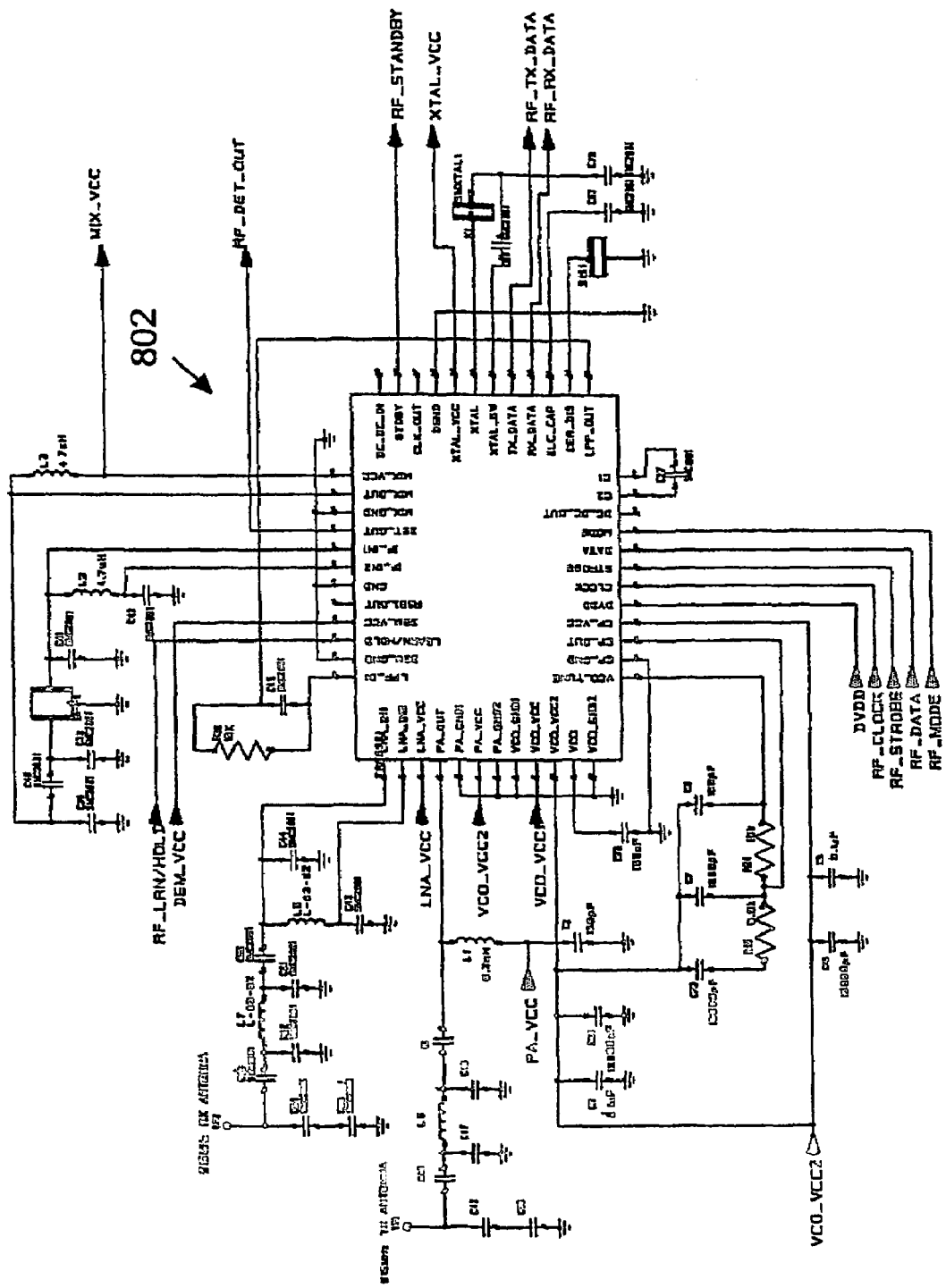

FIG. 34B schematically illustrates an RF transceiver 802 and connections thereto. By way of example only, the RF transceiver 802 can be implemented using the same kind of device used for the RF transceiver 554 in the movement detecting and signal transmitting means 20 of FIG. 29A. The RF transceiver 802 of FIG. 34B receives coded wireless messages from the various triggers representing sensor and/or control inputs, and transmits coded wireless messages to the speaker system 600 to produce audio outputs in the form of words, phrases and/or sounds. With respect to all triggers, and depending on the programming of the receiver means 30, the transceiver 802 could periodically transmit coded wireless messages that request the triggers to respond with current status information. For example, instead of the triggers initiating the transmission of periodic HEART BEAT information, the receiver means 30 could be adapted to poll the triggers for such information.

Figure 34C:
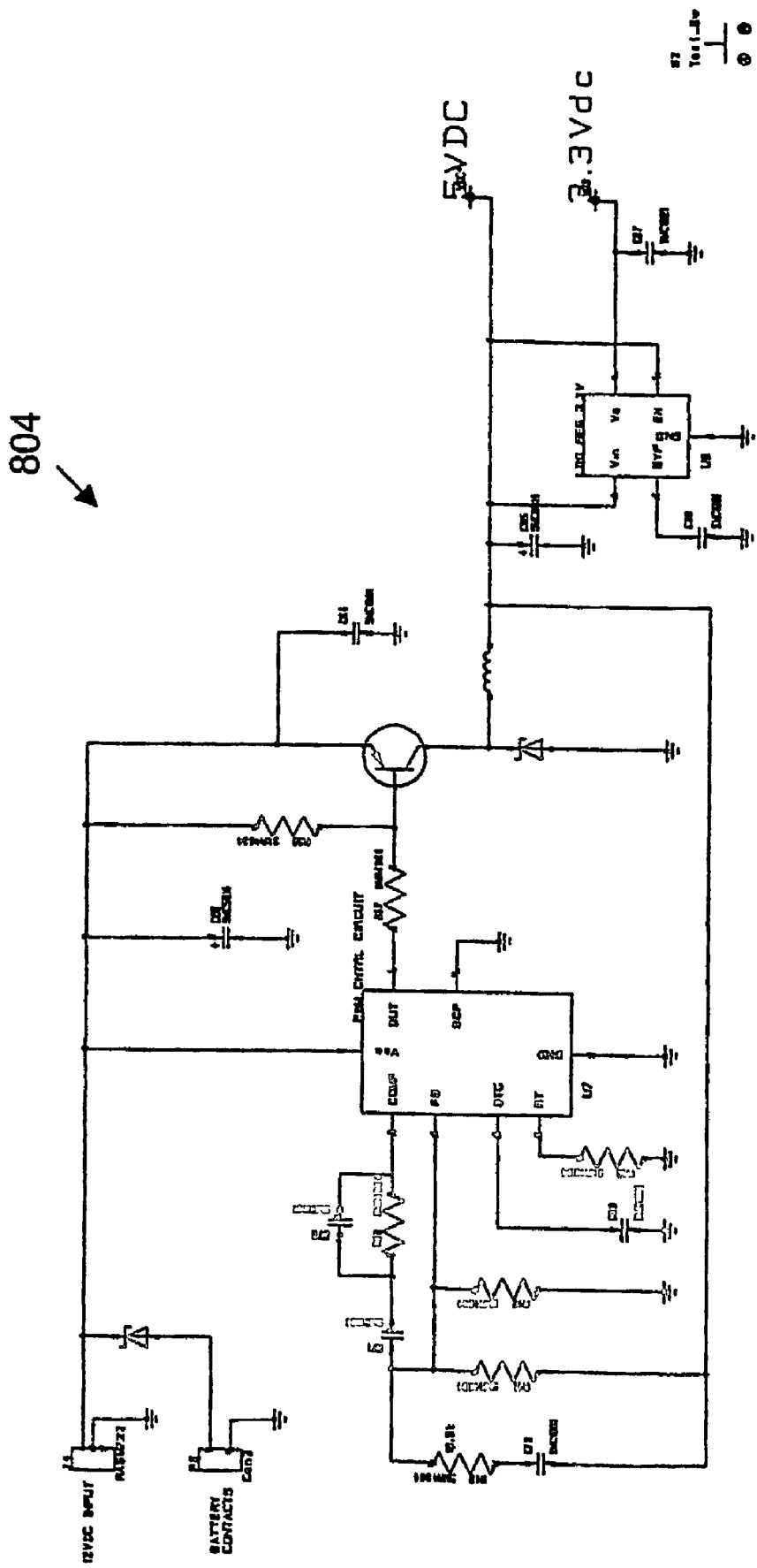

FIG. 34C schematically illustrates a battery/power supply 804 and connections thereto. The battery/power supply is designed to receive a 12 volt DC input from a plug-in voltage converter (not shown) or to receive a 12 volt DC input from a backup battery (not shown) in the event of a power failure. The battery/power supply produces 3.3 volt and 5 volt DC reference voltages at its outputs.

Figure 34D:
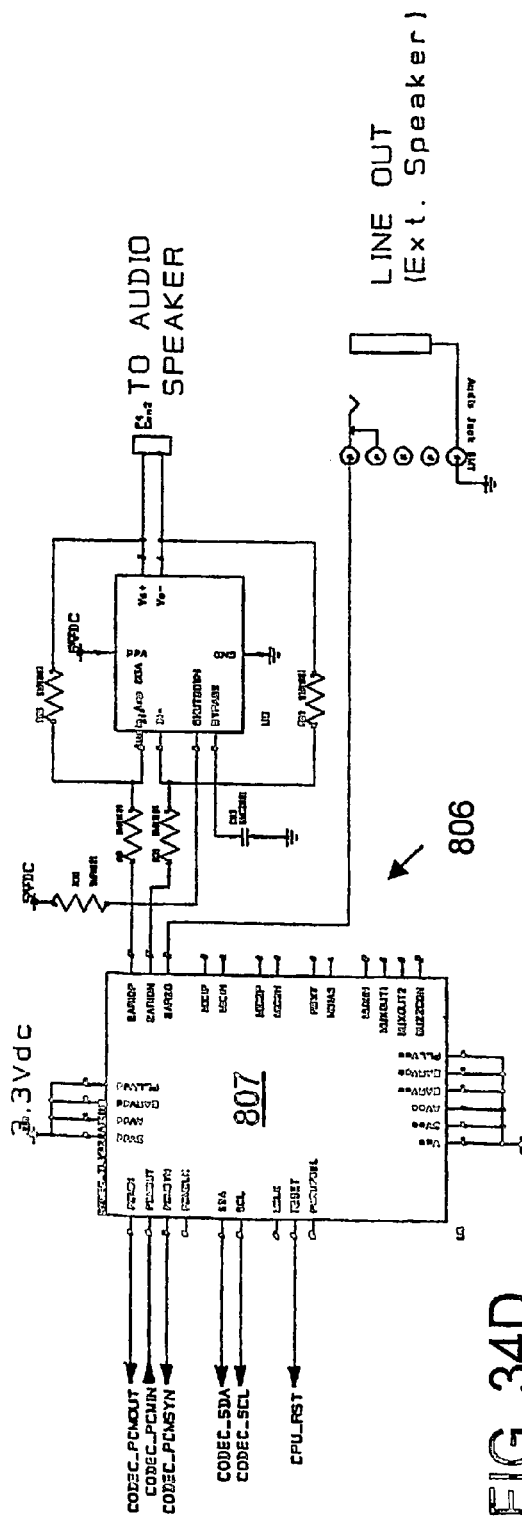

FIG. 34D schematically illustrates a speaker and audio port circuit 806 and connections thereto. These elements allow the receiver means 30 to produce local audio output regardless of whether a remote speaker system 600 is present. A line jack for output to a remote (non-wireless) speaker is also provided. An audio processor 807 generates the audio output based on audio file (and security state) inputs provided from the microprocessor 800. To that end, the data store within the microprocessor 800 will preferably store the same audio file information stored in the audio file storage 614 of each remote speaker system 600. Note that the audio processor 807 can be implemented using the speech synthesizer 236 shown in the receiver means 30 of FIG. 17. By way of example only, a conventional PCM (Pulse Code Modulation) CODEC (Coder/Decoder) IC, such as the TLV32AIC1110 codec IC from Texas Instruments, Inc. of Austin Tex., may be used for this purpose.

Figure 34E:
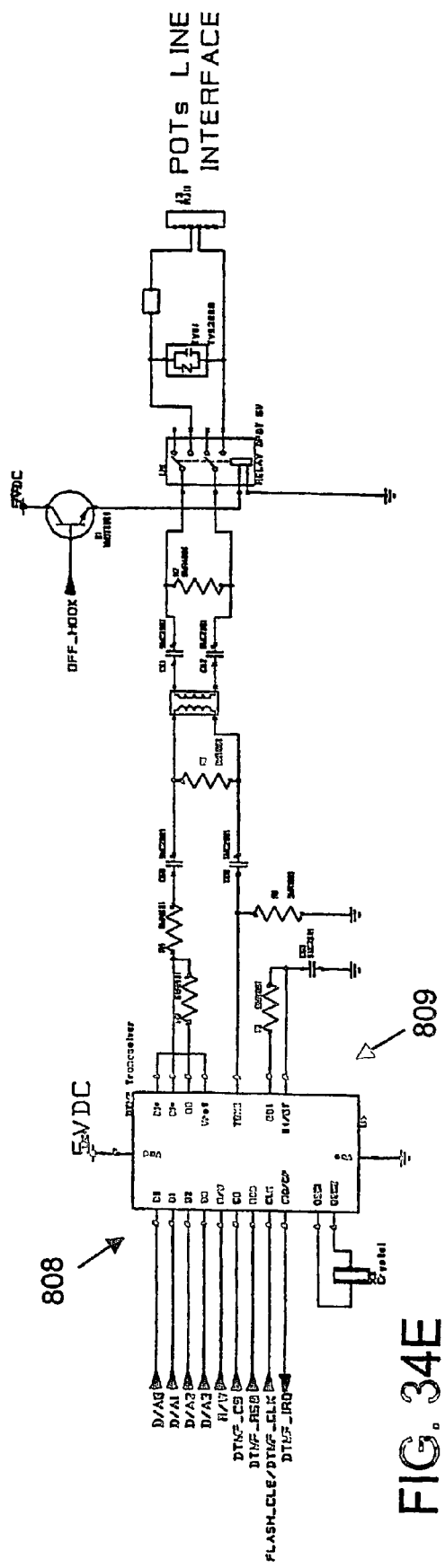

FIG. 34E schematically illustrates a telephone connection circuit 808 and connections thereto. The circuit 808 receives input from the microprocessor 800 at a DTMF (Dual Tone Multi Frequency) transceiver modem 809 that interfaces with a conventional POTS (Plain Old Telephone Service) line interface. By way of example only, the modem 809 can be implemented using an MT8880C DTMF transceiver IC from Zarlink Semiconductor, Inc. of Ottawa, Canada. The DTMF tones output by the modem 809 include the dialing number to a remote security administration system to be dialed and the security data (see below) to be reported. The security administration system could be the system 260 of FIG. 20 that processes the data received from the receiver means 30 in the manner described above in connection with FIG. 21. If desired, an Interactive Voice Response (IVR) feature could be used by the security administration system 260 to authenticate the receiver means 30 before data transmission is permitted.

Although the telephone connection circuit 808 shown in FIG. 34E implements a POTS line interface, it will be appreciated that a cellular telephone module could be provided in lieu of or in addition to the POTS interface, as could an ISDN interface, a cable interface, a DSL interface, etc.

Figure 34F:
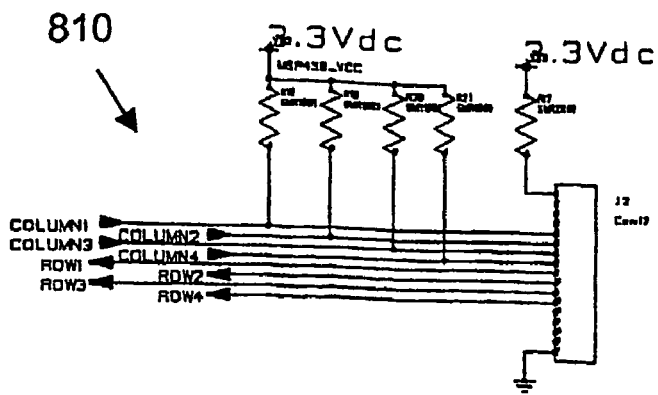

FIG. 34F schematically illustrates a keypad circuit 810 and connections thereto. The circuit 810 has a jack J2 that connects to a keypad (not shown) associated with the receiver means 30. Input from the keypad is provided to the microprocessor 800. This input will include various manual control functions, such as placing the receiver means 30 in one of the "HOME," "AWAY" and "PANIC" states, implementing the "QUIET" mode, etc. The keypad will also be used to input data, such as a descriptor for the object to which a movement detecting and signal transmitting means 20 is mounted, as well as a trigger's default security state for the "HOME" state, i.e., "ANNOUNCE," "ALERT," or "ALARM."

Figure 34G:
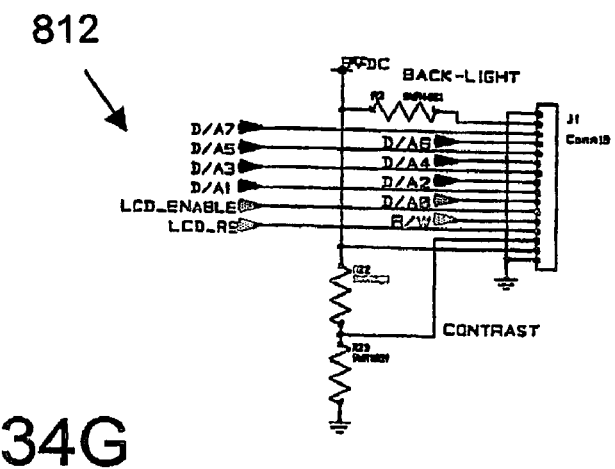

FIG. 34G schematically illustrates an LCD display connector circuit 812 and connections thereto. The circuit 812 has a jack J1 that connects to an LCD display (not shown) associated with the receiver means 30. Output from the microprocessor 800 is provided to the display, and may include information about the operational modes of the receiver means 30 and the data stored therein for the various triggers. Although not shown, a video output could be optionally provided for directing video information content (e.g., from an information gathering device 90) to a television set, a video monitor, etc.

Figure 34H:
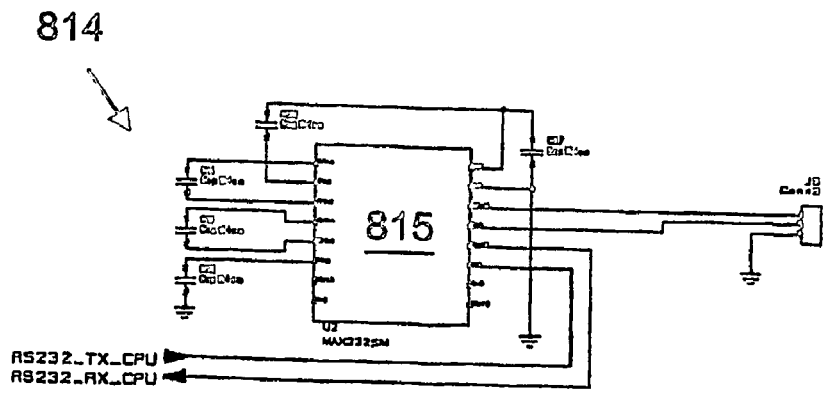

FIG. 34H schematically illustrates an RS232 Port circuit 814 and connections thereto. The circuit 814 includes an RS232 jack J5 and an RS232 driver/receiver IC 815. By way of example only, the IC 815 can be implemented using a MAX232 RS232 driver/receiver IC from Dallas Semiconductor, Inc. of Dallas, Tex. The circuit 814 allows serial connections to be made to the receiver means 30 for programming purposes.

Except for the manner in which the microprocessor 800 is programmed, all of the above-mentioned components of the receiver means 30 of FIGS. 34A-34H are conventional in nature. Additional aspects of their respective functions will become apparent from the flow diagram of FIGS. 35A-35B, which is described immediately below.

Figure 35A:
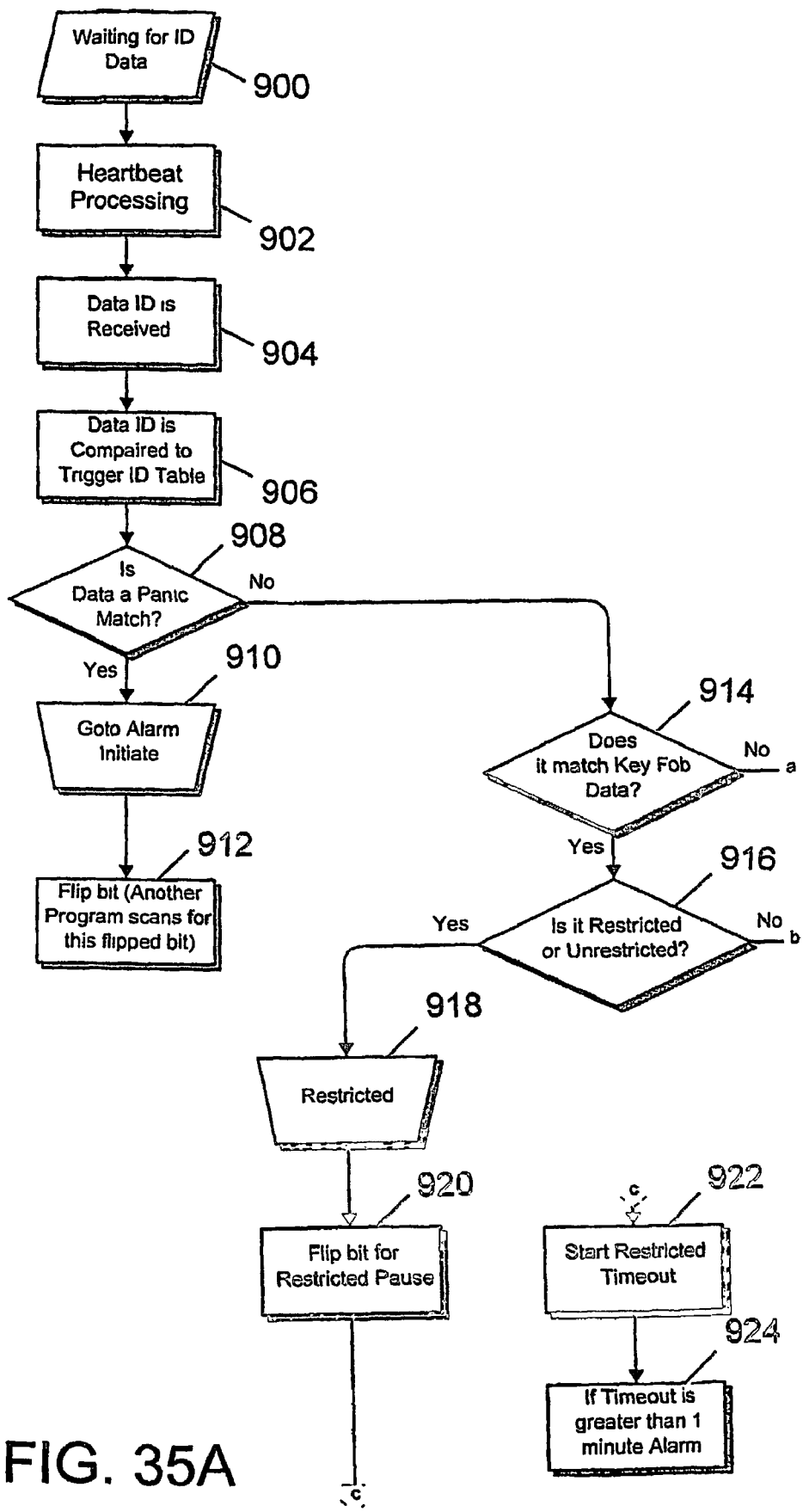
FIGS. 35A-35B set forth a flow diagram showing operational logic of the receiver means of FIGS. 34A-34H.
Figure 35B:
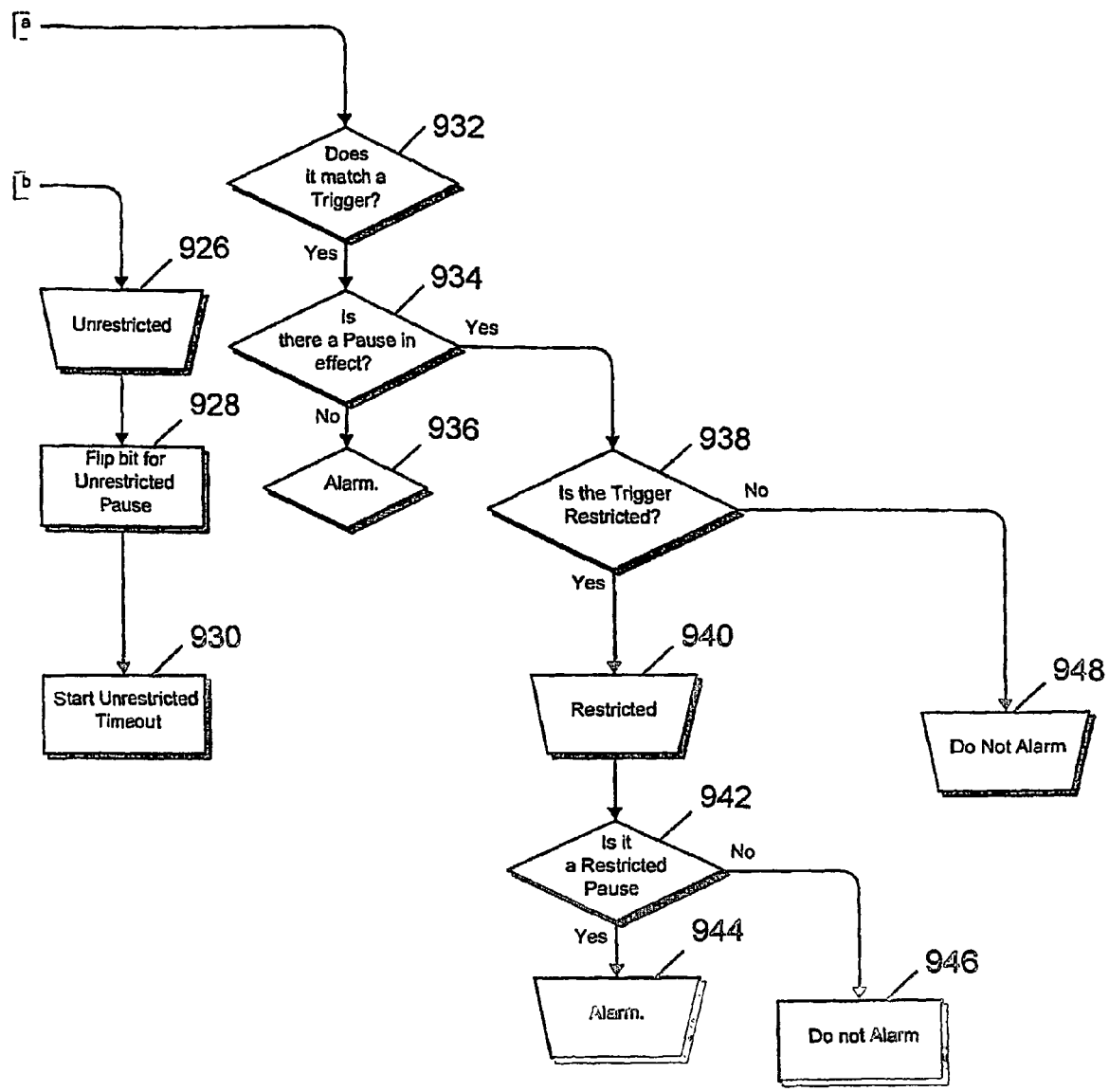

Turning now to FIGS. 35A-35B, a flow diagram is shown to further illustrate the various functions performed by the receiver means 30 in the embodiment of FIGS. 34A-34H. It is assumed that the receiver means is in the "AWAY" state. In FIG. 35A, the default condition of the receiver means 30 is to wait for a coded message from one of the triggers. This is shown by step 900. In step 902, "HEARTBEAT" processing is performed and a security response is initiated if any trigger fails to provide its "HEARTBEAT" signal. In step 904 a coded message is received containing a unique identifier (Trigger ID) and a status code modifier. In step 906, the receiver means 30 uses the unique identifier to look up the sending trigger in the data store 224 (see FIG. 17). In step 908, the status code is checked to determine if it represents the "PANIC" button on the remote control unit 40 being activated. If it does, the "ALARM" state is initiated in step 910. In step 912, an ATTRIBUTE bit corresponding to the "PANIC" state is set in the data store entry for the remote control unit 40. As described above, this bit signifies that the receiver means 30 is actively servicing the PANIC state status code from the remote control unit 40, and that subsequent PANIC state status codes from this device should be ignored by the receiver means until the bit is reset.

If it is determined in step 908 that the status code received by the receiver means 30 is not a "PANIC" command, a test is made in step 914 to determine if the status code corresponds to the "HOLD" button on the remote control unit 40 (key fob) being pushed. If it does, a data store lookup is performed in step 916 to determine whether the remote control unit 40 is "RESTRICTED" OR "UNRESTRICTED."

A "RESTRICTED" remote control unit 40 is one that would be given to children or other individuals who do not have full security access to all objects protected by triggers. Any of the movement detecting and signal transmitting means 20 can also be designated as "RESTRICTED" or "UNRESTRICTED." A "RESTRICTED" remote control unit 40 cannot be used to disarm a "RESTRICTED" movement detecting and signal transmitting means 20, but can be used to disarm an "UNRESTRICTED" movement detecting and signal transmitting means. By way of example, if a "RESTRICTED" movement detecting and signal transmitting means 20 is placed on a liquor cabinet, children with "RESTRICTED" remote control units 40 can never access the liquor cabinet. However, they could open a play room door protected with an "UNRESTRICTED" movement detecting and signal transmitting means 20.

An "UNRESTRICTED" remote control unit 40 is one that allows full security access to all objects regardless of whether the movement detecting and signal transmitting means 20 attached thereto is "RESTRICTED" or "UNRESTRICTED." Step 918 reflects a determination in step 916 that the remote control unit is "RESTRICTED." This causes steps 920 and 922 to be taken in which a "RESTRICTED PAUSE" ATTRIBUTE bit is set for the remote control unit 40 and a restricted timeout period is commenced, respectively. By way of example only, a one minute timeout period may be used when the "HOLD" button of a "RESTRICTED" remote control unit 40 is pressed. If the timeout period lapses before the receiver means 30 is placed in a "HOME" state, an alarm response is taken in step 924.

If it is determined in step 916 that the remote control unit 40 is not "RESTRICTED," as shown in block 926, steps 928 and 930 are implemented (see FIG. 35B) to set an "UNRESTRICTED PAUSE" ATTRIBUTE bit for the remote control unit 40 and to start a timeout counter according to whether the "HOLD" button was pressed once (16 seconds) or twice (48 seconds).

As described earlier above, processing to determine whether the remote control unit 40 has "RESTRICTED" or "UNRESTRICTED" privileges may also be performed in response to receiving a transmission from a sensing trigger that has a remote control unit RFID tag appended thereto. This would signify that a person (e.g., with the remote control unit 40 in hand) has disturbed a sensing trigger. In this situation, the response may be the same as if the HOLD button was pressed prior to disturbing the trigger.

If it is determined in step 914 that the status code does not pertain to a remote control unit 40, a test is made in step 932 (see FIG. 35B) to determine if the status code pertains to a sensing trigger. Assuming there are no other types of triggers in the alarm system 10, the test will be positive. Step 934 will be performed and a determination will be made as to whether a pause is in effect due to a remote control unit "HOLD" button having been pressed. If no pause is in effect, step 936 is executed and the "ALARM" state is initiated. If there is a pause in effect, a test is made in step 938 to determine if the sensing trigger is "RESTRICTED."

If the sensing trigger is "RESTRICTED," as shown in block 940, a test is made in step 942 to determine whether a "RESTRICTED PAUSE" ATTRIBUTE bit was previously set. If it is, the ALARM state is initiated in step 944. If it is determined in step 942 that no "RESTRICTED PAUSE" ATTRIBUTE bit has been set, it is assumed that there is an "UNRESTRICTED PAUSE" in effect and no ALARM is made in step 946. If it is determined in step 938 that the sensing trigger is "UNRESTRICTED," step 948 is implemented and no ALARM is made.

The process flow for the "HOME" state of the receiver means 30 is essentially the same as for the "AWAY" state, except that an additional test is made following a positive determination in step 914 (see FIG. 35A) as to whether the "AWAY" button has been pressed on the remote control unit 40. If it has, the "AWAY" state is invoked.

When the receiver means 30 enters the ALARM state, it preferably initiates contact with a remote security location such as the security administration system 260 of FIG. 20. An example of such processing was previously described with reference to the flow diagrams of FIGS. 19 (receiver means logic) and 21 (administration system logic).

Figure 36A:
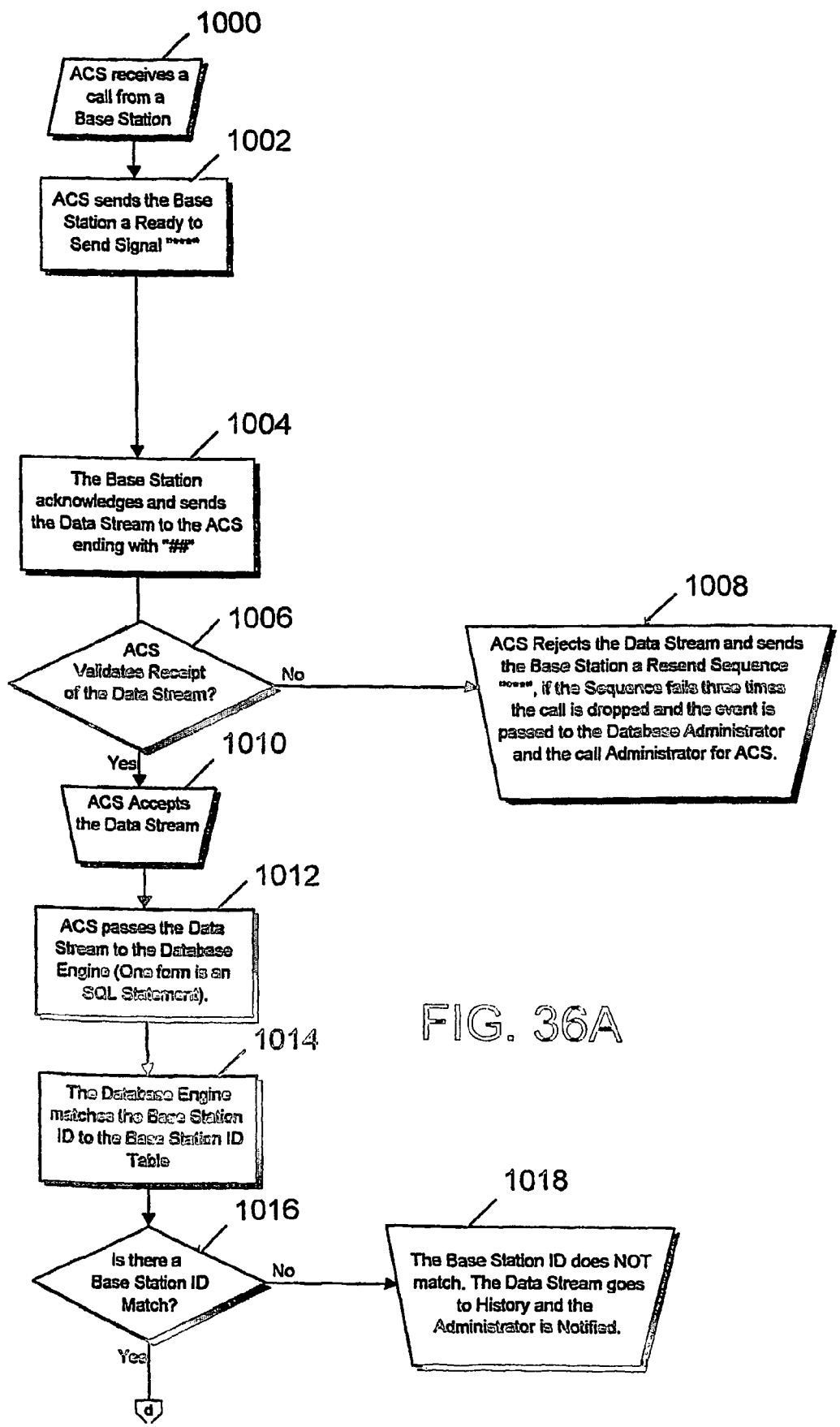
FIGS. 36A-36B set forth a flow diagram showing additional operational logic of the security administration system of FIG. 20 during a security monitoring and response operation.
Figure 36B:
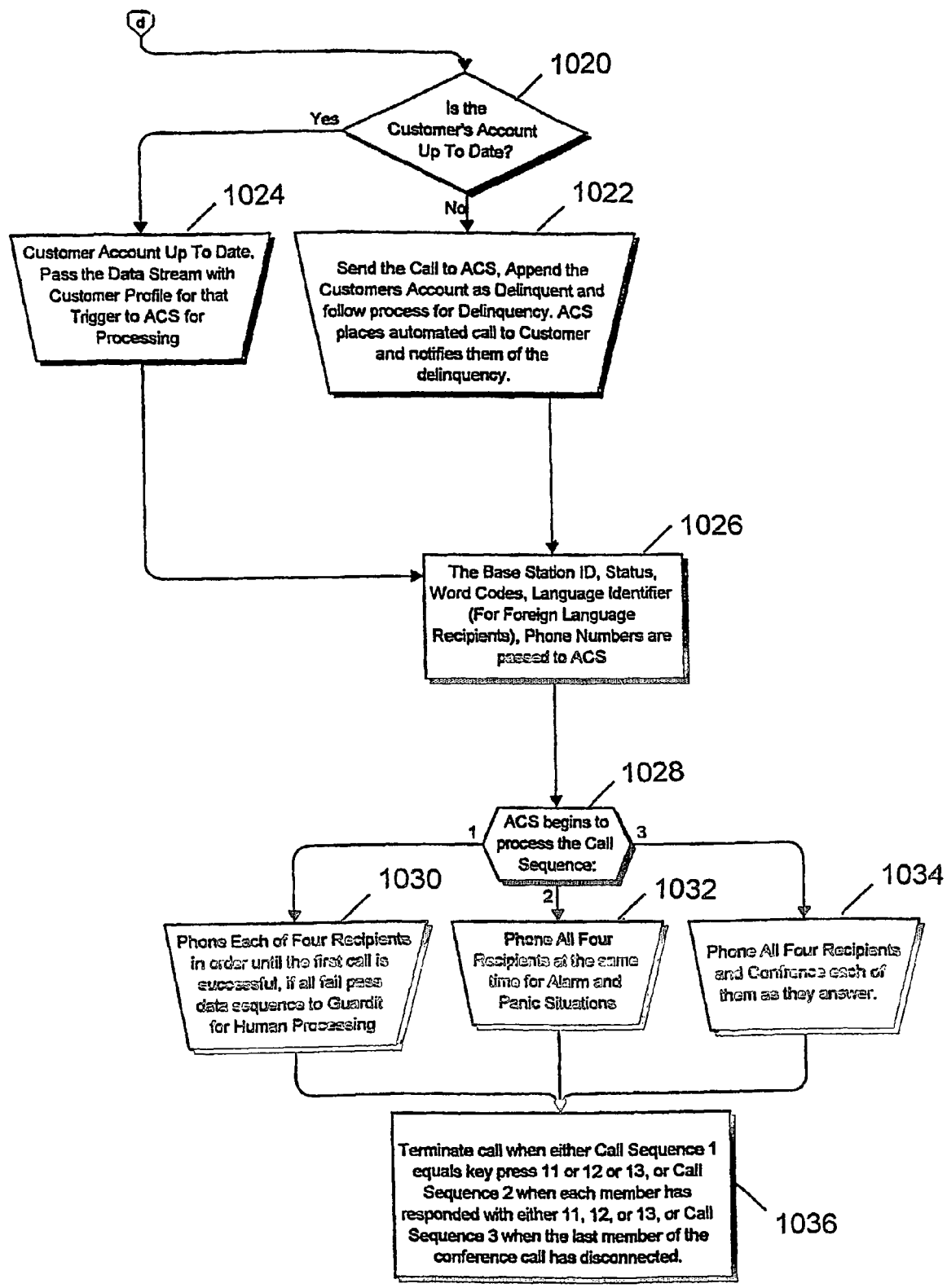

FIGS. 36A-36B illustrate further details of the "ALARM" state processing that can be implemented by the receiver means 30 and the security administration system 260 according to the present invention. Beginning in step 1000 of FIG. 36A, the "ALARM" state results in the receiver means 30 contacting the administration system 260, hereinafter referred to as the ACS (Automated Central Service) 260, via one of the receiver means' embedded telephone numbers. As described above, other communication methods, such as cellular telephone, IP or email, etc., could also be used. Assuming telephone communication is used, the ACS 260 may receive the call through an automated means as typically used in the IVR (Interactive Voice Response) industry.

In step 1002, the ACS 260 sends the receiver means 30 a "READY-TO-SEND" signal and in step 1004, the receiver means acknowledges and starts transmitting information using any suitable protocol that is consistent with the communication link being used, e.g., DTMF for telephone, CDMA/TDMA/GSA for cellular, etc. The transmission stream from the receiver means 30 can include a Base station ID that identifies the receiver means 30, a Trigger ID that identifies the trigger which generated the alarm event, the status code(s) reported by the trigger, and the one or more word codes that identify the object to which the trigger is attached. Each portion of the transmission stream can be delineated by a # symbol or other suitable separator. The stream #A#0123456789#001#9876543210#1#875#003B234B111#D#" is one example where #A# initiates the stream, 0123456789 is the Base Station ID, 001 is a transmission stream type, 9876543210 is the Trigger ID, 1 is the status code, 875 is a checksum, and 003B234B111 are the word codes separated by a B character. The final #D# signifies the end of the transmission stream.

After the ACS 260 receives the #D# characters, the transmission is validated in step 1006. If the transmission was correctly received, the ACS 260 transmits a success code (e.g., #123#) and hangs up. Otherwise, as shown in step 1008, the ACS 260 will issue a resend sequence to the receiver means 30. Alternatively, the ACS 260 could wait for a timeout period while the receiver means 30 attempts to resend, and then hang up. In either case, the receiver means 30 will retransmit one or more times. If repeated retransmissions (e.g., three times) fail to produce a successful result and the ACS 260 terminates communication, the event can be reported to an ACS administrator. If the transmission is validated in step 1006, the transmission stream is accepted in step 1010. In step 1012 the data received in the transmission is sent to the database in the data storage resource 264 (see FIG. 20). This could be in the form of an XML (eXtensible Markup Language) document, an SQL (Sort Query Logic) statement or any other suitable query technique. In step 1014, the database engine matches the Base Station ID to a corresponding entry in the database. If, in step 1016, there is no such entry, step 1018 is performed and an ACS administrator is notified.

If a match is found for the Base Station ID in step 1016, a test is made in step 1020 (see FIG. 36B) to determine if the customer's account is up to date. If it is not, appropriate processing is performed in step 1022 to notify the customer of the delinquency. If the customer's account is up to date, step 1024 is performed and the Trigger ID is sent to the database to obtain a customer profile, including a list of telephone numbers (or other contact information) to be called to deliver notification of the security event to specified recipients. Note that a customer profile can include a telephone number listing for each trigger. This reflects the fact that triggers will be attached to different objects and the notification recipients may differ for each object. Thus, the notification recipients for a dwelling door may be completely different from the recipients associated with a jewelry box. The dwelling door notification recipients might be a neighbor, a family member and the customer's work telephone. The jewelry box notification recipients could be the customer's work telephone, the customer's cellular telephone, and the police. Note that the customer profile information may also include a language code for each recipient specifying a language (e.g., English, Spanish, German), to use for contacting each recipient.

In step 1026, the customer profile information, together with the Base Station ID, the Trigger ID, the status code(s) and the word codes are used by the ACS 260 to initiate a notification sequence to the recipients in step 1028. Three options are available. The first option, as shown at step 1030, is to initiate a call attempt to each designated recipient (e.g., four) until a successful call completion and security notification is achieved. If all call attempts fail, a default action may be invoked, such as notifying an emergency response agency or handing off security notification responsibility to a human operator. The second option, as shown in step 1032, is to call all recipients simultaneously. This may be desirable for PANIC situations. The third option, as shown in step 1034, is to conference all recipients together for joint determination as to what response should be taken.

For each of the above three call options, the call sequence could begin with a greeting (in a specified language) that announces the ACS 260 followed by a prompt (e.g., "Press 1") to confirm to the ACS that a human has answered the call. For the first option of step 1030, the ACS 260 can prompt for a password from the first person called. If the password is not entered, signifying that an unauthorized individual has answered the call, or that a possible hostage situation exists, the ACS 260 can hang up and try the remaining call recipients (with or without requiring a password). Assuming a human answers the call from the ACS, and provides a password if requested to do so, the ACS will play a security notification to the call recipient, such as: "123 Happy Dale Lane" (the customer's address), "Knock at Back Door" (status code and word codes). The ACS 260 can then provide a series of response options, such as "Press 1 for Police; Press 2 for Fire Department; Press 3 for [Other]". Again, the language used for the notification can be specified as customer profile information.

Step 1036 represents the termination of each of the calls according to the three options of steps 1030, 1032 and 1034. For the options of steps 1030 and 1032, the ACS will direct the call to the designated recipient after receiving the inputs 11, 12 or 13, and then terminate the call. For the option of step 1036, the ACS 260 will terminate the call after the last member of the conference has disconnected.

An additional function that may be provided by the ACS 260 is to download security or other information to the receiver means 30. This information would typically not involve any specific events taking place within the alarm system 10, but would pertain to outside events, such as security notifications from a governmental agency like the U.S. Department of Homeland Security. By way of example, only, a color-code warning in accordance with the Homeland Security Advisory System could be sent to all receiver means 30 served by the ACS 260. On a more general note, the ACS 260 could also be used to provide commercial information, such as promotional offers, advertisements and the like, to the receiver means 30. Such information could be coded by category and users of the receiver means 30 could input a unique subscriber code that is linked to one or more category codes. In that way, each person could receive information content that is of personal interest to them from receiver means 30.

Figure 38:
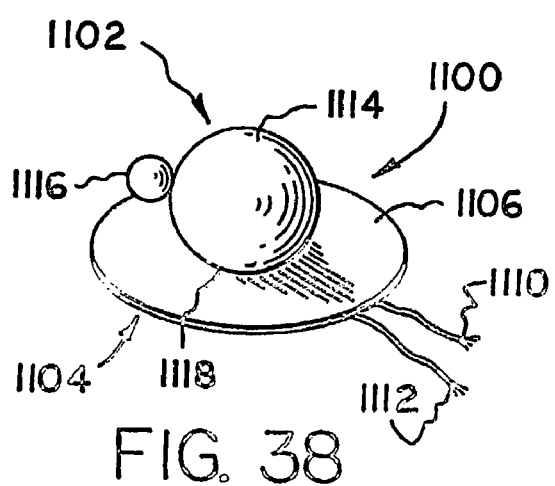
FIG. 38 is a perspective view of a first side of an inertial sensor having an unstable and unbalanced mass.
Figure 39:
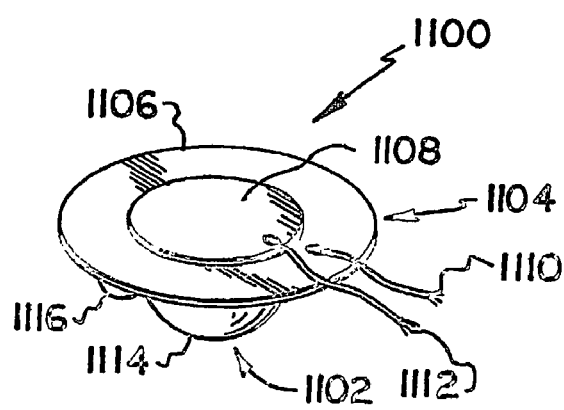
FIG. 39 is a perspective view of a second side of the inertial sensor of FIG. 38.

Turning now to FIGS. 38 and 39, a piezoelectric inertial sensor 1100 is shown that may be used in a further embodiment of a movement detecting and transmitting means according to the invention. The sensor 1100 is similar to the sensor 510 of FIG. 27 except that the mass 514 is replaced with a mass 1102 that is inherently unstable and unbalanced. The mass 1102 is mounted to a conventional piezoelectric audio transducer 1104 that includes a flexible, free moving brass diaphragm 1106 carrying a piezoelectric element 1108 on one side thereof. Electrical leads 1110 and 1112 are respectively connected to the brass diaphragm 1106 and the piezoelectric element 1108. Although the mass 1102 is shown to be secured to the brass diaphragm 1106 in FIGS. 38 and 39, it could be alternatively secured to the piezoelectric element 1108.

The mass 1102 is comprised of a primary mass element 1114 and a secondary mass element 1116. The primary mass element 1114 is spherical in shape and can be implemented as a steel ball bearing that, by way of example only, is approximately 9-15 grams in weight. The primary mass element 1114 is secured to the transducer 1104 to provide a coupling connection 1118. The coupling connection 1118 can be implemented by way of adhesive bonding or using any other suitable securement technique. Preferably, the coupling connection 1118 has a small surface area. This makes the mass 1102 inherently unstable because any slight acceleration in the principal plane of the transducer 1104 will impart a rolling motion to the mass 1102 due to inertial effects. The arrows "X" and "Y" in FIG. 40 illustrate the directional plane of acceleration that causes the aforementioned rolling motion. FIG. 40 is a top plan view of the sensor 1100 looking down on the mass 1102. It further shows the periphery of the brass diaphragm 1106 being mounted to a conventional support ring housing 1120 of the type usually associated with piezoelectric audio transducers. This ensures there will be adequate clearance for distortional movement of the brass diaphragm 1106 that will not be constrained by a surface or other structure on which the sensor 1100 would be mounted.

FIGS. 41A, 41B and 41C show exemplary proportions of the primary mass element 1112 and the coupling connection 1118, and also illustrate how the mass 1102 acts on the transducer 1104. It will be seen that the rolling motion of the primary mass element 1112 is focused onto the transducer 1104 by virtue of the small surface area of the coupling connection 1118. As particularly shown in FIG. 41C, the cantilever coupling moment is concentrated in a small area, thus easily flexing the brass diaphragm 1106 (and thereby straining the piezoelectric element 1108) to produce a transducer signal output when acceleration is applied in the X-Y plane. The cross-sectional surface area of the coupling connection 1118 is sized to introduce the desired amount of strain into the piezoelectric element 1108, as sensitivity requirements dictate. In most cases, the maximum cross-sectional dimension of the coupling connection 1118 will be substantially smaller than the diameter of the primary mass element 1114 to facilitate the aforementioned rolling motion. In addition to reducing the surface area of the coupling connection 1118 to improve sensitivity, other configuration changes that may be implemented for accomplishing this goal include increasing the weight of the mass 1102, increasing the separation of the center of gravity of the mass from the transducer 1104, thinning the brass diaphragm 1106 and/or thinning the piezoelectric element 1108.

Although not shown, another shape that could be used to provide an unstable mass for the sensor 1100 is a pyramid with its apex attached to the transducer. Still another shape that could provide an unstable mass would be a large diameter cylinder or disk mounted to the transducer 1104 by way of a small diameter post. Additional shapes will no doubt become apparent to persons skilled in the art in view of the teachings herein, and all such shapes should be considered to be included within the scope of the present invention.

As shown in FIGS. 41A and 41B, the sensor 1100 is also sensitive to motion in the direction shown by the arrows "Z1" and "Z2" due to the fact that the brass diaphragm 1106 can be readily flexed in this direction to strain the piezoelectric element 1108. As additionally shown in FIG. 40, there is also good sensitivity to rotational motion (in the direction shown by the arrows "R"). This is due to fact that the mass 1102 is not only unstable by virtue of the coupling connection 1118 to the transducer 1104, it is also unbalanced due to the secondary mass element 1116. The secondary mass element 1116 can be implemented using a steel ball bearing that is secured to or integrated with the primary mass element 1114. The secondary mass element 1116 is located on one side of the central orthogonal axis that extends through a center of gravity of the primary mass element (i.e., along the arrows "Z1" and "Z2" in FIGS. 41B and 41C), preferably at or near the equator (widest diameter portion) of the primary mass element. As shown in FIG. 40, when the sensor 1100 is rotated in direction of the arrows "R", the secondary mass element 1116 tends to inertially resist rotation of the primary mass element 1116, creating a shearing force at the coupling connection 1118 where the latter is affixed to the transducer 1104. It will be appreciated that there are other shapes which be used in lieu of the spherical secondary mass element 1116, just as there are other shapes that may be used to implement the primary mass element 1114. All such shapes are intended to be included within the scope of the present invention. Moreover, insofar as production implementations of the presently described inertial sensor may feature a single integrated mass that combines the functions of the primary and secondary mass elements, it will be appreciated that any number of integrated shapes could be selected and used for this purpose. These shapes will preferably be non-symmetrical to provide unstable/unbalanced masses, but unstable/balanced masses could also be used. Many different material choices exist.

Turning now to FIG. 42, the sensor 1100 is shown to be implemented in a movement detecting and signal transmitting means arranged in a compact button-shaped construction 1200. In the construction 1200, the sensor 1100 is mounted in the support ring housing 1120. The latter includes mounting tabs 1202 that are secured onto conventional mounting clips 1204 extending from a circuit board 1206. The circuit board 1206 mounts circuit components of the type described above in previous embodiments for processing the output signal of the sensor 1100. The circuit board 1206 can also mount transceiver components for communicating with the receiver means 30. Alternatively, transceiver circuitry could be eliminated if stand-alone sensing is desired with a local sensing output only, or if the sensor 1100 is being used as a switch to control a device (see below).

A battery 1208 is mounted on the opposite side of the circuit board 1206 to power the circuitry thereon. The circuit board 1206 and all of its mounted components are placed within a main housing 1210. The main housing 1210 includes an upper cover 1212, and a lower cover 1214. The lower cover 1214 is removable to allow access to the batter 1208 for replacement thereof. The upper cover 1212 can also be configured for removability, i.e., by virtue of threads 1216, if desired. An adhesive member 1218 is mounted to the outer side of the lower cover 1214 to facilitate affixation of the construction 1200 to an object whose motion is to be sensed.

Note that miniaturization of the construction 1200 could be achieved by using the support ring housing 1120 of the sensor 1100 as a main housing. In that case, however, the circuit and battery components would have to be small enough to fit within the available footprint.

Figure 43:
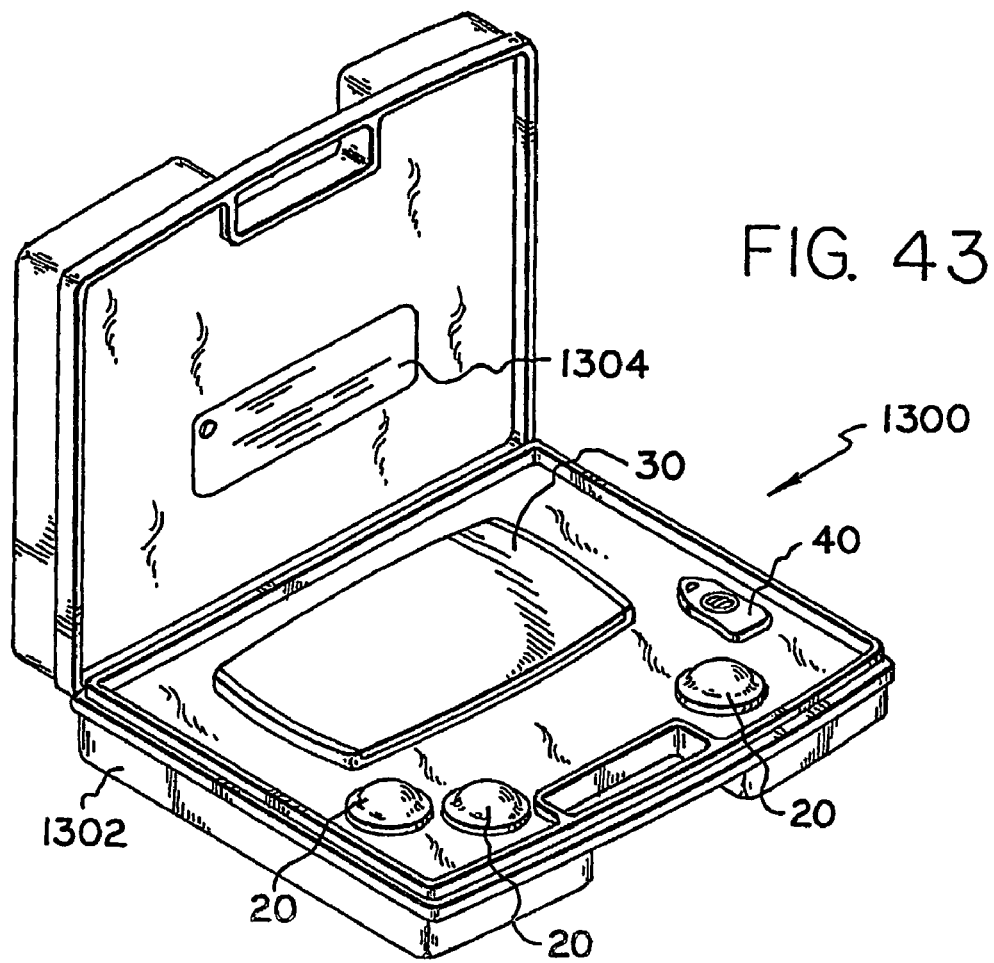
FIG. 43 is a perspective view of a portable security alarm kit constructed in accordance with the present invention.

Turning now to FIG. 43, the present invention may be embodied in a portable security kit 1300. The kit 1300 includes a receiver means 30, a remote control unit 40 implemented as a key fob or the like, and plural movement detecting and signal transmitting means 20 implemented using the construction 1200 (or any other suitable construction). The foregoing components are seated in a portable carrying case 1302, along with product instructions 1304.

Accordingly, a portable security alarm system has been shown and described. While the invention has been described in conjunction with various embodiments, they are illustrative only, and it will be appreciated that many alternatives, modifications and variations will be apparent to persons skilled in the art in light of the foregoing detailed description. For example, the movement detecting and signal transmitting means 20 could be provided using another alternative implementation based on a magnetic field sensor, such as the KMZ51 Magnetic Field Sensor available from Philips Semiconductors of Eindhoven, Netherlands.

The KMZ51 sensor can be used for electronic compass applications or to sense local magnetic fields. In a compass application, the KMZ51 sensor is oriented parallel to the Earth's surface and produces a signal output when its rotates relative to the Earth's magnetic poles. If two KMZ51 sensors are placed in orthogonal relationship to each other, a precise azimuth measurement can be obtained. A KMZ52 sensor, also from Philips Semiconductors, may also be used insofar as it incorporates two mutually orthogonal magnetic field sensors.

Figure 37:
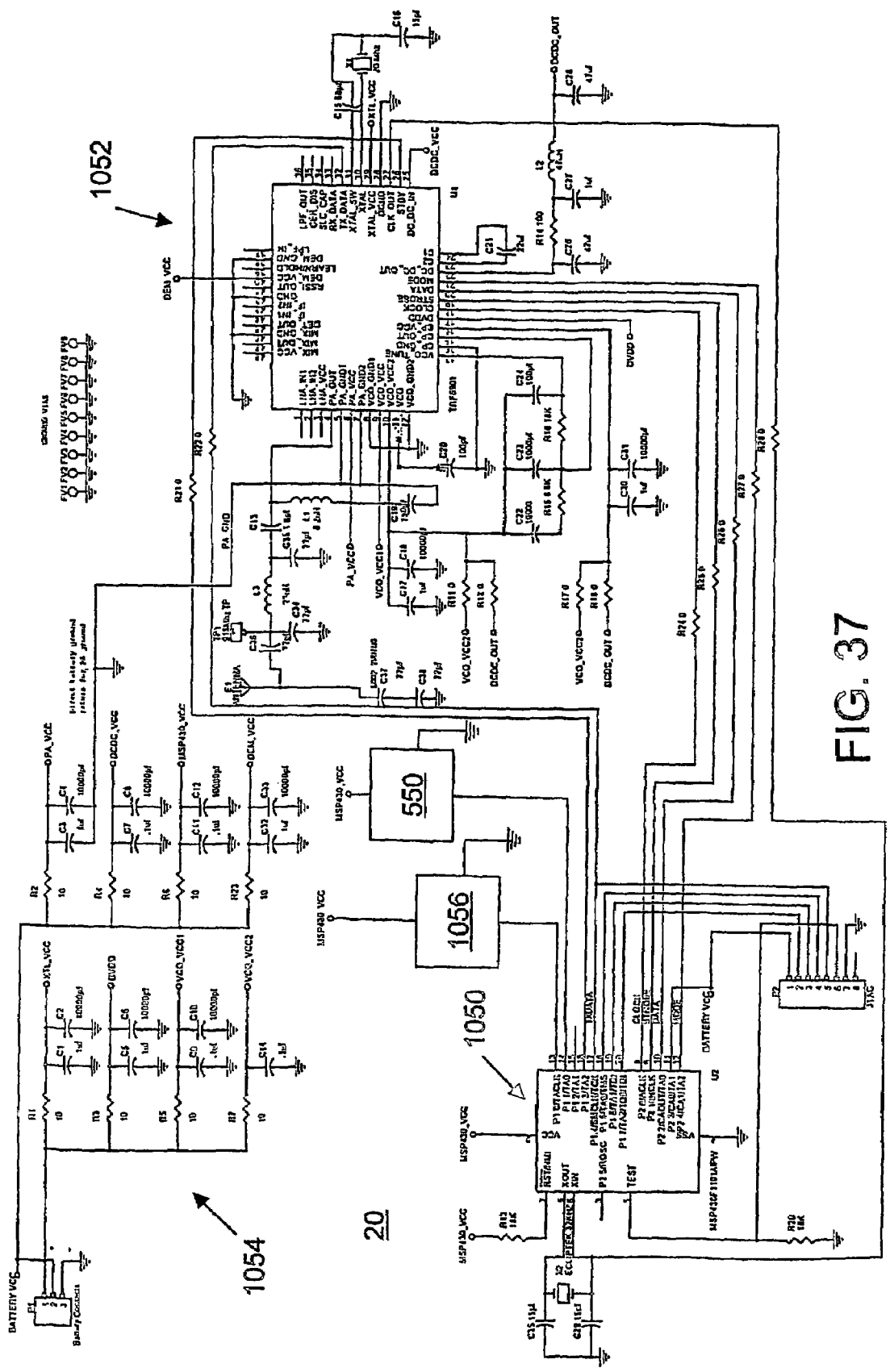
FIG. 37 is a schematic diagram of another alternative embodiment of a movement detecting and signal transmitting means implemented using a magnetic field sensor in combination with an inertial sensor.

The foregoing sensors would be ideal for a movement detecting and signal transmitting means 20 mounted on an object that is expected to undergo rotational or pivotal movement, such as a door. FIG. 37 illustrates such a movement detecting and signal transmitting means 20 constructed as a modified version of the movement detecting and signal transmitting means 20 shown in FIG. 29A. In particular, there is a microprocessor 1050, an RF transceiver 1052, a battery/power supply module 1054, and a magnetic field sensor unit 1056. The microprocessor 1050 is shown by way of example only to be implemented as an MSP430F148 mixed signal microcontroller IC from Texas Instruments, Inc. of Dallas Tex. The RF transceiver 1052 is shown by way of example only to be implemented as a TRF6901 RF-transceiver IC from Texas Instruments, Inc. Other like-kind devices could also be respectively used to implement the microprocessor 1050 and the RF transceiver 1052.

The magnetic field sensor unit 1056 could be implemented using a single magnetic field sensor (such as the KMZ51) to detect rotational movement without necessarily quantifying the amount of rotation. Alternatively, the magnetic field sensor unit could be constructed more elaborately using two KMZ51 sensors, or a single KMZ52 sensor, to both detect and quantify rotational movement. Again, all of the components of the movement detecting and signal transmitting means 20 of FIG. 37 can be housed in a case that can be removably mounted at a desired location using adhesive strips or other means.

Additional advantage can be obtained if a magnetic field sensor is combined with an inertial sensor (e.g., a gyroscope sensor or an accelerometer sensor) in a single movement detecting and signal transmitting means 20 mounted on an object that is capable of pivotal or rotational movement, such as a door. FIG. 37 shows this construction in which the inertial sensor unit 550 of FIG. 29 is combined with the magnetic field sensor unit 1056. In this configuration, the magnetic field sensor can be used to verify events being sensed by the inertial sensor, and visa versa. Following are scenarios in which these sensor properties can be used to characterize the cause of a sensing event on a pivotable or rotatable object:

- If the inertial sensor generates an output because of a sharp vibration (e.g., a hinged door receives a knock), the magnetic field sensor presumably will not respond and it can thus be confirmed that the inertial sensor was triggered by vibration and not long wave movement.
- If the inertial sensor generates an output because of long wave motion (e.g., a hinged door is opened), the magnetic field sensor will also respond and it can thus be confirmed that the inertial sensor was triggered by translational movement and not vibration.
- If the magnetic field sensor generates a slowly changing output but the inertial sensor generates no output, it may be assumed that the object is moving very slowly (e.g., someone is trying to open a door surreptitiously to avoid sensor detection).
- If the magnetic field sensor generates a quickly changing output but the inertial sensor generates no output, it may be assumed that a large metal object or other source of magnetic interference has triggered the sensing event.

Thus, by interpreting the outputs from each of type of sensor, useful information can be obtained that enhances the performance of the system 10 of the invention.

Note that the foregoing scenarios can be performed with a gyroscopic sensor, or an accelerometer sensor or some other type of inertial sensor being used in lieu of a magnetic field sensor, in combination with another inertial sensor adapted to sense vibrations (vibration sensor). By way of example only, the vibration sensor could be implemented using a piezoelectric audio transducer without any additional mass being added thereto, and with the transducer preferably being enclosed in a vacuum environment to screen out spurious influences, such as wind. Associated circuitry would then be programmed to look for signal patterns from the vibration sensor that are indicative of a significant vibration event being experienced by object being monitored, such as a knock on a door. The control circuitry would additionally be programmed to interpret the signal output of the other inertial sensor (e.g., the gyroscope, the accelerometer, etc.) to make a determination about the object's long wave motion.

A further modification according to the invention would be to use an inertial sensor as a switch that activates or deactivates a device. Instead of sending a signal to the receiver means 30, the inertial sensor would activate or deactivate the device. A wide variety of devices could be activated using an inertial sensor in accordance with the invention, for security purposes or otherwise. These include but are not limited to another sensor within a trigger (such as a power-draining gyroscopic sensor), circuit components with a trigger, as well as handheld tools or other implements that could be conveniently powered on when picked up, etc. Devices that could be deactivated using an inertial sensor would include fire-hazardous equipment that is desirably powered off when excessive motion is present, such as a furnace, hot water heater or the like. The excessive motion could be due to a hurricane, a tornado, an earthquake, or other catastrophic event. It will be appreciated that a sensor used as a switch could communicate wirelessly with the device controlled by the sensor, or by way of a wired connection.

The invention is intended to embrace all such modifications, as well as all other alternatives and variations falling with the spirit and broad scope of the appended claims and their equivalents.

What is claimed is:

1. A movement detecting device comprising an inertial sensor and adapted to sense multidirectional movement, and control circuitry for distinguishing between opposing directions of movement sensed by said sensor along a single axis of motion, said control circuitry comprising a first circuit adapted for sensing movement in a first direction and a second circuit adapted for sensing movement in a second direction, said first and second circuits respectively comprising positive and negative displacement threshold circuits adapted to produce an output when said sensor detects a specified level of movement, said positive and negative displacement threshold circuits having either the same or different displacement thresholds.

2. The device of claim 1 wherein said sensor comprises a gyroscope sensor.

3. The device of claim 1 wherein said sensor comprises a MEMS accelerometer sensor.

4. The device of claim 1 wherein said sensor comprises a piezo film accelerometer sensor.

5. The device of claim 1 wherein said sensor comprises a piezoelectric transducer having a piezoelectric element and a mass operatively attached to flex said piezoelectric element.

6. The device of claim 5 wherein said mass is one of a quantity of adhesive, a quantity of solder, or a solid object bonded to said piezoelectric element or to a substrate associated therewith.

7. The device of claim 1 wherein said sensor comprises a piezoelectric element disposed within a partial vacuum environment.

8. The device of claim 7 wherein said partial vacuum environment is provided by an airtight compartment.

9. The device of claim 1 further comprising a magnetic field sensor.

10. The device of claim 1 wherein said device control circuitry is activated or deactivated by said sensor detecting inertial movement.

11. The device of claim 1 wherein said device is adapted to generate an output in response to said sensor detecting inertial movement.

12. The device of claim 1 wherein said device is adapted to transmit a wireless radio frequency signal in response to said sensor detecting inertial movement.

13. The device of claim 1 wherein said device is disposed in a portable security system adapted to forward a security alert to a telephone number, an email address or other endpoint in response to said sensor detecting inertial movement.

* * * * *